US012739466B2

(12) United States Patent
Chen et al.

(10) Patent No.: US 12,739,466 B2
(45) Date of Patent: Sep. 15, 2026

(54) DISPLAY APPARATUS AND METHOD

(71) Applicant: VIDAA (NETHERLANDS) INTERNATIONAL HOLDINGS B.V., Duiven (NL)

(72) Inventors: Yaozong Chen, Duiven (NL); Zhongmin Zhao, Duiven (NL); Yuansong Liao, Duiven (NL); Xiangjun Bai, Duiven (NL); Min Li, Duiven (NL); Zunmin Ge, Duiven (NL); Yuan Li, Duiven (NL)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 0 days.

(21) Appl. No.: 19/057,554

(22) Filed: Feb. 19, 2025

(65) Prior Publication Data

US 2025/0193485 A1 Jun. 12, 2025

Related U.S. Application Data

(63) Continuation of application No. PCT/EP2024/054847, filed on Feb. 26, 2024.

(30) Foreign Application Priority Data

| | | |
|---|---|---|
| Feb. 27, 2023 | (CN) | 202310180496.4 |
| Mar. 24, 2023 | (CN) | 202310300886.0 |
| Apr. 28, 2023 | (CN) | 202310484137.8 |

(51) Int. Cl.
*H04N 21/434* (2011.01)

(52) U.S. Cl.
CPC ............................... *H04N 21/4348* (2013.01)

(58) Field of Classification Search
CPC .......... H04N 21/4348; H04N 21/4345; H04N 21/4405; H04N 21/4384
(Continued)

(56) References Cited

U.S. PATENT DOCUMENTS 7,590,059 B2 * 9/2009 Gordon .................. H04N 19/42 370/230
8,351,499 B2 * 1/2013 Elangovan .............. H04N 5/44 375/240.26
(Continued)

FOREIGN PATENT DOCUMENTS

CN 112995134 A 6/2021

OTHER PUBLICATIONS

The World Intellectual Property Organization (WIPO) International Search Report for PCT/EP2024/054847 May 3, 2024 2 Pages.

*Primary Examiner* — Adil Ocak
(74) *Attorney, Agent, or Firm* — ANOVA LAW GROUP, PLLC

(57) ABSTRACT

The disclosure provides a display apparatus and a method. In response to a first command from a user, the display apparatus can obtain media data of a target channel and execute a first process and a second process in parallel. The first process can include demultiplexing the data segment to obtain ES data and obtaining first metadata information according to the encryption data and first ES data. The second process can include predicting second metadata information according to the attribute parameter and the encryption data. Based on that the second metadata information is generated before the first metadata information, the display apparatus can initialize a decoder according to the second metadata information, decode the ES data via the
(Continued)

initialized decoder to obtain decoded ES data, and display a program image of the target channel on the display according to the decoded ES data.

14 Claims, 27 Drawing Sheets

(58) Field of Classification Search
USPC .......................................................... 725/131
See application file for complete search history.

(56) References Cited

U.S. PATENT DOCUMENTS

| | | | | | |
|---|---|---|---|---|---|
| 8,885,729 | B2 * | 11/2014 | Wu | H04N 19/70 | 375/240.01 |
| 10,320,867 | B2 * | 6/2019 | Denoual | H04L 65/61 | |
| 2009/0323820 | A1 * | 12/2009 | Wu | H04N 19/44 | 375/E7.027 |
| 2015/0089023 | A1 * | 3/2015 | Phillips | H04L 65/1089 | 709/219 |
| 2016/0142746 | A1 * | 5/2016 | Schuberth | H04N 21/236 | 725/31 |
| 2017/0272691 | A1 * | 9/2017 | Song | H04N 21/4363 | |
| 2021/0377330 | A1 * | 12/2021 | Trayanov | H04N 21/8456 | |

* cited by examiner

100

Obtaining the first key information from the first metadata information and the second key information from the second metadata information

S1301

Determining whether the first key information is consistent with the second key information

S1302

ATSC 3.0 Encoder (Encoder)
HEVC UHD (Ultra high definition video)
MPEG-H Audio (Audio)
ATSC 3.0 broadcast channel
HEVC UHD (Ultra high definition video)
MPEG-H Audio (English)
ATSC 3.0 broadband channel
MPEG-H Audio (French)
MPEG-H Audio (Portuguese)
MPEG-H Audio (German)
IP (Broadband)
Display apparatus ATSC 3.0 player

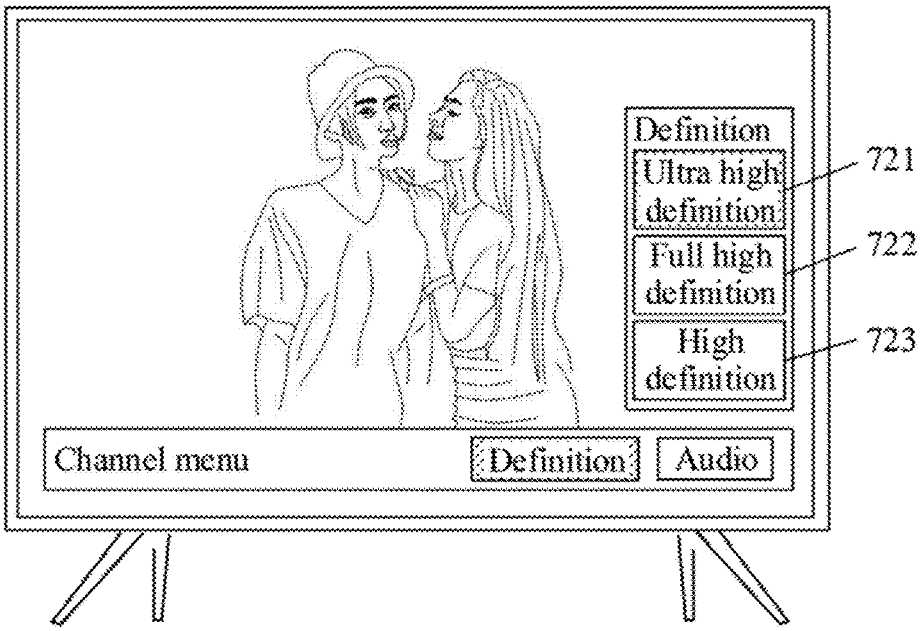

FIG. 21

Receiving a command to play the broadcast program — S2201

Calculating the universal time coordinated of the operator server — S2202

Receiving the first media data sent via the broadcast channel and storing the first media data in a first data queue, and receiving the second media data starting from the universal time coordinated sent via the broadband channel and storing the second media data in a second data queue — S2203

Determining a first synchronization time point based on data in the first data queue and the second data queue — S2204

Sending the frame data of the first synchronization time point in the first data queue and the second data queue to a decoder, so that the decoder can decode the frame data of the first synchronization time point — S2205

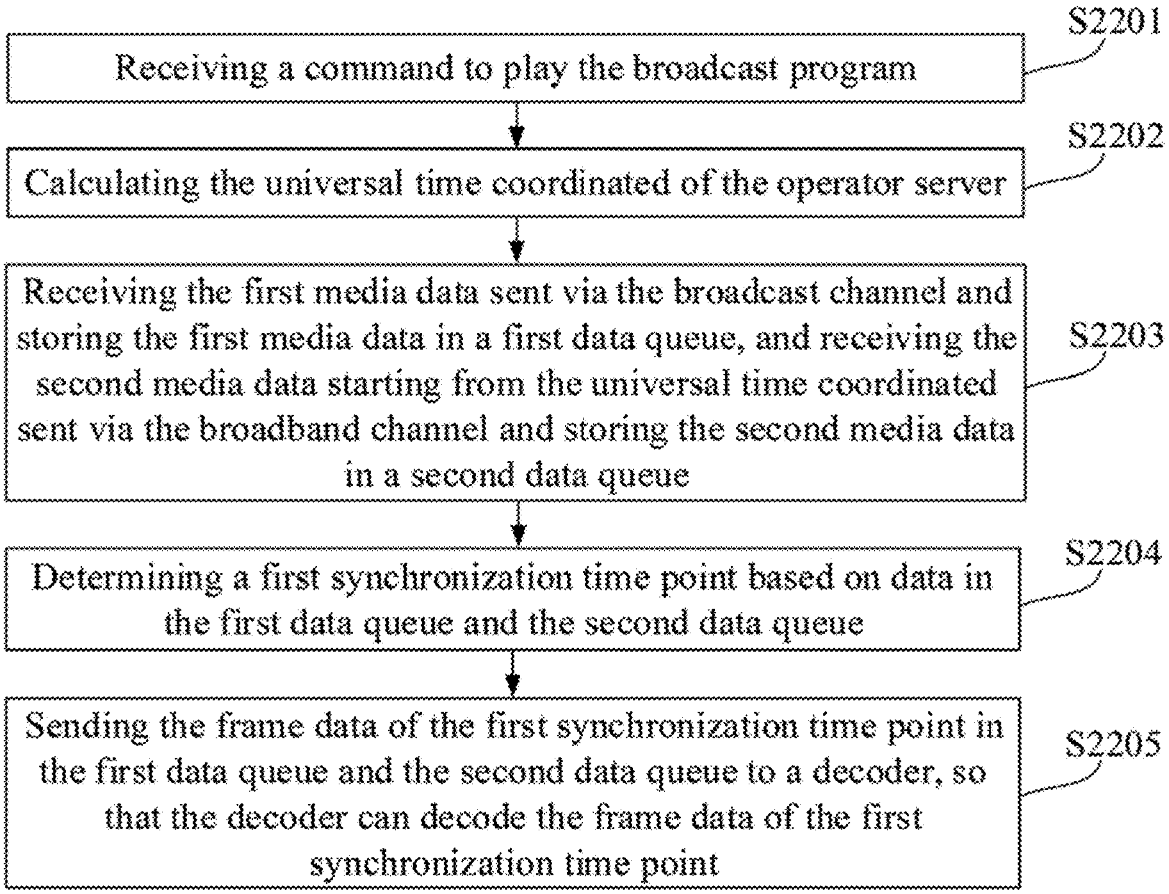

FIG. 22

Browser
Graphics processing unit
Player
Decoder
Display

Send rendering data of user interface
Inject coordinate data of video display
Send coordinate data
Render the user interface and draw a video window
Control the display to display the drawn user interface
Set a playing window according to coordinate data
Control the display to display the playing window

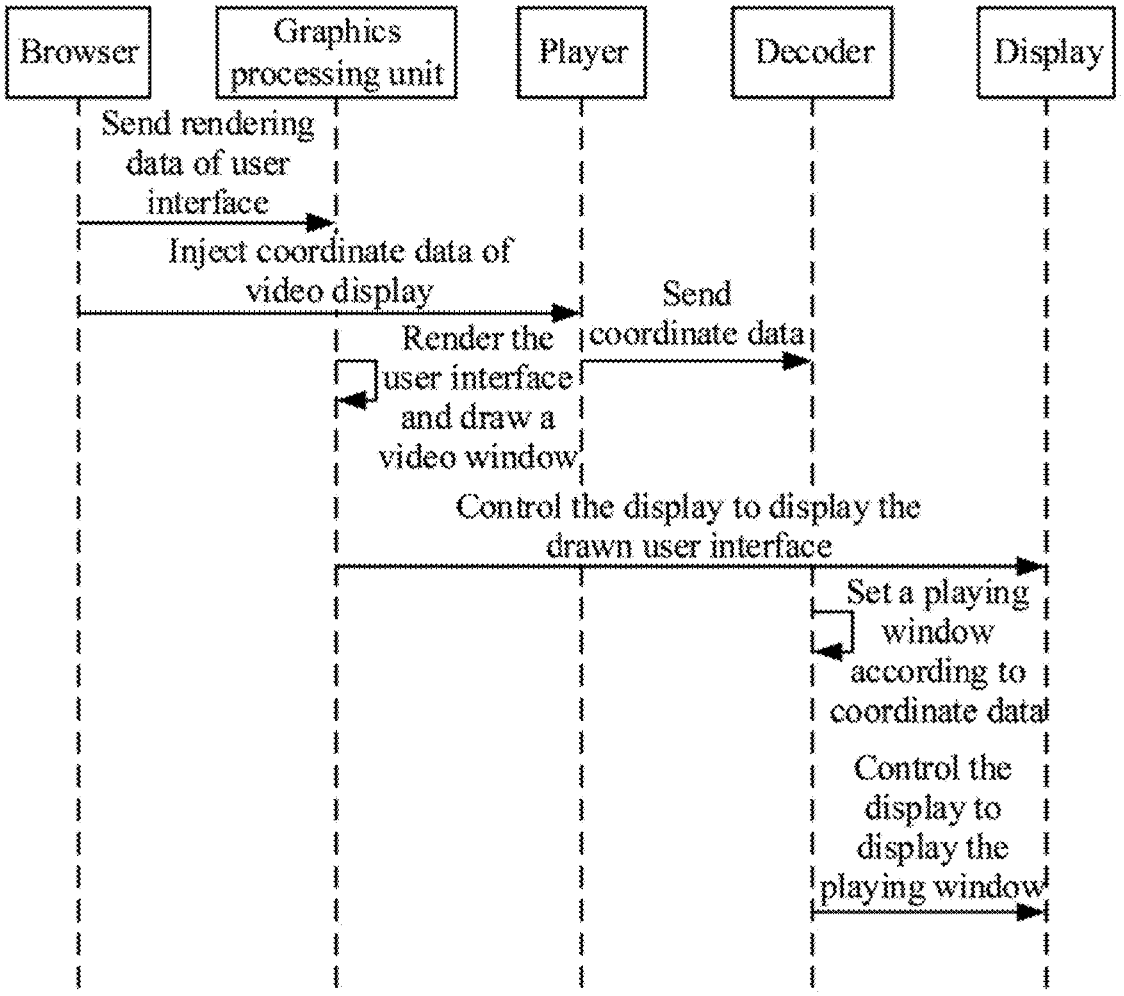

FIG. 31

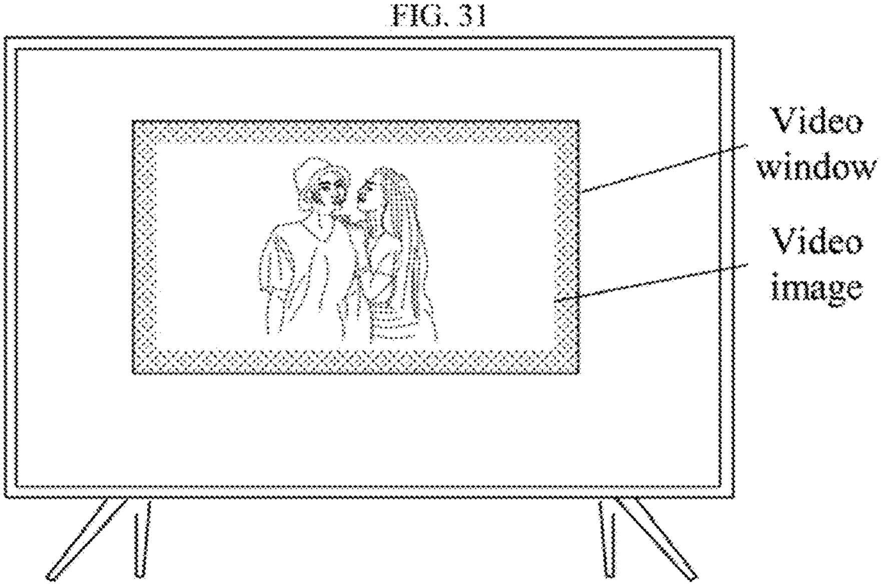

FIG. 32

1.0
Proportion parameter
y1
y1'
0
x1'
x1
1.0
Time coefficient

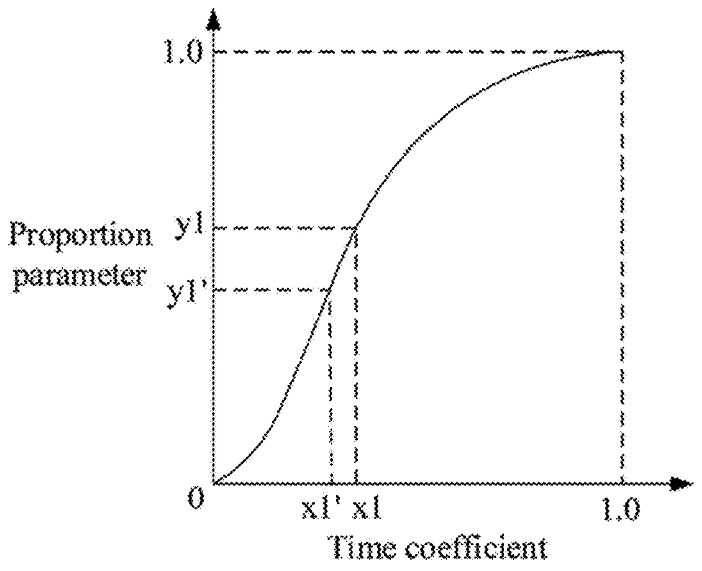

FIG. 41
Browser
Graphics processing unit
Middleware
Player
Decoder
Display
Send rendering data of user interface
Send coordinate data
Send coordinate data
Send coordinate data
Send target coordinate data
Calculate target coordinate data
Set a playing window according to coordinate data
Render the user interface and draw a target area based on the target coordinate data
Control the display to display the playing window
Control the display to display the drawn user interface

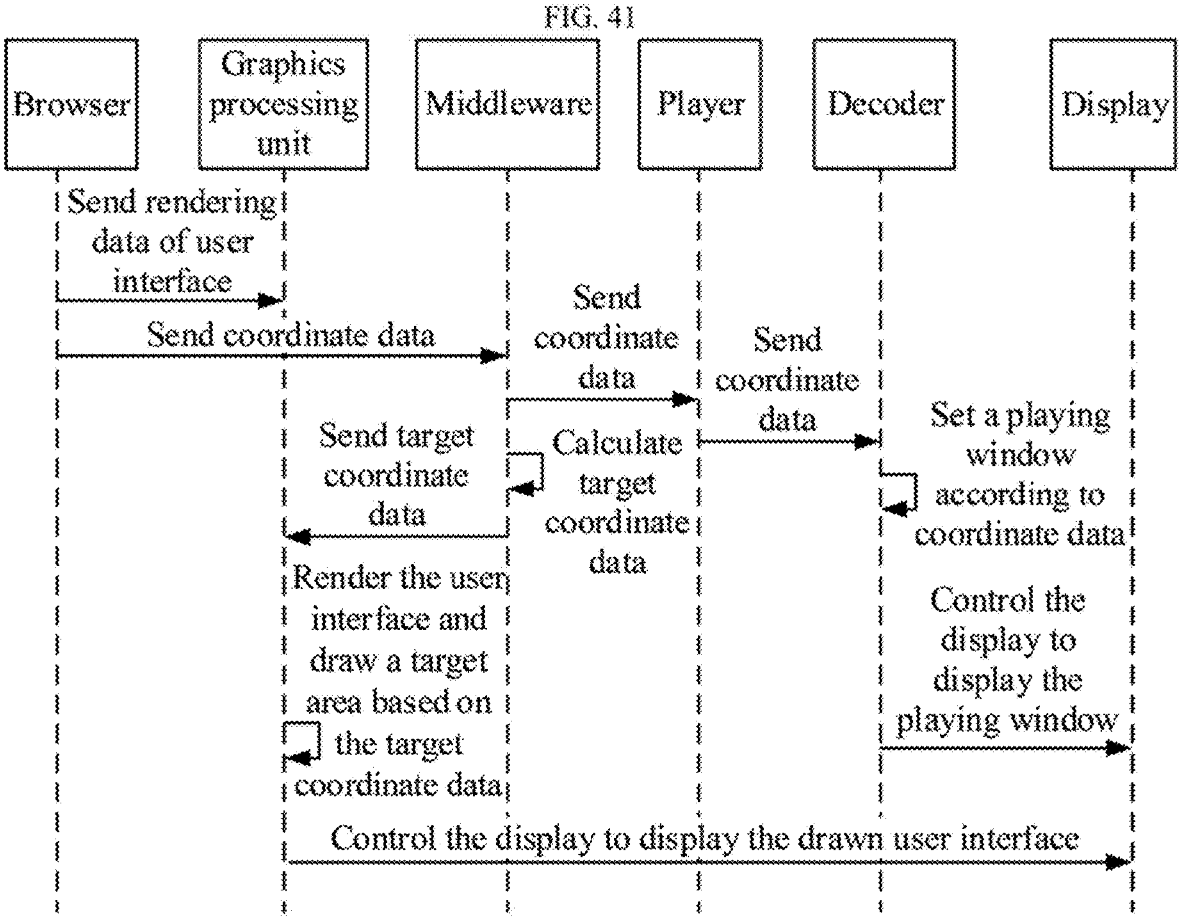

FIG. 42

DISPLAY APPARATUS AND METHOD

CROSS-REFERENCE TO RELATED APPLICATIONS

The application is a continuation application of International Application No. PCT/EP2024/054847, filed Feb. 26, 2024, which claims priorities to Chinese Patent Application No. 202310180496.4 filed on Feb. 27, 2023, Chinese Patent Application No. 202310300886.0 filed on Mar. 24, 2023, and Chinese Patent Application No. 202310484137.8 filed on Apr. 28, 2023. All of these applications are incorporated herein by reference in their entirety.

TECHNICAL FIELD

The disclosure relates to the technical field of display apparatuses, and particularly to a display apparatus and method.

BACKGROUND

The display apparatus refers to a device that can output a display image, and may be a smart TV, a mobile terminal, a smart commercial screen, a projector and other terminal device. Taking a TV set as an example, the TV set is a television product that is based on the Internet application technology, has an open operating system and chip, possesses an open application platform, is capable of realizing the two-way human-computer interaction function, and integrates various functions such as audio and video, entertainment and data; and is capable of meeting the diversified and personalized requirements of users.

While playing a program, the display apparatus executes the display process for the program. The display process may include: demultiplexing the media data of a channel corresponding to the program to obtain the Elementary Stream (ES) data, obtaining the metadata information based on the ES data, initializing a decoder based on the metadata information to start the decoder, decoding the ES data via the decoder, and rendering and displaying a program image based on the decoded ES data. Here, the time from when the user inputs a command to control the display apparatus to play the program to the time when the display apparatus displays the program image may be called the start time for playing, that is, the time taken by the above-mentioned display process. As may be seen, if the display apparatus takes too much time to execute the display process of the program, the efficiency of starting to play the program will be reduced, so that the user needs to wait for a long time to see the program image after inputting the command for playing the program, and the user experience is relatively low.

SUMMARY

Some embodiments of the disclosure provide a display apparatus, including a display and at least one processor connected with the display. The at least one processor is configured to execute computer instructions to cause the display apparatus to: in response to a first command from a user, obtain media data of a target channel; where the media data may include an index file and a data segment, and the index file may include an attribute parameter and encryption data; execute a first process and a second process in parallel, where the first process may include demultiplexing the data segment to obtain ES data and obtaining first metadata information for describing attribute of the data segment according to the encryption data and first ES data, and the second process may include predicting second metadata information for describing attribute of the data segment according to the attribute parameter and the encryption data; based on that the second metadata information is generated before the first metadata information, initialize a decoder according to the second metadata information; decode the ES data via the initialized decoder to obtain the decoded ES data; and display a program image of the target channel on the display according to the decoded ES data.

Some embodiments of the disclosure further provide a program playing method for a display apparatus, which may include: in response to a first command from a user, obtaining media data of a target channel, where the media data may include an index file and a data segment, and the index file may include an attribute parameter and encryption data; executing a first process and a second process in parallel, where the first process may include demultiplexing the data segment to obtain ES data and obtaining first metadata information for describing attribute of the data segment according to the encryption data and first ES data, and the second process may include predicting second metadata information for describing attribute of the data segment according to the attribute parameter and the encryption data; based on that the second metadata information is generated before the first metadata information, initializing a decoder according to the second metadata information; decoding the ES data via the initialized decoder to obtain the decoded ES data; and displaying the program image of the target channel on a display of the apparatus according to the decoded ES data.

Some embodiments of the disclosure provide a display apparatus, which may include: a display; and at least one processor configured to execute computer instructions to cause the display apparatus to: in response to a command to play a broadcast program, calculate universal time coordinated of an operator server; receive first media data sent via a broadcast channel and store the first media data in a first data queue, and receive second media data starting from the universal time coordinated sent via a broadband channel and store the second media data in a second data queue, where the first media data and the second media data have different media types, and the media types may include audio and video; determine a first synchronization time point based on data in the first data queue and the second data queue; and send frame data of the first synchronization time point in the first data queue and the second data queue to a decoder, so that the decoder can decode the frame data of the first synchronization time point.

Some embodiments of the disclosure provide a method for playing a broadcast program, which may include: in response to a command to play a program, calculating universal time coordinated of an operator server; receiving first media data sent via a broadcast channel and store the first media data in a first data queue, and receiving second media data corresponding to the universal time coordinated sent via a broadband channel and store the second media data in a second data queue, where the first media data and the second media data have different media types, and the media types may include audio and video; determining a first synchronization time point based on data in the first data queue and the second data queue; and sending frame data of the first synchronization time point in the first data queue and the second data queue to a decoder, so that the decoder can decode the frame data of the first synchronization time point.

Some embodiments of the disclosure provide a display apparatus, which may include: a display displaying a first user interface on a user interface layer; and at least one processor configured to execute computer instructions to cause the display apparatus to: receive coordinate data, where the coordinate data is coordinate data of a display position of media data; draw a target area at a position corresponding to the coordinate data in the first user interface to obtain a second user interface, where the target area is in a transparent state; calculate a delay duration based on an initial delay value, a termination delay value and a delay step size after detecting that the currently received coordinate data is different from last coordinate data; display the second user interface on the user interface layer on the display after the delay duration; and draw a playing window on a video layer based on the coordinate data, where the playing window is used to play the media data; and display the playing window on the video layer on the display, where the video layer is provided below the user interface layer.

Some embodiments of the disclosure provide a display apparatus, which may include: a display displaying a first user interface on a user interface layer; and at least one processor configured to execute computer instructions to cause the display apparatus to: receive coordinate data, where the coordinate data is coordinate data of a display position of media data; calculate target coordinate data based on the currently received coordinate data, start position coordinate data, end position coordinate data, a preset time coefficient and a preset cubic Bezier curve after detecting that the currently received coordinate data is different from last coordinate data; draw a target area at a position corresponding to the target coordinate data in the first user interface to obtain a second user interface, where the target area is in a transparent state; display the second user interface on the user interface layer on the display; and draw a playing window on a video layer based on the coordinate data, where the playing window is used to play the media data; and display the playing window on the video layer on the display, where the video layer is provided below the user interface layer.

Some embodiments of the disclosure provide a method for displaying media data, which may include: receiving coordinate data, where the coordinate data is coordinate data of a display position of media data; drawing a target area at a position corresponding to the coordinate data in the first user interface to obtain a second user interface, where the target area is in a transparent state; calculating a delay duration based on an initial delay value, a termination delay value and a delay step size after detecting that the currently received coordinate data is different from last coordinate data; displaying the second user interface on the user interface layer after the delay duration; and drawing a playing window on a video layer based on the coordinate data, where the playing window is used to play the media data; and displaying the playing window on the video layer, where the video layer is provided below the user interface layer.

Some embodiments of the disclosure provide a method for displaying media data, which may include: receiving coordinate data, where the coordinate data is coordinate data of a display position of media data; calculating target coordinate data based on the currently received coordinate data, start position coordinate data, end position coordinate data, a preset time coefficient and a preset cubic Bezier curve after detecting that the currently received coordinate data is different from last coordinate data; drawing a target area at a position corresponding to the target coordinate data in the first user interface to obtain a second user interface, where the target area is in a transparent state; displaying the second user interface on the user interface layer; and drawing a playing window on a video layer based on the coordinate data, where the playing window is used to play the media data; and displaying the playing window on the video layer, where the video layer is provided below the user interface layer.

BRIEF DESCRIPTION OF FIGURES

FIG. 21 shows a schematic diagram of another definition selection submenu according to some embodiments of the disclosure.

FIG. 22 shows a flow chart of a method of playing a broadcast program according to some embodiments of the disclosure.

FIG. 31 shows a timing diagram of a first video scaling process according to some embodiments of the disclosure.

FIG. 32 shows a schematic diagram of a video scaling interface according to some embodiments of the disclosure.

FIG. 41 shows a schematic diagram of a cubic Bezier curve according to some embodiments of the disclosure.

FIG. 42 shows a timing diagram of a third video scaling process according to some embodiments of the disclosure.

DETAILED DESCRIPTION

Figure 1:
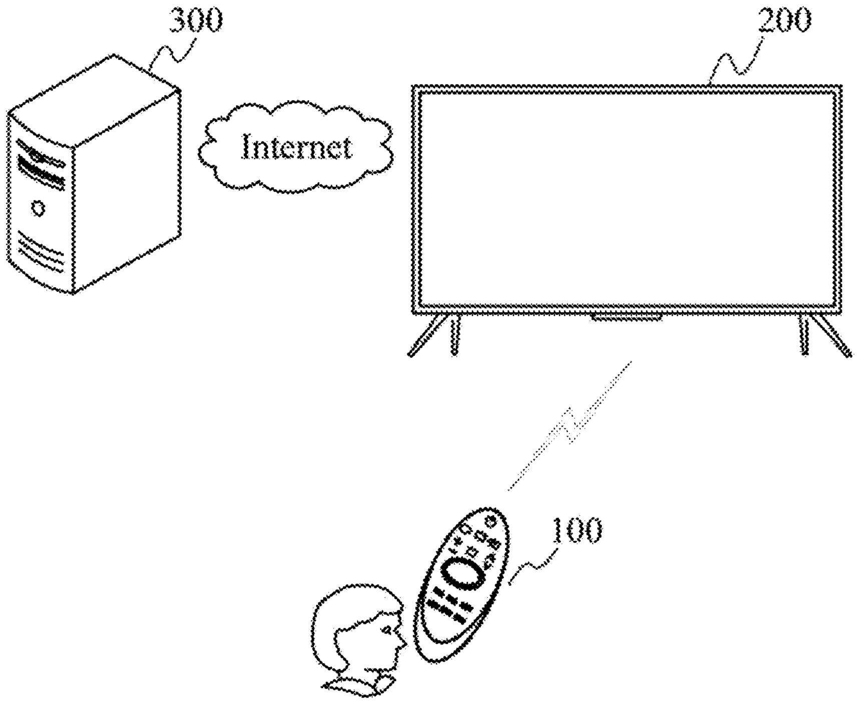
FIG. 1 shows a scenario for a display apparatus according to some embodiments of the disclosure.

The embodiments will be illustrated below in detail, and the examples thereof are represented in the drawings. When the following description relates to the drawings, the same numbers represent the same or similar elements in the different drawings, unless otherwise indicated. The implementations described in the following embodiments do not represent all the implementations consistent with the disclosure, and are merely examples of systems and methods consistent with some aspects of the disclosure as recited in the claims.

It should be noted that the brief description of the terms in the disclosure is only for the convenience of understanding the embodiments described hereafter, and is not intended to limit the embodiments of the disclosure. Unless otherwise indicated, these terms should be understood according to the plain and ordinary meanings.

The terms "first", "second", "third" and the like in the specification and claims as well as the above drawings in the disclosure are used to distinguish similar or homogeneous objects or entities, but not necessarily meant to limit a particular order or sequence, unless otherwise indicated. It should be understood that the terms so used are interchangeable under appropriate circumstances.

Figure 2:
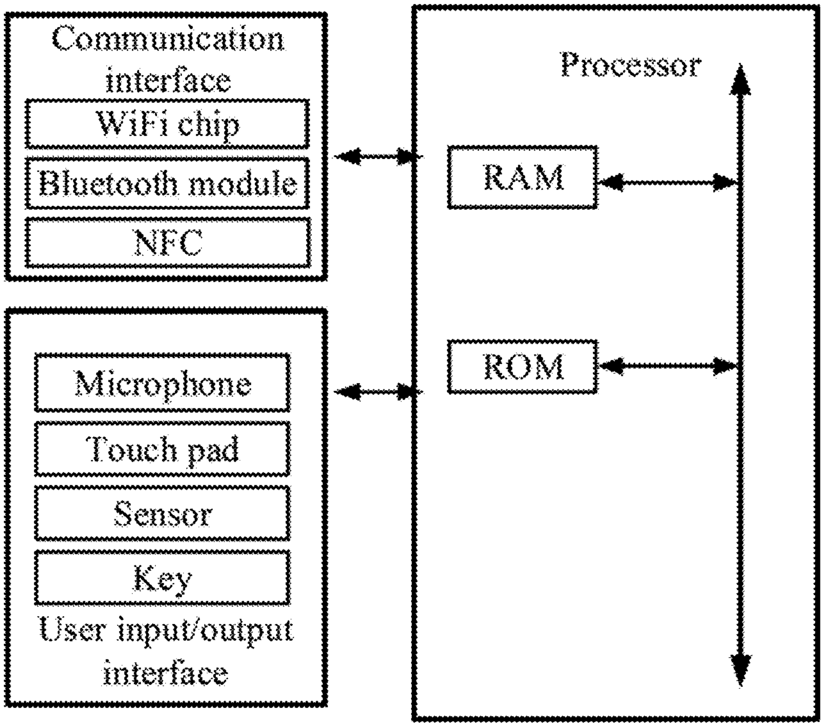
FIG. 2 shows a configuration block diagram of a control device according to some embodiment of the disclosure.

The display apparatus provided in the embodiments of the disclosure may have various implementation forms, for example, may be a smart TV, a laser projection device, a monitor, an electronic bulletin board, an electronic table, etc.; or may be a mobile phone, a tablet, a smart watch, or other device with a display screen. FIG. 1 and FIG. 2 show embodiments of the display apparatus of the disclosure.

FIG. 1 shows a schematic diagram of a scenario for the display apparatus according to some embodiments of the disclosure. As shown in FIG. 1, a user may operate a display apparatus 200 via a control device 100, and the display apparatus 200 may obtain the network data via a server 300 or obtain a live broadcast signal via a satellite.

FIG. 2 shows a configuration block diagram of the control device 100. In some embodiments, the control device 100 may be a remote control, and can communicate with the display apparatus 200 through at least one of infrared protocol communication, Bluetooth protocol communication or other short-range communication methods, to control the display apparatus 200 through wireless or other wired methods. The user may input user commands through keys, voice input and control panel input on the remote control, to control the display apparatus 200.

Figure 3:
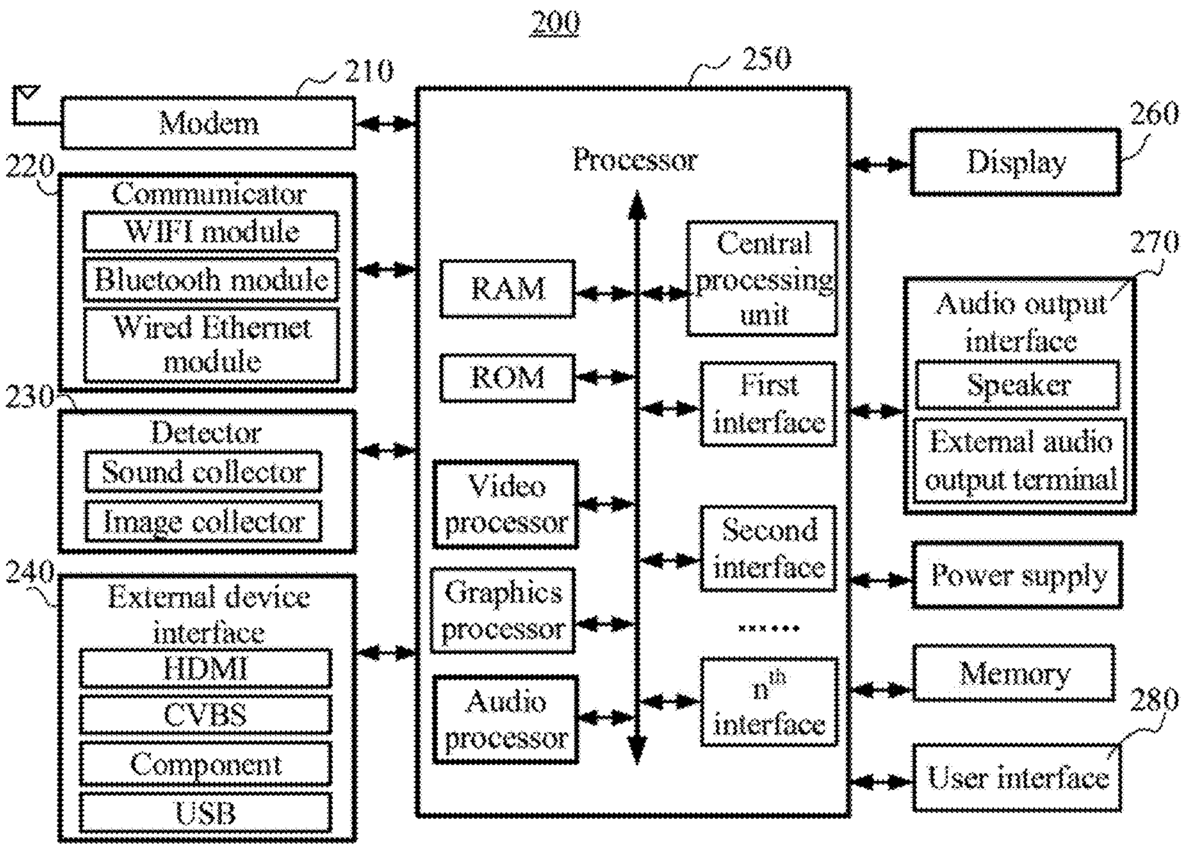
FIG. 3 shows a configuration diagram of a display apparatus according to some embodiment of the disclosure.

FIG. 3 shows a configuration block diagram of the display apparatus 200 according to some embodiments of the disclosure.

The display apparatus 200 may include at least one of a modem 210, a communicator 220, a detector 230, an external device interface 240, processor(s) 250, a display 260, an audio output interface 270, a memory, a power supply, and a user interface 280.

In some embodiments, the display apparatus 200 may establish the sending and receiving of control signals and data signals with the control device 100 or the server 400 through the communicator 220. In some embodiments, the processor 250 and the modem 210 may be located in different separate devices, that is, the modem 210 may also be located in an external device (such as an external set-top box, etc.) of the main device where the processor 250 is located. In some embodiments, the processor 250 controls the operations of the display apparatus and responds to the user's operations through various software control programs stored in the memory. The processor 250 controls the overall operation of the display apparatus 200.

In some embodiments, the processor 250 may include at least one of a Central Processing Unit (CPU), a video processor, an audio processor, a Graphics Processing Unit (GPU), an RAM (Random Access Memory), an ROM (Read-Only Memory), first to $n^{th}$ interfaces for input/output, a communication bus (Bus), etc. In some embodiments, the display 260 includes: a screen component for presenting an image, a driver component for driving the image display, a component for receiving an image signal from the processor 250 to display video content and image content as well as a menu control interface, and a user control UI interface. In some embodiments, the display 260 may be a liquid crystal display, an OLED display or a projection display, or may be a projection device and a projection screen. In some embodiments, the user may input a user command on a Graphic User Interface (GUI) displayed on the display 260, and the user input interface can receive the user input command through the GUI. Alternatively, the user may input a user command by inputting particular sound or gesture, and the user input interface recognizes the sound or gesture through the sensor to receive the user input command. In some embodiments, the "user interface" is a medium interface for interaction and information exchange between applications or operating systems and users. It realizes the switch between the internal form of information and the form acceptable to users.

Figure 4:
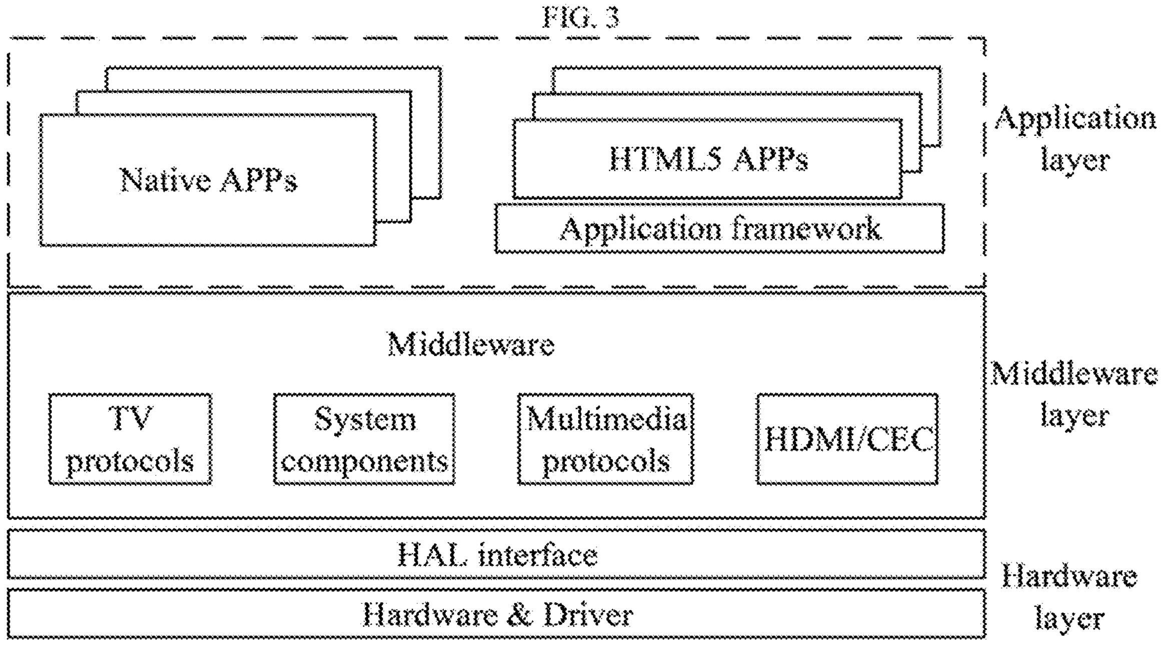
FIG. 4 shows a configuration diagram of an operating system of the display apparatus according to some embodiment of the disclosure.

In some other embodiments, the display apparatus 200 is based on the VIDAA software platform, as shown in FIG. 4. The operating system based on the Linux platform is divided into three layers, which are respectively an application layer, a middleware layer and a hardware layer from top to bottom. Here, the application layer may include various types of applications and application frameworks. The middleware layer may include various protocols and components. The hardware layer may include various interfaces as well as hardware and drivers.

Figure 5:
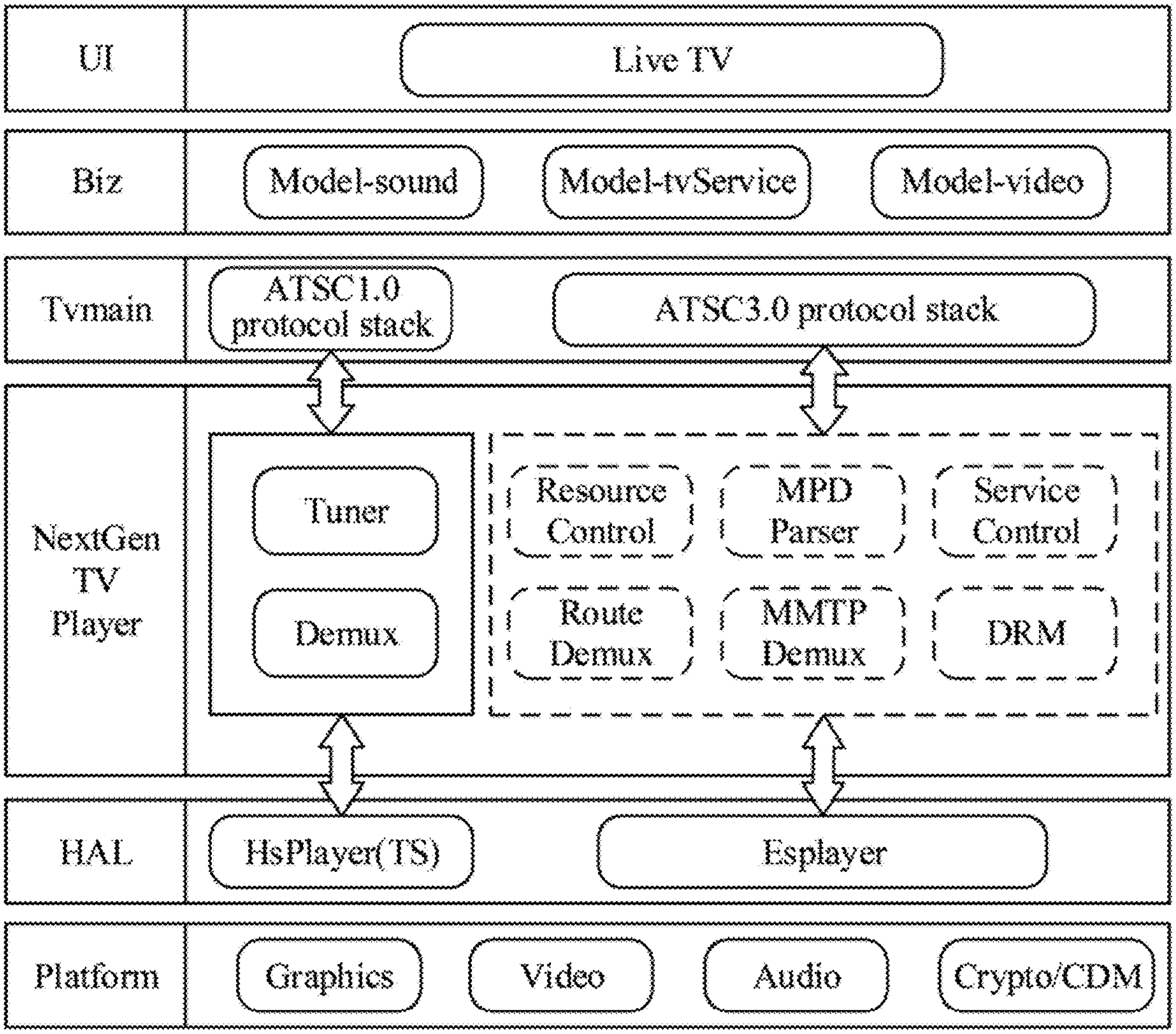
FIG. 5 shows a schematic diagram of a framework of a NextGen TV player according to some embodiments of the disclosure.

The display apparatus 200 plays a program through a player. Here, the player may be an ES player, such as a NextGen TV player based on the Advanced Television Systems Committee (ATSC) protocol. The display apparatus 200 is a TV and the player is a NextGen TV player as an example for illustration. The framework of the NextGen TV player may be referred to FIG. 5. According to the operating system of the display apparatus 200, the framework of the NextGen TV player may be divided into three layers, namely NextGen TV Player, HAL layer and platform layer.

Here, the NextGen TV Player is a module where the player is located. The NextGen TV Player may include a Tuner, a demultiplexer (Demux), a Resource Control module, a Media Presentation Description (MPD) file Parser module, a Service Control module, a Route Demux, a Multi Media Terminao Protocol (MMTP) Demux, and a Digital Rights Management (DRM) module.

The NextGen TV Player is implemented in the TV main process (Tvmain) or TV service (TvService) process. The Tvmain may include: broadcast protocol stack. The broadcast protocol stack can implement the functions of the player through a standard interface. The broadcast protocol stack may be divided into ATSC1.0 protocol stack management control module (ATSC1.0 protocol stack) and ATSC3.0 protocol stack management control module (ATSC3.0 protocol stack) based on functions. Here, the ATSC1.0 protocol stack management control module is used to control the channel search, frequency locking and other functions of the tuner, and transmit the Transport Stream (TS) data to the demultiplexer to demultiplex the Packetised Elementary Streams (PES) data. The ATSC3.0 protocol stack management control module is used for resource management and sending the protocol stack data to the demultiplexer for demultiplexing to obtain the ES data.

The Tvmain connects upward with the Business logic (BIZ) layer and UI layer. Here, the BIZ layer may include a sound model (Model-sound), a tvService model (Model-tvService), and a video model (Model-video). The UI layer may include a Live TV.

The HAL layer is used to implement the TS/ES playing function. The HAL layer may include: TS player (TSPlayer) and ES player (ESPlayer).

The platform layer is where the solution provider's process is located, and the solution provider provides support for bottom-level driver. The platform layer may include: a Graphics module, a Video module, an Audio module and a Crypto/Content Decryption Module (CDM).

Figure 6:
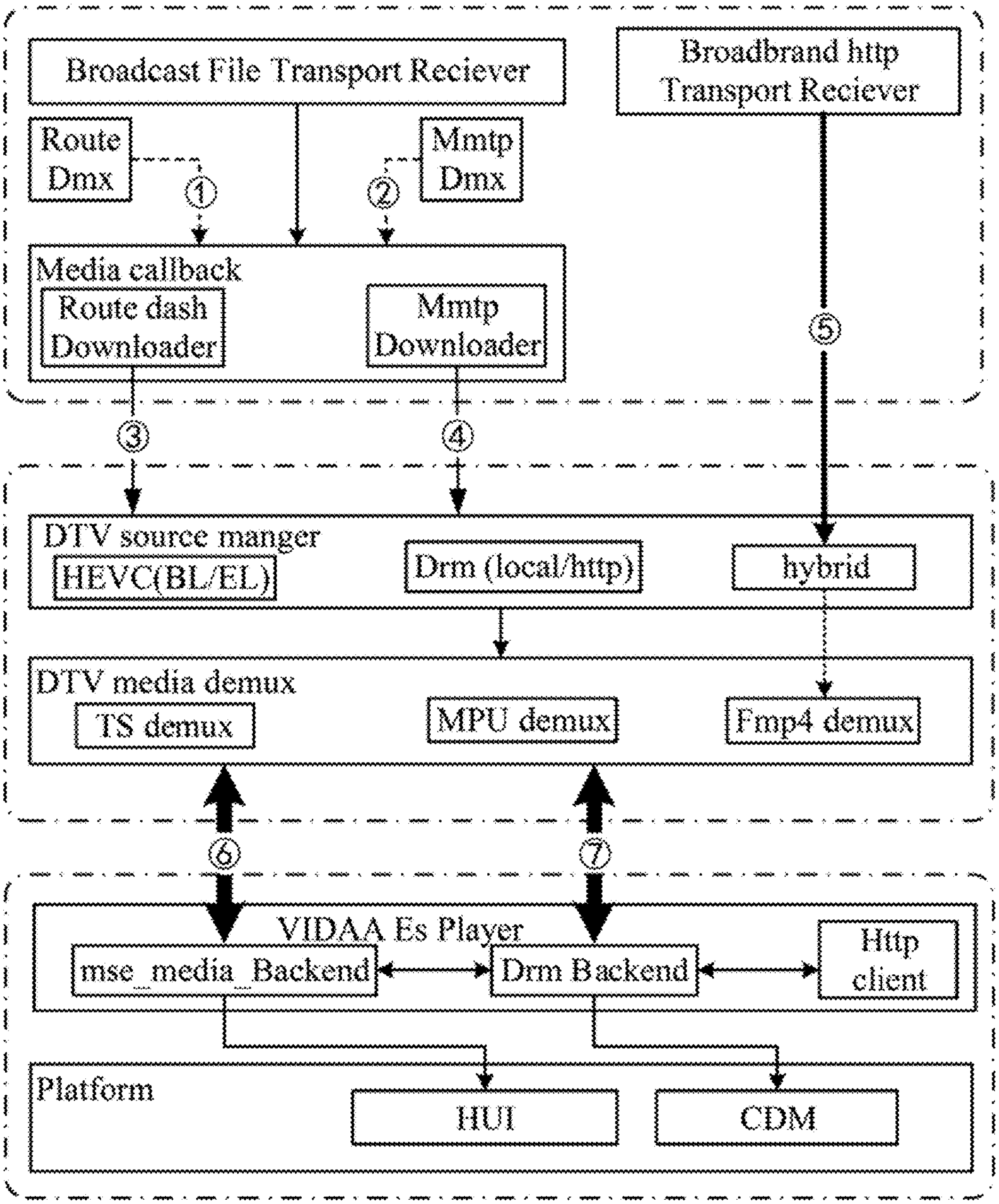
FIG. 6 shows a schematic diagram illustrating works of various modules in the framework of NextGen TV Player according to some embodiments of the disclosure.

FIG. 6 shows a schematic diagram of the works of modules in the framework of NextGen TV Player according to some embodiments of the disclosure. Combined with FIGS. 5 and 6, the top of the framework of the NextGen TV Player is connected with the broadcast protocol stack ATSC1.0/ATSC3.0 or the application layer (RMP), and the bottom of the framework is connected with a framework interface of VIDAA ESPlayer.

Here, the framework of NextGen TV Player may include a Digital Television (DTV) source management module (DTV source manager) and a DTV media demultiplexing module.

The DTV source management module is used to coordinate the source switch process with external modules. The DTV source management module may include a High Efficiency Video Coding (HEVC) module, a DRM module, and a data reception (Hybrid) module. The HEVC module provides Base Layer (BL)/Enhance Layer (EL), and the HEVC module is used to demultiplex the HEVC layered data and encapsulate the ES data. The DRM module is based on the Local protocol/Hyper Text Transfer Protocol (HTTP) protocol. The Hybrid module is responsible for hybrid reception and synchronous demultiplexing of broadcast data and broadband data.

The DTV media demultiplexing module may include a TS demultiplexing module, a Microprocessor Unit (MCU) demultiplexing module, and an Fmp4 demultiplexing module.

The DTV source management module can obtain the ATSC3.0 broadcast data (received via Broadcast File Transport Receiver) through the Route dash Downloader and MMTP Downloader in the Media callback. Here, the ROUTE data in the ATSC3.0 broadcast data is called back to the ROUTE DASH downloader through path ①, where the path ① is for creating a session/adding a Layered Coding Transport (LCT) channel for the Route Dmx module. The MMTP data in the ATSC3.0 broadcast data is called back to the MMTP downloader through path ②, where the path ② is for creating a session for the MMTP Dmx module.

The ROUTE DASH downloader can transfer the ROUTE data to the DTV source management module through path ③, where the path ③ is for feeding mpd/dash segments. Then the DTV source management module can transfer the ROUTE data to the DTV media demultiplexing module for demultiplexing. The MMTP downloader can transfer the MMTP data to the DTV source management module through path ④, where the path ④ is for feeding mpu playable data. Then the DTV source management module can transfer the MMTP data to the DTV media demultiplexing module for demultiplexing.

The Route Dash data received through the network (Broadband http Transport Receiver) is directly transmitted to the Hybrid module through path ⑤, where the path ⑤ is implemented based on Http<broadbrand url>. Then the Hybrid module passes the Route Dash data to the Fmp4 demultiplexing module for demultiplexing.

The VIDAA ESPlayer framework may include: an MES media backend module, a DRM backend module and an Http client. The MES media backend module is used to request the ES data generated by the demultiplexing module, complete the function of synchronously injecting audio/video into the decoder, and call various interfaces of the HUI decoder provided by the platform layer, such as the init/deinit/inject_es_data/play/pause/resume and other interfaces of the decoder. The data is transferred between the DTV media demultiplexing module and the MES media backend module through path ⑥, where the path ⑥ is for pulling the ES data.

The DRM backend module is used to provide a standard DRM network interaction interface, parse out the standard DRM decryption information, encapsulate the encrypted information and ES data together, and inject them into the decoder for decoding. The data is transferred between the DTV media demultiplexing module and the DRM backend module through path ⑦, where the path ⑦ is for creating a DRM session.

The Http client can be used for network interactive verification/request with an encrypted key.

The platform layer may include a Human User Interface (HUI) and a Content Description Module (CDM).

Figure 7:
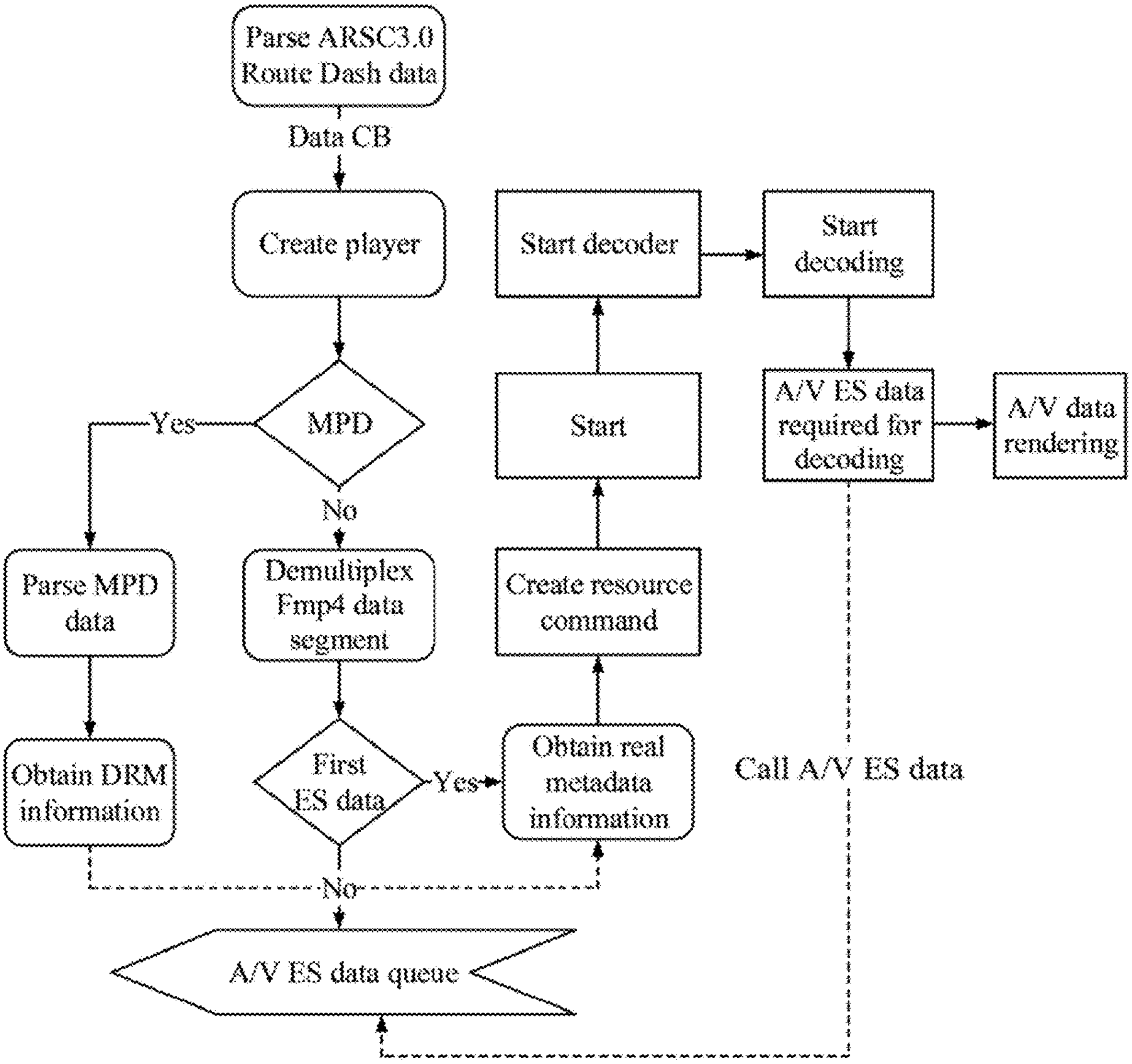
FIG. 7 shows a schematic diagram of a first display process of the display apparatus to play a program according to some embodiments of the disclosure.

While playing a program, that is, media data (including audio media segment and/or video media segment), the display apparatus 200 executes a display process of a program image (for ease of distinction, referred to as a first display process). The first display process may include: demultiplexing the media data of a channel corresponding to the program to obtain the ES data, obtaining the metadata information based on the ES data, initializing a decoder by using the metadata information to start the decoder, decoding the ES data via the decoder, and rendering and displaying the program image based on the decoded ES data. The display apparatus 200 can receive and decode the Route Dash data in the ATSC3.0 broadcast data as an example for illustration, referring to the process shown in FIG. 7. After receiving the Route Dash data, the display apparatus 200 can parse the Route Dash, manage the data instance (data CB), create a player, and determine whether the Route Dash data is MPD data. If the Route Dash data is MPD data, the MPD data is parsed to obtain the DRM information; if the DRM information is an encrypted stream, the obtained DRM information is directly sent to the DRM module for interactive verification and other tasks. If the Route Dash data is not MPD data but data segments (Dash Media Segments), the Fmp4 data segments may be directly sent to the demultiplexing module for demultiplexing to obtain the ES data. If the ES data is first ES data, the metadata information may be obtained based on the first ES data. This metadata information is the real metadata information of the ES and is used to initialize the decoder. If the ES data is not first ES data, the ES data is written into an Audio/Video (A/V) ES data queue in a media file. A resource (source) instruction for reading metadata information is created, the decoder is started through a start (play) instruction, and the read metadata information is used to start and initialize the decoder. The display apparatus 200 starts the process of decoding the ES data via the initialized decoder. The decoder can call the A/V ES data queue in the media file and starts decoding the A/V ES data. The display apparatus 200 can render the program image based on the decoded A/V data, and display the program image.

In the above-mentioned first display process, the steps are executed serially. The time from when the user inputs a command to control the display apparatus to play the program to the time when the display apparatus displays the program image may be called the playing start time. It may be seen that the playing start time of the program in the first display process is at least equal to the total duration of serial execution of the respective steps.

Figure 8:
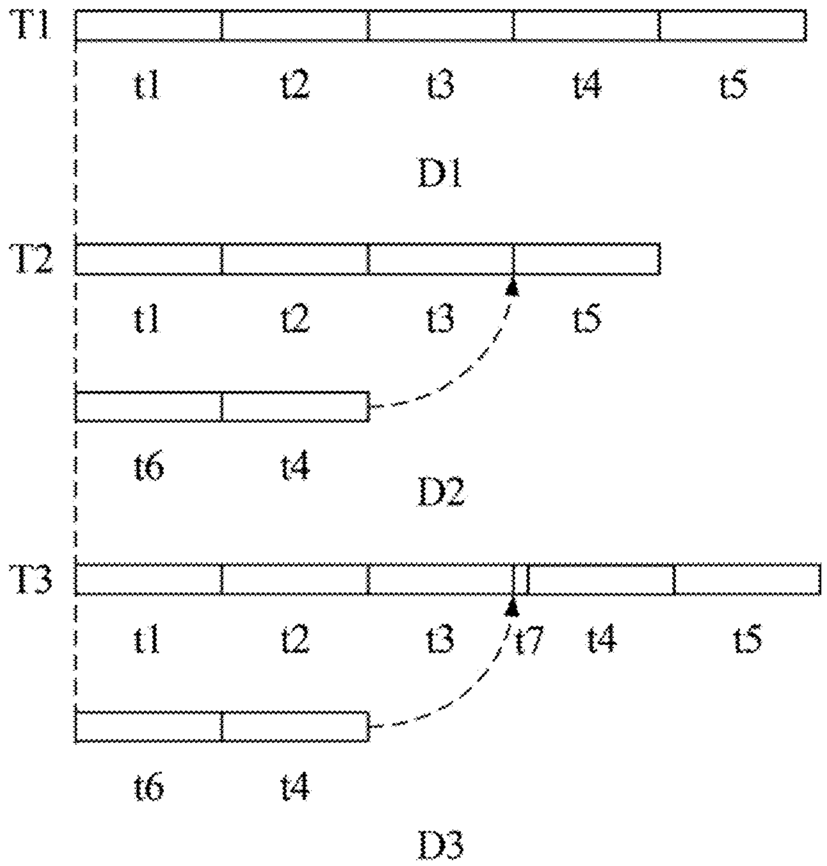
FIG. 8 shows a schematic diagram of the start time for playing a program of the display apparatus according to some embodiments of the disclosure.

Taking the schematic diagram of the playing start time shown by D1 in FIG. 8 as an example, and starting from the time when the display apparatus 200 can receive the Route Dash data, if the display apparatus 200 identifies the data type of the Route Dash data in t1 seconds, demultiplexes the data segment to obtain the first ES data in t2 seconds, can obtain the metadata information based on the first ES data in t3 seconds, takes t4 seconds from obtaining the metadata information to completing the initialization of the decoder using the metadata information, and takes t5 seconds to use the initialized decoder to decode the ES data and render the program image, then the playing start time of the program in the first display process is T1=(t1+t2+t3+t4+t5) seconds.

For the program data from a live broadcast source, for example, in ATSC3.0 broadcast scenario, displaying the program image in the first display process has a very prominent impact on the playing start speed of the program. Usually, after the user inputs the command to control the display apparatus 200 to play the program, a waiting time of 1-2 seconds is required for displaying the program image of the new channel, and the user experience is relatively poor.

In view of the above issue, an embodiment of the disclosure provides a program playing method. In this method, a decoder is pre-started by predicting the metadata information before obtaining real metadata information, to shorten the waiting time for initializing the decoder, and thus shorten the playing start time of the program. The display apparatus to which this method is applied may be the display apparatus 200 as shown in FIG. 1, 3, 4, 5 or 6 or other display apparatus. The embodiment of the disclosure is described by taking the display apparatus 200 shown in FIG. 1, 3, 4, 5 or 6 as an example.

Figure 9:
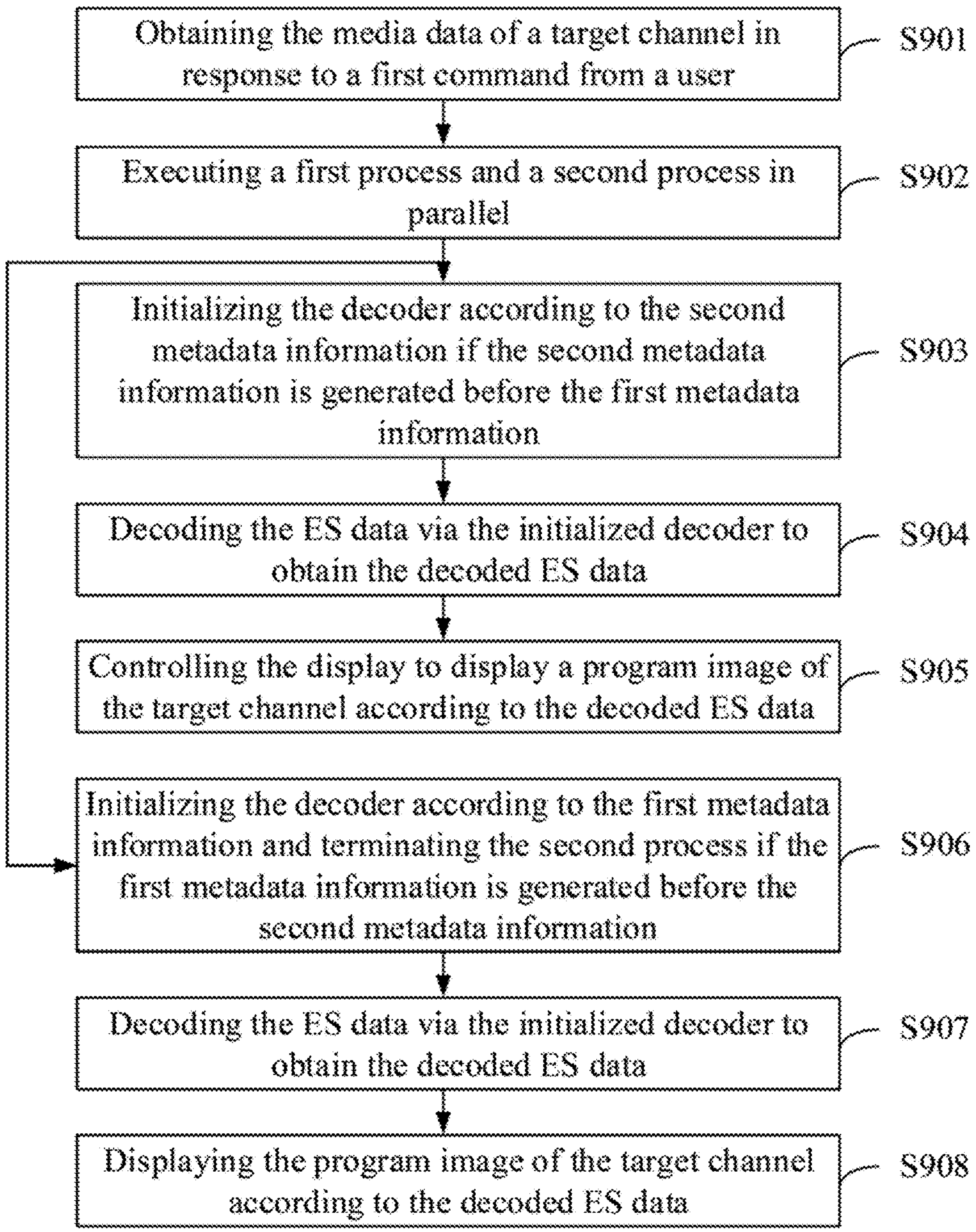
FIG. 9 shows a flow chart for the display apparatus to start to play a program according to some embodiments of the disclosure.

The display apparatus 200 can start to play a program according to the process shown in FIG. 9. The specific steps are as follows.

S901: obtaining media data of a target channel in response to a first command from a user.

The first command may be a power-on command or a channel switching command. Here, the power-on command may be input by the user based on the power-on key of the display apparatus 200 or the power key, standby key, etc. on the control device 100. The channel switching command may be input by the user based on the numeric key, up key, down key, shortcut key, etc. on the control device 100.

The target channel is a channel indicated by the first command. Here, if the first command is the power-on command, the target channel is a first channel displayed on the display apparatus 200, for example, a last channel displayed when powered on previously, a default channel displayed by the display apparatus 200 when powered on, etc. If the first command is the channel switching command, the target channel is a switched channel. For example, a current channel is channel 1, the channel switching command is sent based on the down key, and the target channel is channel 2.

The display apparatus 200 can obtain the media data of the target channel in response to the first command. The media data of the target channel may be streaming media data such as Route Dash, Dash, Maximum Segment Size (MSS), dynamic code rate adaptation technology (HTTP Live Streaming, HLS), etc. In these streaming media files, the data segments are managed by index files. Therefore, the media data of the target channel may include an index file and a data segment, and the index file may include an attribute parameter and encryption data. Here, the data segment is obtained through multiplexing, and the data may include audio data and video data. The index file is used to manage the data segment, and the index file may include characteristic information of the data segment, such as attribute parameters, encryption parameters, etc. The attribute parameters are used to describe attribute characteristics of the data segment, such as width and height of video, Multipurpose Internet Mail Extensions (MIME) type of video, MIME type of audio, sampling rate, channel information, extra data, etc. The encryption parameters are used to describe encryption characteristics of the data segment, such as encrypted, unencrypted, identity information, verification information, etc. The index file is obtained by the display device 200 before the data segment is obtained, so the display apparatus 200 can preferentially obtain the characteristic information of the data segment based on the index file.

Figure 10:
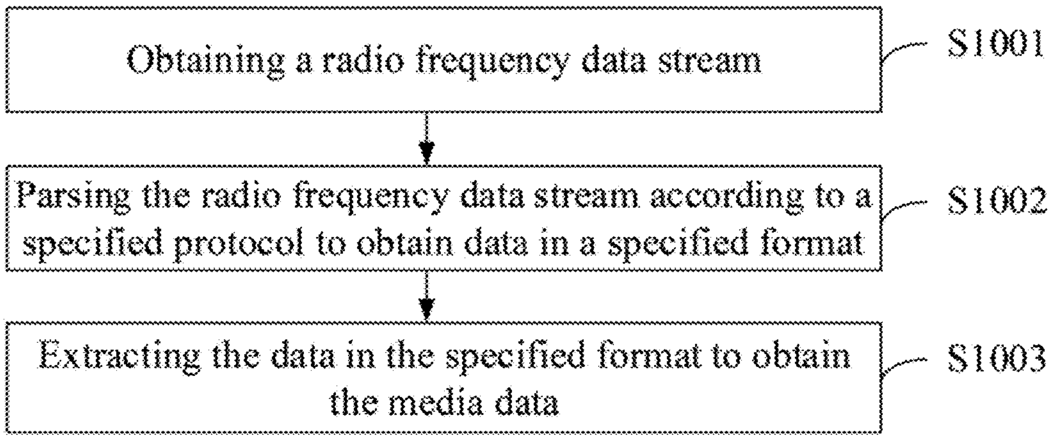
FIG. 10 shows a flow chart for obtaining media data of a target channel according to some embodiments of the disclosure.

The display apparatus 200 can obtain the media data of the target channel according to the process shown in FIG. 10. The specific steps are as follows.

S1001: obtaining a radio frequency data stream.

The media data of the target channel corresponds to Route Dash data as an example for illustration. The tuner scans according to a preset channel list, and locks the frequency after obtaining a signal to obtain the corresponding Radio Frequency (RF) data stream.

S1002: parsing the radio frequency data stream according to a specified protocol to obtain data in a specified format.

A baseband processing module can send a Physical Layer Pipe (PLP) packet in the radio frequency data stream to an ATSC3.0 protocol stack management module for preprocessing, and can send the signal (signaling) to a signal management module for parsing. Here, the Link Mapping Table (LMT) and Service List Table (SLT) are firstly parsed to obtain a Service Layer Signaling (SLS) from the LMT and SLT, and the SLS is parsed to obtain channel information, and the channel information is saved into a channel manager module. Then a signal filter is used to extract the User Service Bundle Description (USBD), MPD and/or Service-based Transmission Session Instance Description (S-TSID) from the SLS, and separately extract the audio, video, advertising data and characteristic information, to obtain the data in the specified format, such as audio, video, advertising data and characteristic information in Fmp4 format. These data is Route Dash data.

The index file and data segment in the media data may be distinguished based on the Transport Stream Interface (TSI) information. Here, if TSI=0, it is the index file. If TSI>0, it is the data segment.

S1003: extracting the data in the specified format to obtain the media data.

The parsed Route Dash data can be extracted and cached for further parsing.

The Route Dash data may be output by the callback function to a media player module, and the media player can be started. The Route Dash data is parsed. If TSI=0, it is the index file in the media data; if TSI>0, it is the data segment in the media data.

S902: executing a first process and a second process in parallel.

The first process may include: demultiplexing a data segment to obtain ES data, and obtaining first metadata information for describing attribute of the data segment according to encryption data and first ES data.

The second process may include: predicting second metadata information for describing the attribute of the data segment according to a attribute parameter and encryption data.

It may be seen that the first process is consistent with the process of obtaining the real metadata information of the data segment based on the first ES data in the first display process mentioned above. The second process is a process of predicting the real metadata information of the data segment before obtaining the first ES data (not based on the first ES data). Correspondingly, the first metadata information obtained through the first process is the real metadata information of the data segment, and the second metadata information obtained through the second process is a predicted value of the real metadata information of the data segment.

The display apparatus 200 may initialize the decoder using the second metadata information predicted through the second process by adding a task that is used to pre-start the decoder. Here, the task is executed in parallel with the original task of initializing the decoder using the first metadata information obtained through the first process, so as to realize the parallel execution of the first process and the second process.

During the execution of the second process, the display apparatus 200 predicts first attribute information in the second metadata information based on the attribute parameter, and predicts second attribute information in the second metadata information based on the encryption data, where the first attribute information is used to describe audio and video attribute information of the data segment, and the second attribute information is used to describe encryption information of the data segment.

As can be seen from the previous description of the attribute parameter and encryption data in the index file, the attribute parameters in the index file are used to describe the attribute characteristics of the data segment, and these attribute characteristics mainly correspond to audio and video attributes, so the audio and video attribute information may be predicted based on the attribute parameters. The audio and video attribute information may include: width and height of video, MIME type of video, MIME type of audio, sampling rate, channel information, etc. The encryption data in the index file is used to describe the encryption characteristics of the data segment, so the encryption information of the data segment may be predicted based on the encryption data.

Figure 11:
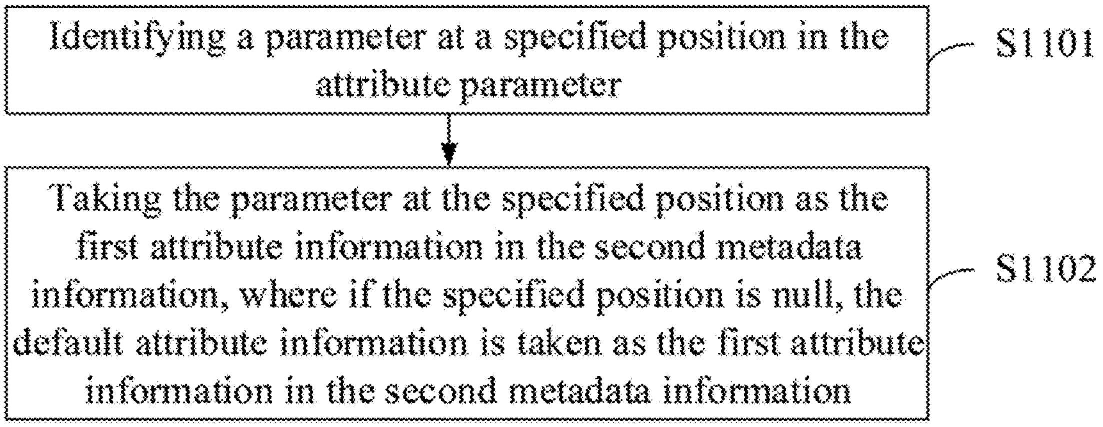
FIG. 11 shows a flow chart for predicting the first attribute information according to some embodiments of the disclosure.

The display apparatus 200 can predict the first attribute information according to the process shown in FIG. 11. The specific steps are as follows.

S1101: identifying a parameter at a specified position in the attribute parameter(s).

The attribute parameter(s) may include a plurality of parameters, such as an attribute name indicated by the attribute parameter and a specific parameter used to describe the attribute parameter. The specific parameter is located at a specified position in the attribute parameter.

Taking the height and width of a video as an example, the attribute parameters are "maxHeight=720 and maxWidth=1280", where the attribute names are maxHeight and maxWidth, and the parameters at specified positions are 720 and 1280.

Taking the video coding information as an example, the attribute parameter is “codecs=hev1.2.4.L120.90”, where the attribute name is codecs, and the parameter at the specified position is hev1. Here, the parameter at the specified position may be identified based on a parameter library indicating attribute information. For example, the parameters related to the video coding information in the parameter library may include hev1, and the parameter at the specified position may be identified as hev1.

Taking the sampling rate of audio as an example, the attribute parameter is “audioSamplingRate=48000”, where the attribute name is audioSamplingRate, and the parameter at the specified position is 48000.

Taking audio coding information as an example, the attribute parameter is “codecs=ac-4.02.00.00”, where the attribute name is codecs, and the parameter at the specified position is ac-4. Here, the parameter at the specified position can also be identified based on a parameter library indicating attribute information. For example, the parameters related to the audio coding information in the parameter library may include ac-4, and the parameter at the specified position may be identified as ac-4.

S1102: taking the parameter at the specified position as the first attribute information in the second metadata information, where if the specified position is null, default attribute information is taken as the first attribute information in the second metadata information.

The identified parameter at the specified position is directly taken as the first attribute information in the second metadata information. For example, 720 and 1280 in the above example are respectively taken as the height and width of the video described in the first attribute information, hev1 is taken as the video coding information described in the first attribute information, 48000 is taken as the sampling rate of the audio described in the first attribute information, and ac-4 is taken as the audio coding information described in the first attribute information.

While the display apparatus 200 predicts the second attribute information based on the encryption data, if the encryption data is recognized to have an encryption tag, the second attribute information is encrypted; if the encryption data is recognized to have no encryption tag, the second attribute is not encrypted. For example, if the encryption data corresponding to the attribute parameter “contentType=audio” is “ContentProtection”, then the encryption data has the encryption tag “Protection”, that is, the audio data is encrypted.

If the parameter at the specified position is null, the default attribute information corresponding to the attribute is taken as the first attribute information. For example, if “maxHeight maxWidth” is null, the default attribute information 720 and 1280 is taken as the first attribute information, to ensure that complete first attribute information can be predicted and the decoder can be initialized.

S903: based on that the second metadata information is generated before the first metadata information, initializing the decoder according to the second metadata information.

If the second metadata information is generated prior to the first metadata information, that is, the metadata information of the data segments is predicted firstly, the decoder may be initialized directly based on the predicted second metadata information, so as to prestart the decoder before starting based on the real metadata information. Therefore, the time it takes to complete the initialization of the decoder using the second metadata information will be shorter than the time it takes to complete the initialization of the decoder using the first metadata information, thereby improving the initialization efficiency of the decoder.

S904: using the initialized decoder to decode the ES data to obtain decoded ES data.

It can be seen from S902 that the second metadata information obtained through the second process is only a predicted value of the real metadata information. Therefore, there is a possibility that the predicted value may be inconsistent with the real metadata information. For example, the index file usually does not contain extra data, but the ES data does. Therefore, the extra data in the ES data cannot be predicted based on the index file. When the ES data contains extra data, the first metadata information and the second metadata information must be inconsistent.

Figure 12:
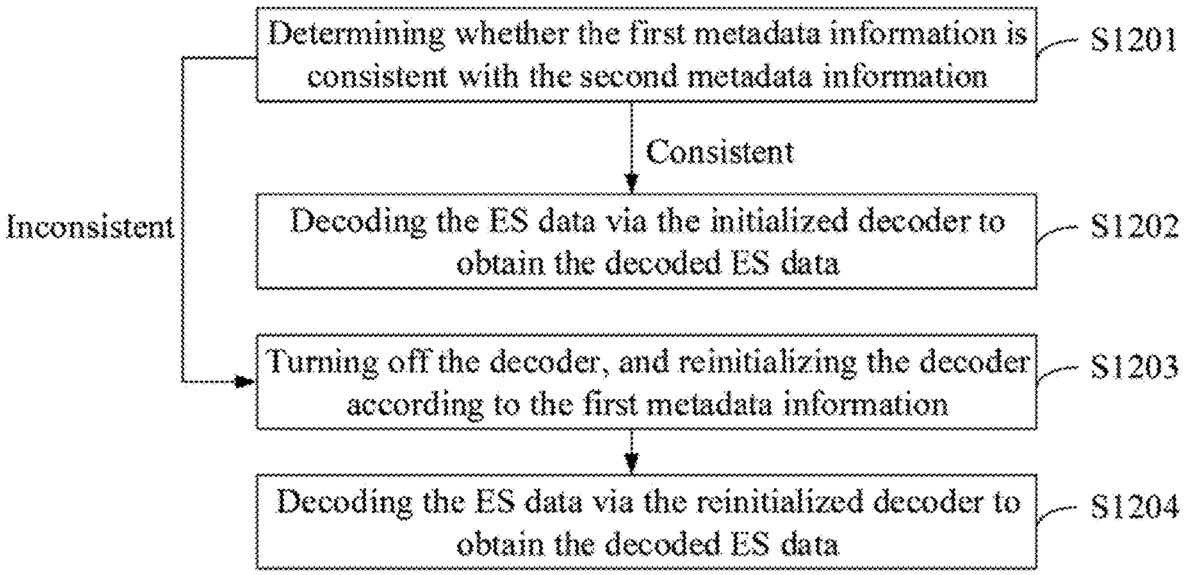
FIG. 12 shows a flow chart for decoding the ES data according to some embodiments of the disclosure.

In order to ensure that the initialized decoder can perform normal decoding, the display apparatus 200 can decode the ES data according to the process shown in FIG. 12. The specific steps are as follows.

S1201: determining whether the first metadata information is consistent with the second metadata information.

Figure 13:
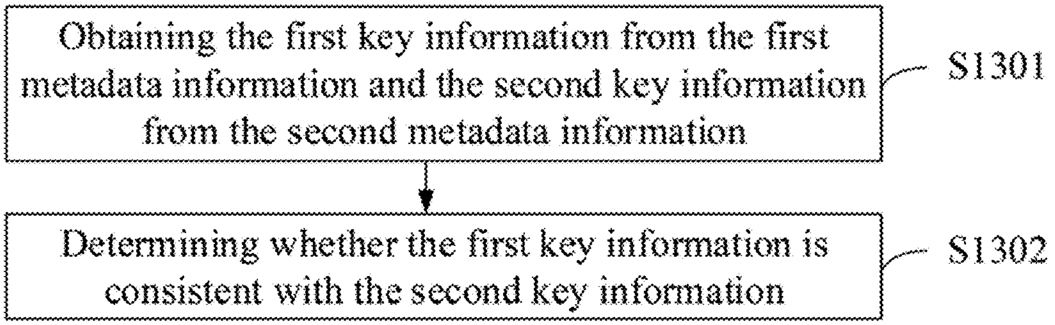
FIG. 13 shows a flow chart for the display apparatus to compare the first metadata information with the second metadata information according to some embodiments of the disclosure.

By comparing the first metadata information and the second metadata information, it is determined whether the predicted metadata information is accurate, that is, whether the predicted metadata information is the real metadata information. The display apparatus 200 can compare the first metadata information with the second metadata information according to the process shown in FIG. 13. The specific steps can be as follows.

S1301: obtaining the first key information from the first metadata information and the second key information from the second metadata information.

The first metadata information and the second metadata information include variety pieces of information, such as attribute name, detailed parameter of attribute, etc. Here, taking the detailed parameter of attribute as an example, some additional information that does not affect the attribute is also included, in addition to parameters having a corresponding relationship with the attribute. For example, for “codecs=hev1.2.4.L120.90”, the parameter having a corresponding relationship with the attribute is hev1, and the additional information is 2.4.L120.90. The shortest information that can represent the attribute is used as key information, where the first metadata information corresponds to first key information, and the second metadata information corresponds to second key information.

S1302: determining whether the first key information is consistent with the second key information.

By comparing the first key information with the second key information, whether the first metadata information is consistent with the second metadata information can be determined. Here, if the first key information is consistent with or the same as the second key information, then the first metadata information is consistent or the same as the second metadata information; if the first key information is inconsistent with or different from the second key information, then the first metadata information is inconsistent with the second metadata information.

S1202: based on that the first metadata information and the second metadata information is consistent, using the initialized decoder to decode the ES data to obtain the decoded ES data.

If the first metadata information is consistent with or same as the second metadata information, it means that the predicted metadata information is consistent with the real metadata information, so the decoder initialized with the predicted metadata information may be used to normally decode the ES data. In this case, the initialized decoder can be directly used to decode the ES data without using the first metadata information to initialize the decoder again.

Therefore, after the ES data is obtained, since the predicted second metadata information has been used to start the decoder, there is no need to wait for the startup and initialization of the decoder, and the decoding operation may be started directly, thereby effectively shortening the time from obtaining the ES data to decoding the ES data.

S1203: based on that the first metadata information and the second metadata information is not consistent, turning off the decoder, and reinitializing the decoder according to the first metadata information.

If the first metadata information is inconsistent with the second metadata information, it means that the predicted metadata information is inconsistent with the real metadata information, that is, the prediction is inaccurate. Therefore, the decoder initialized with the predicted metadata information will not be able to decode the ES data normally. In this case, it is necessary to turn off the decoder, and re-start and initialize the decoder using the first metadata information, to ensure that the reinitialized decoder can decode the ES data normally.

S1204: using the reinitialized decoder to decode the ES data to obtain the decoded ES data.

After the ES data is obtained, the reinitialized decoder is used to start the decoding operation. Compared with the ordinary display process, only the time for comparing the metadata information and turning off the decoder is increased. This time is relatively short and does not cause too much delay.

S905: controlling the display to display a program image of the target channel according to the decoded ES data.

The decoded ES data can be used to render the program image, and the program image is displayed, to complete the playing of the program.

In some embodiments, if the first metadata information is generated before the second metadata information, the program image may be displayed according to steps S906-S908, which may include processing as follows.

S906: based on that the first metadata information is generated before the second metadata information, initializing the decoder according to the first metadata information and terminating the second process.

S907: using the initialized decoder to decode the ES data to obtain the decoded ES data.

S908: displaying the program image of the target channel according to the decoded ES data.

For steps S906-S907, reference may be made to the first display process, which will not be described again here.

Figure 14:
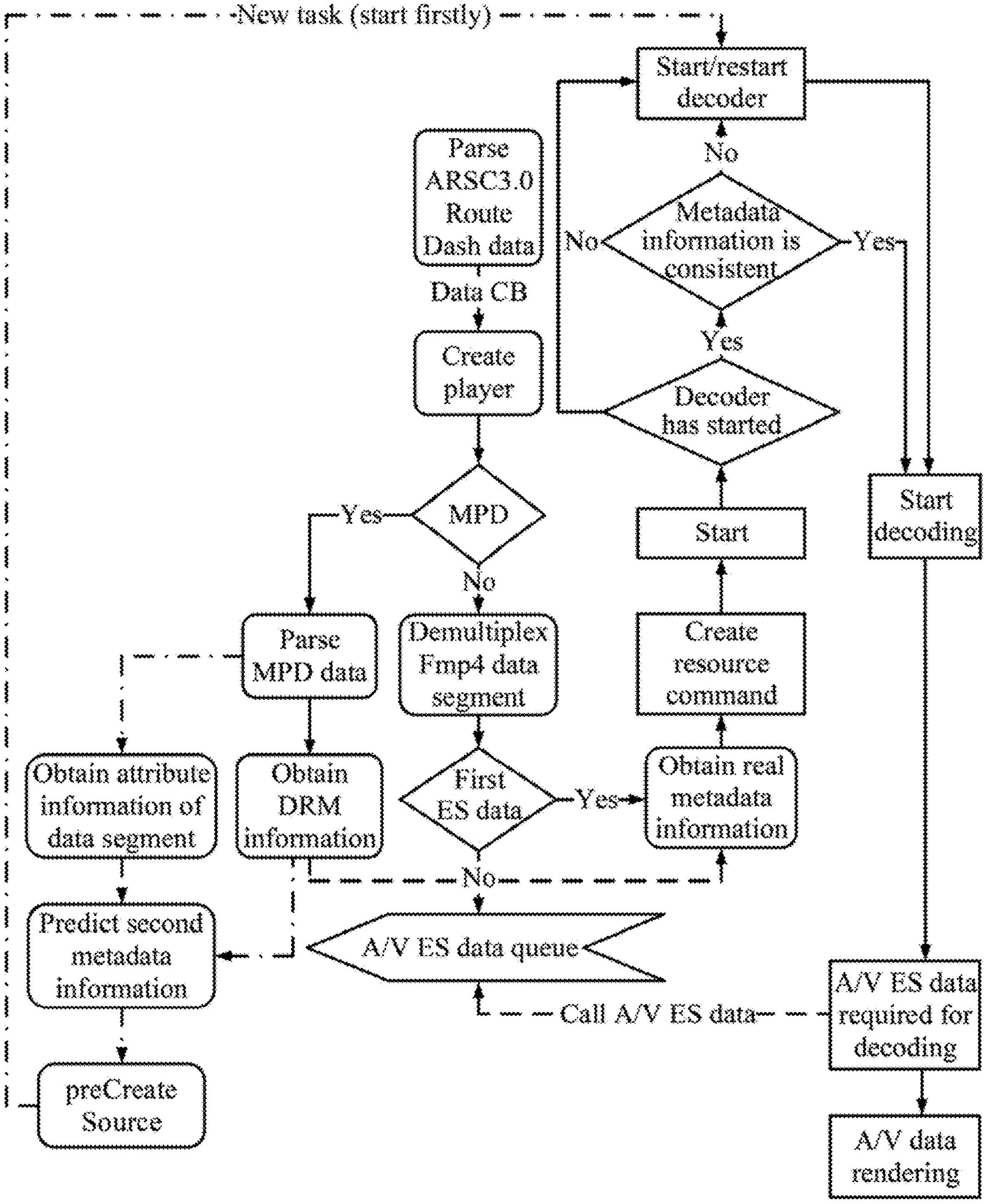
FIG. 14 shows a schematic flow chart for playing a program according to some embodiments of the disclosure.

Steps S901-S908 will be described with reference to the process shown in FIG. 14. A media player is created after the Route Dash data is parsed. The first process and the second process are executed in parallel (the second process is shown with a dotted line). When the first process and the second process are executed, the data type of the media data is firstly determined, such as determining whether the Route Dash data is MPD data based on TSI. If the Route Dash data is MPD data, the second process is executed using the MPD data. If the Route Dash data is not MPD data and is, for example, a data segment in Fmp4 format (Dash Media Segments), the first process is executed using the data segment. When the second process is executed, the attribute information of the data segment is obtained based on the MPD data, and the second metadata information is predicted based on the attribute information. A preCreate Source instruction is created, and a new task is added to pre-start the decoder using the second metadata information in the new task. When the first process is executed, the data segment may be directly sent to the Fmp4 demultiplexing module for demultiplexing to obtain the ES data. If the ES data is first ES data, the first metadata information may be obtained based on the first ES data. If the ES data is not first ES data, the ES data is written into an ES data queue in a media file. A source instruction for reading the ES data is created, and the decoder is started through a play instruction. Firstly, it is determined whether the decoder has been initialized using the second metadata information. If the initialization has been completed, it is determined whether the first metadata information is consistent with the second metadata information. If so, the initialized decoder is directly used to start decoding the ES data; otherwise, the decoder is reinitialized using the first metadata information after the decoder is turned off. If the initialization of the decoder has not completed, the first metadata information is directly used to initialize the decoder. The display apparatus 200 starts the process of decoding the ES data using the initialized decoder. The decoder calls the A/V ES data queue in the media file and starts decoding the ES data. The display apparatus 200 uses the decoded A/V data to render the program image, and displays the program image.

For the case of executing the first process and the second process in parallel, the second metadata information is used to pre-start the decoder, and the case where the second metadata information is consistent with the first metadata information can refer to the schematic diagram of the playing start time shown by D2 in FIG. 8 as an example. Still starting from receiving the Route Dash data, the display apparatus 200 identifies the data type of the Route Dash data in t1 seconds; when executing the first process, the display apparatus 200 demultiplexes the data segment to obtain the first ES data in t2 seconds, and can obtain the first metadata information based on the first ES data in t3 seconds; when executing the second process, the display apparatus 200 predicts the second metadata information based on the MPD data in t6 seconds. The total time it takes for the display apparatus 200 to use the second metadata information to complete the initialization of the decoder is t4 seconds, and the total time it takes for the display apparatus 200 to use the initialized decoder to decode the ES data and render the program image is t5 seconds. Then the playing start time of the program in the first display process is T2=(t1+t2+t3+t5) seconds. It may be seen that at least the time to initialize the decoder may be shortened.

For the case of executing the first process and the second process in parallel, the second metadata information is used to pre-start the decoder, and the case where the second metadata information is inconsistent with the first metadata information can refer to the schematic diagram of the playing start time shown by D3 in FIG. 8 as an example. Still starting from receiving the Route Dash data, the display apparatus 200 to identifies the data type of the Route Dash data in t1 seconds; when executing the first process, the display apparatus 200 demultiplexes the data segment to obtain the first ES data in t2 seconds, and can obtain the first metadata information based on the first ES data in t3 seconds; when executing the second process, the display apparatus 200 predicts the second metadata information based on the MPD data in t6 seconds. The total time it takes for the display apparatus 200 to use the second metadata information to complete the initialization of the decoder is t4 seconds, and the time it takes for the display apparatus 200 to turn off the decoder is t7 seconds. The total time it takes for the display apparatus 200 to use the first metadata information to complete the initialization of the decoder is t4 seconds, and the total time it takes for the display apparatus 200 to use the initialized decoder to decode the ES data and render the program image is t5 seconds. Then the playing start time of the program in the first display process is T3=(t1+t2+t3+t7+t4+t5) seconds. It may be seen that only the time to turn off the decoder is increased, and this time is usually short, about 50 ms, and has very little impact on the overall time.

Figure 15:
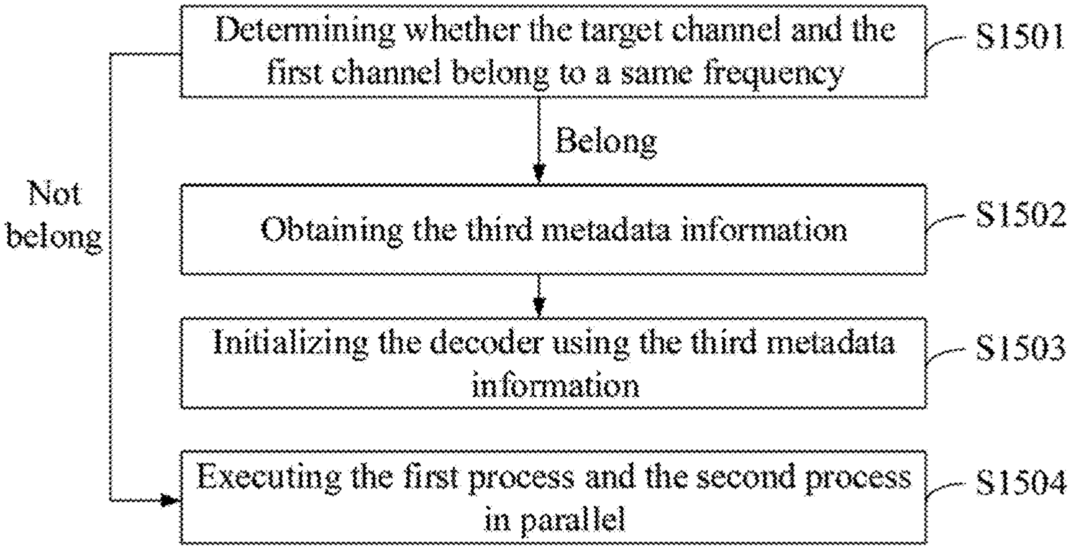
FIG. 15 shows a flow chart for switching channels to play programs according to some embodiments of the disclosure.

In some embodiments, if the first command is a channel switching command, the display apparatus 200 displays the program image of the first channel before receiving the first command. The display apparatus 200 can play the program according to the process shown in FIG. 15. The specific steps are as follows.

S1501: determining whether the target channel and a first channel belong to a same frequency.

That is, it is determined whether the channel switching between target channel and the first channel is at the same frequency.

S1502: obtaining the third metadata information if the target channel and the first channel belong to the same frequency.

The third metadata information is metadata information used to initialize the decoder when decoding the ES data of the first channel.

The programs at the same frequency generally have the same metadata information. For example, when switching channels at the same frequency, the metadata information of the program of channels before and after channel switching is consistent or same. The metadata information of the program of the previous channel is stored in a database. When switching channels at the same frequency, the metadata information of the program of the channel before channel switching may be directly obtained as the metadata information of the program of the channel after channel switching. The metadata information of the program of the channel before channel switching may be called third metadata information.

S1503: initializing the decoder using the third metadata information.

The third metadata information is directly used to initialize the decoder, thereby effectively improving the initialization efficiency of the decoder.

S1504: executing the first process and the second process in parallel if the target channel and the first channel belong to different frequencies.

If the target channel and the first channel belong to different frequencies, the metadata information corresponding to the first channel cannot be applied to the target channel. In this case, the first process and the second process may be executed in parallel, that is, step S902 is executed.

In some embodiments, the real-time prediction can also be performed based on the content information of channels frequently selected by the user, to train a prediction module that predicts the second metadata information, and improve the accuracy of the prediction module.

In some embodiments, the audio and video synchronization scenario of the played program is described by taking ATSC (Advanced Television Systems Committee) 3.0 as an example.

The ATSC 3.0 is a hybrid transmission standard based on broadcast and IP (broadband). A broadcaster may use linear broadcast or IP streaming media to transmit the real-time content, or may use a hybrid method of linear broadcast plus IP streaming media to transmit the real-time content. The broadcaster can transmit HEVC (High Efficiency Video Coding, also called H.265 encoding) UHD (Ultra High Definition) video and audio in English in a broadcast channel, and can transmit audio in other languages in the auxiliary audio through a broadband channel. The ATSC 3.0 TV devices that are not connected with the Internet can only receive the programs with the audio in English, while the devices that are connected with the Internet can select audio in other languages and enjoy the personalized audio experience. This is a typical ATSC 3.0 hybrid playing scenario.

The broadcast channel means that the front-end DASH (Dynamic Adaptive Streaming over HTTP) Server packages and modulates the MPD (Media Presentation Description) and Media data through ROUTE (Real-Time Object Delivery over Unidirectional Transport)/DASH, and can transmit an ATSC 3.0 signal. The TV can receive the ATSC 3.0 signal, and can obtain the MPD and Media data after demodulation and ROUTE/DASH packet analysis. The whole process has a stable and relatively small delay. However, the broadcast channel is easily affected by weather and other factors, and the sent data may be lost without a retransmission mechanism. The broadband channel always has unstable delays due to network congestion and jitter, but the data can be retransmitted without passive data loss. In the ATSC 3.0 hybrid playing scenario, if the broadcast channel or broadband channel is reconnected after data loss occurs, the playing of the broadcast program is out of sync, affecting the user experience.

Figure 16:
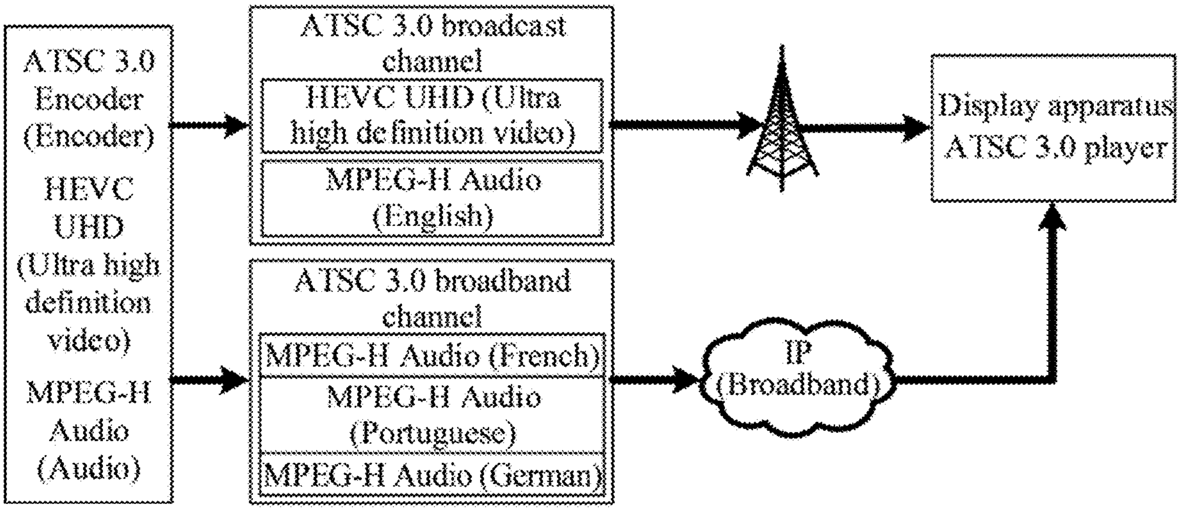
FIG. 16 shows a schematic diagram of an ATSC 3.0 hybrid playing scenario according to some embodiments of the disclosure.

In some embodiments, as shown in FIG. 16, the broadcaster can transmit HEVC UHD video and English audio in the broadcast channel, and can transmit the audio in other languages in the auxiliary audio through the broadband channel. If the ATSC 3.0 based display apparatus is not connected with the Internet, this display apparatus can only receive the program with English audio. If the display apparatus is connected with the Internet, this display apparatus can select the audio in other languages and enjoy the personalized audio experience.

Figure 17:
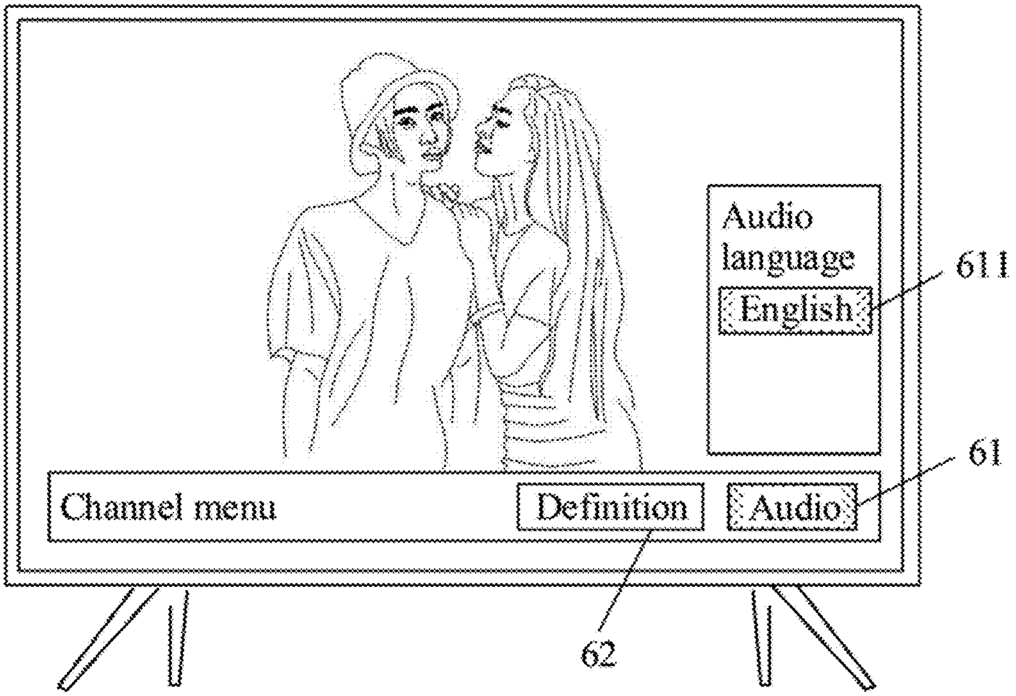
FIG. 17 shows a schematic diagram of an audio selection submenu according to some embodiments of the disclosure.
Figure 18:
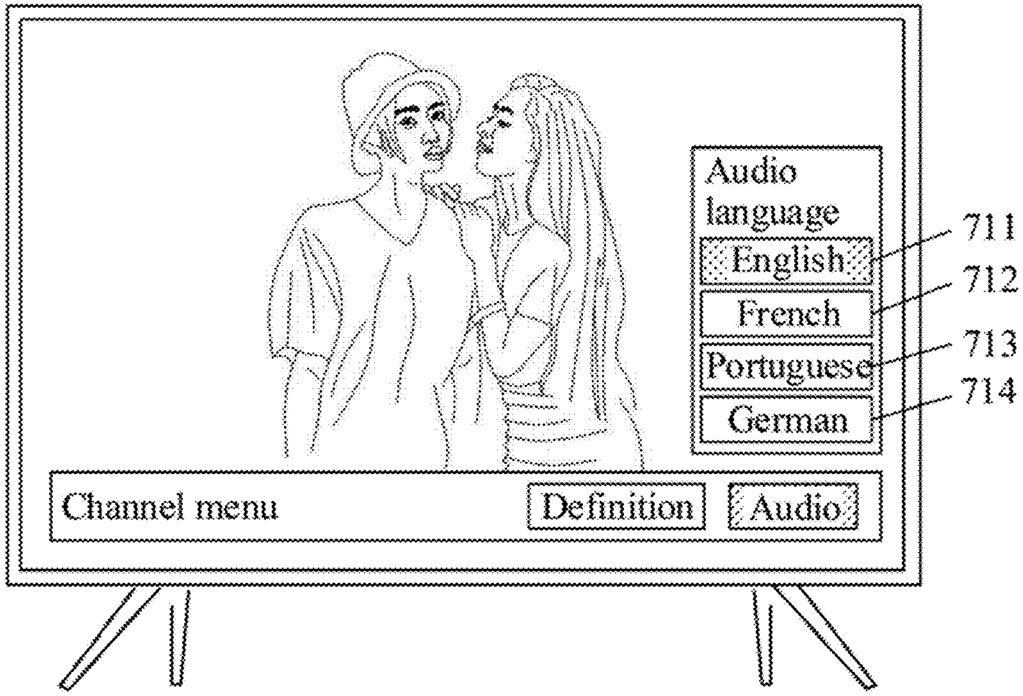
FIG. 18 shows a schematic diagram of another audio selection submenu according to some embodiments of the disclosure.

The display apparatus learns that the broadcast program includes 1 channel of video and 4 channels of audio through ATSC 3.0 signaling (such as USBD (User Service Bundle Description) and MPD). The video and English audio are transmitted by the broadcast channel, and the other 3 channels of audio are transmitted by the broadband channel. After receiving the command from the user via pressing the menu key of the control device, the display apparatus displays a menu program information bar, where the menu program information bar may include an audio control 61. After receiving the command for selecting the audio control from the user, an audio selection submenu is displayed. If the display apparatus is not connected with the Internet and cannot access the broadband channel, only an English audio control 611 may be included on the audio selection submenu, as shown in FIG. 17. If the display apparatus has been connected with the Internet, the audio selection submenu displays 4 language audio controls 711-714. The user switches audio by selecting the desired language audio control, as shown in FIG. 18.

Figure 19:
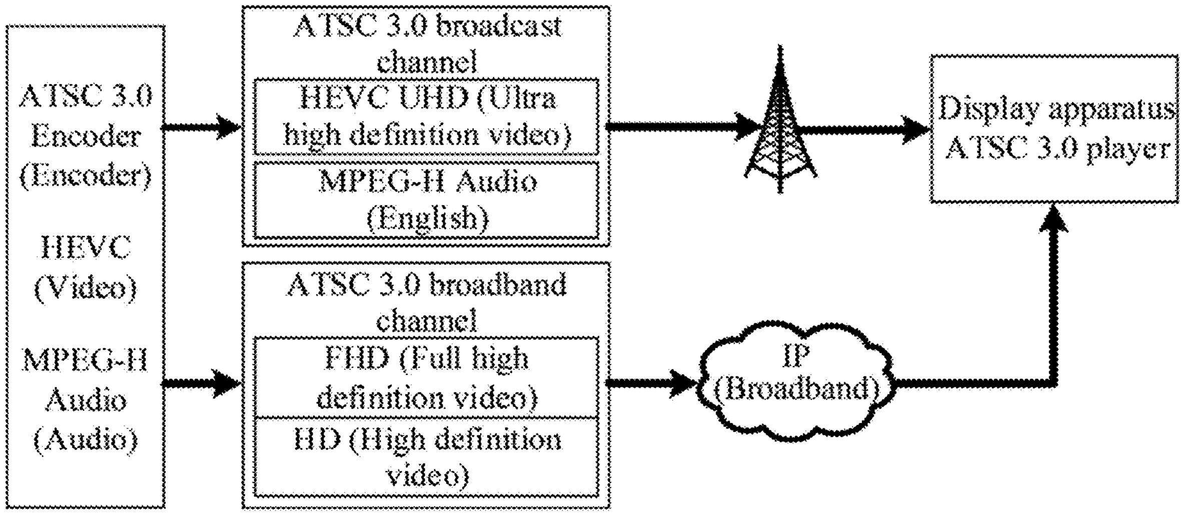
FIG. 19 shows a schematic diagram of an ATSC 3.0 hybrid playing scenario according to some embodiments of the disclosure.

In some embodiments, as shown in FIG. 19, the broadcaster can transmit ultra-high definition video and English audio in the broadcast channel, and can transmit video with other definition in the auxiliary video through the broadband channel. If the ATSC 3.0 display apparatus is not connected with the Internet, this display apparatus can only receive ultra-high definition video. If the display apparatus is connected with the Internet, this display apparatus can select video with other definition and enjoy the personalized video experience.

Figure 20:
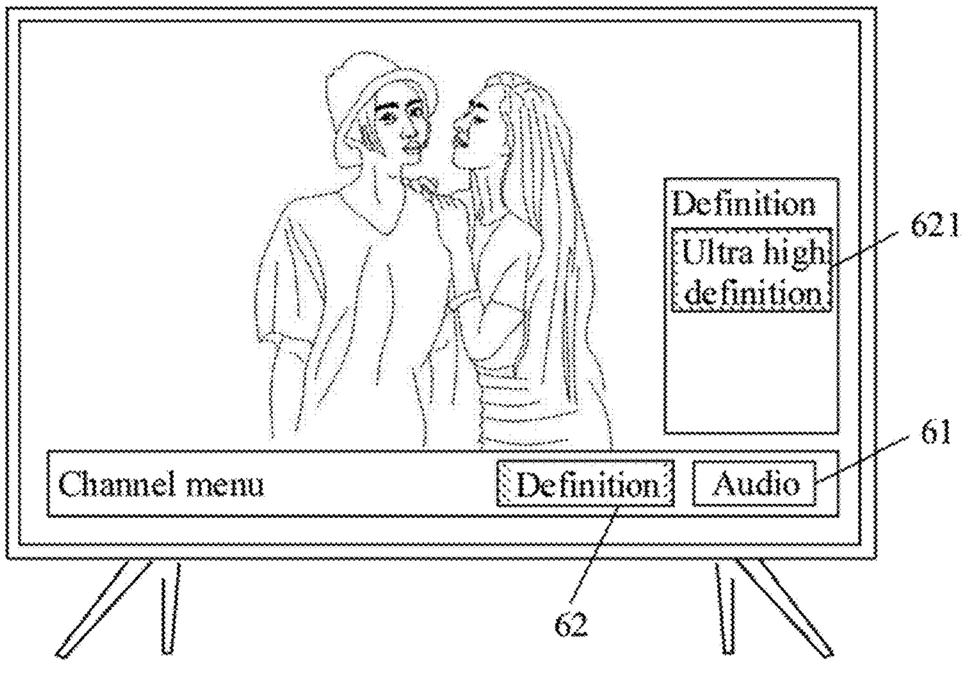
FIG. 20 shows a schematic diagram of a definition selection submenu according to some embodiments of the disclosure.

The display apparatus learns that the broadcast program includes 3 channels of video and 1 channel of audio through ATSC 3.0 signaling (such as USBD (User Service Bundle Description) and MPD). The ultra-high definition video and English audio are transmitted by the broadcast channel, and the other 2 channels of video are transmitted by the broadband channel. After receiving a command from the user via pressing the menu key of the control device, the display apparatus displays a menu program information bar, where the menu program information bar may include a definition control 62. After receiving a command for selecting the definition control from the user, a definition selection submenu is displayed. If the display apparatus is not connected with the Internet and cannot access the broadband channel, only an ultra-high definition control 621 may be included in the definition selection submenu, as shown in FIG. 20. If the display apparatus has been connected to the Internet, the definition selection submenu displays three definition controls 721-723. The user switches the definition of the video by selecting the desired definition control, as shown in FIG. 21.

In view of the above issues, some embodiments of the disclosure provide a display apparatus 200. The structure of the display apparatus 200 and the functions of all parts can refer to the above embodiments. In addition, on the basis of the display apparatus 200 shown in the above embodiments, some functions of the display apparatus 200 are further improved in these embodiments.

When a broadcast program starts to be played, as shown in FIG. 22, the display apparatus can perform the following steps.

S2201: receiving a command to play the broadcast program.

In some embodiments, receiving the command to play the broadcast program, may include: receiving a command to turn on a broadcast channel or switch a broadcast channel from a user.

In some embodiments, receiving the command to play the broadcast program, may include: receiving a command to reserve a program from a user, and receiving an instruction to switch to a channel corresponding to the program when the reservation time of the program is reached.

It should be noted that the audio data and video data of the broadcast program come from different channels, that is, the video data can come from a broadcast channel and the audio data can come from a broadband channel, or the video data can come from a broadband channel and the audio data can come from a broadcast channel.

In some embodiments, the sources of the audio and video data of the broadcast program may be set in advance. Exemplarily, a program of the channel has already been played before the user inputs the command to play the broadcast program, the audio data and video data of the program corresponding to the channel come from different channels by selecting audio or video source, and the display apparatus records the audio source and video source selected by the user into the historical information. When the user inputs a command to play the broadcast program or a command to broadcast the program corresponding to the channel again, the audio source and video source are obtained from the historical information, so as to directly obtain the audio data from the recorded audio source and obtain the video data from the recorded video source.

In some embodiments, the sources of the audio and video data of the broadcast program may be set after the user selects the audio or video. Exemplarily, after receiving the command to play the broadcast program input from the user, both the audio data and video data of the broadcast program come from the broadcast channel by default. After receiving the command to switch video or audio, the data channel of the video or audio can be switched so that the audio data and video data of the broadcast program come from different channels.

S2202: calculating the universal time coordinated of the operator server.

Figure 23:
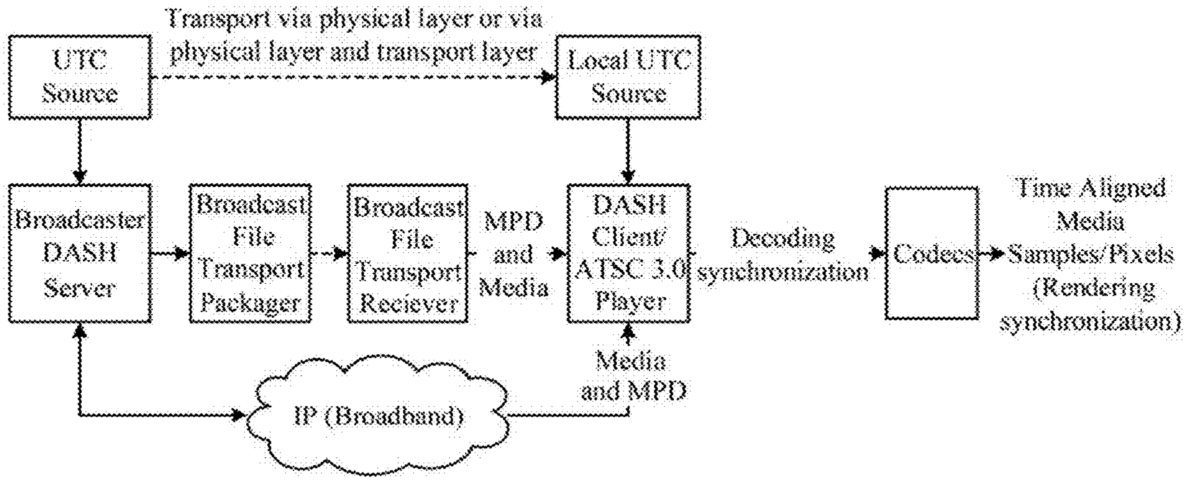
FIG. 23 shows a schematic diagram illustrating a synchronization mechanism in an ATSC 3.0 hybrid transmission scenario according to some embodiments of the disclosure.

In the ATSC 3.0 hybrid transmission mode, the basis of synchronization of audio and video from different transmission channels is that the content transmitted by the two channels is based on the unified Universal Time Coordinated (UTC) system time. As shown in FIG. 23, in the ATSC 3.0 hybrid transmission synchronization mechanism, the front-end operator's DASH Server uses a unified UTC Source to generate the MPD and Media data. The MPD and Media data are transmitted through the broadcast channel and broadband channel respectively, and the synchronization of the audio and video data is reconstructed using the same UTC timeline on the display apparatus (DASH Client) side.

The system time of the display apparatus is generally set based on the IP network NTP (Network Time Protocol) server, the signaling for broadcasting network time, or is set by the user manually. The ATSC 3.0 can use the transmission time of System Time Fragment LLS (Low Layer Signal) signaling, and this time is the UTC time on the operator's server side.

In some embodiments, the step of calculating the universal time coordinated of the operator server may include:

calculating a time difference between a server system time and a local system time.

In some embodiments, the step of calculating the time difference between the server system time and the local system time may include:

determining the local system time of the display apparatus;

receiving a System Time Fragment signaling, and parsing the server system time when the operator server sends the System Time Fragment signaling from the System Time Fragment signaling; and calculating the difference between the server system time and the local system time.

The current local system time of the display apparatus can be determined.

The universal time coordinated of the operator server is a sum of the current local system time and the time difference.

Exemplarily, the display apparatus can receive the System Time Fragment signaling at time TO. The signaling indicates the system time as $T_1$, and $(T_1-T_0)$ is the difference between the local system time and the server UTC time (if the local system time is originally constructed by the signaling time, $T_1-T_0=0$). The UTC time of the operator server is calculated through the local system time at any time: $T_{server}=T_{local}+(T_1-T_0)$, where $T_{local}$ is the local system time.

S2203: receiving first media data via the broadcast channel and storing the first media data in a first data queue, and receiving the second media data starting from the universal time coordinated via the broadband channel and storing the second media data in a second data queue.

Here, the first media data is audio data or video data, and the second media data is video data or audio data. It should be noted that the first media data and the second media data are not audio data or video data at the same time, that is, one of the first media data and the second media data is video data, and the other one is audio data.

In some embodiments, the step of receiving the second media data starting from the universal time coordinated via the broadband channel may include:

locating a target media segment based on the universal time coordinated of the operator server.

Here, the start time of the target media segment is later than or equal to the universal time coordinated of the operator server, and the end time of the target media segment is earlier than the universal time coordinated of the operator server.

That is, availabilityStartTime@MPD+Period.start+segment.start≤$T_{server}$, and availabilityStartTime@MPD+Period.start+segment.end>$T_{server}$.

The MPD file describes availabilityStartTime, period and segment. A program may be divided into multiple periods, and each period is divided into multiple segments. Here, availabilityStartTime indicates a start time of the program, Period.start indicates a start time of the period (an offset relative to the start time of the program), Segment.start indicates a start time of the segment (an offset relative to the start time of the period), and Segment.end indicates the end time of the segment (an offset relative to the start time of the period). AvailabilityStartTime@MPD+Period.start+segment.start indicates a start time (absolute value) of a segment in the program. AvailabilityStartTime@MPD+Period.start+segment.end indicates an end time (absolute value) of the segment in the program.

For a pull mode of streaming according to the above method, the audio and video data segments obtained by the player via two transmission channels at the same time are roughly aligned. There may be a difference of 1 to 2 media segments (a few seconds), and the arrival times of the media segments are sequential. It is necessary to accurately synchronize the buffered data in the elementary stream data queue again.

S2204: determining a first synchronization time point based on data in the first data queue and the second data queue.

In some embodiments, when the data is input into the first data queue and the second data queue, the synchronization module may be used to inject the data into the decoder to synchronize the injected audio and video data. Before the data synchronization is completed, that is, before the data is injected into the decoder, the player is marked as a seeking state. The seeking state is used to indicate that the audio and video data for synchronization is currently being sought for, and the user interface is in a black screen state. The synchronization of audio and video data means that PTSs (Presentation Time Stamps) of the first frame of video data and the first frame of audio data injected into the decoder are the same or similar.

In the seeking state, the broadband channel can download the media segments as quickly as possible (when one segment is completed, the next segment is downloaded immediately, without a pause), ensuring that there is still available data even if the second data queue of the broadband channel loses frames.

In some embodiments, the step of determining the first synchronization time point based on the data in the first data queue and the second data queue may include: determining a target maximum value, where the target maximum value is the maximum value in the timestamp of a first frame of data in the first data queue and the timestamp of a first frame of data in the second data queue; here, the timestamp of the first frame of data in the first data queue is indicated as $PTS_{start1}$, and the timestamp of the first frame of data in the second data queue is indicated as $PTS_{start2}$, so the target maximum value is max ($PTS_{start1}$, $PTS_{start2}$); determining a target minimum value, where the target minimum value is the minimum value in the timestamp of a last frame of data in the first data queue and the timestamp of a last frame of data in the second data queue; here, the timestamp of the last frame of data in the first data queue is indicated as $PTS_{end1}$, and the timestamp of the last frame of data in the second data queue is indicated as $PTS_{end2}$, so the target minimum value is min ($PTS_{end1}$, $PTS_{end2}$); determining whether the target maximum value is less than the target minimum value; if the target maximum value is less than the target minimum value, that is, max ($PTS_{start1}$, $PTS_{start2}$)<min ($PTS_{end1}$, $PTS_{end2}$), taking the target maximum value as the first synchronization time point; if the target maximum value is greater than or equal to the target minimum value, that is, max ($PTS_{start1}$, $PTS_{start2}$)>min ($PTS_{end1}$, $PTS_{end2}$), then the step of determining the target maximum value is performed after receiving the new audio or video data, or the step of determining the target maximum value is performed after a preset time interval.

In some embodiments, the step of determining the first synchronization time point based on the data in the first data queue and the second data queue may include: starting a timer; determining whether a time duration of the timer reaches a preset duration; if the time duration of the timer does not reach the preset duration, determining a target maximum value, where the target maximum value is the maximum value in the timestamp of a first frame of data in the first data queue and the timestamp of a first frame of data in the second data queue; determining a target minimum value, where the target minimum value is the minimum value in the timestamp of a last frame of data in the first data queue and the timestamp of a last frame of data in the second data queue; determining whether the target maximum value is less than the target minimum value; and if the target maximum value is less than the target minimum value, taking the target maximum value as the first synchronization time point, and turning off the timer; if the target maximum value is greater than or equal to the target minimum value, the step of judging whether the time duration of the timer reaches the preset duration is performed after receiving the new audio or video data, or the step of judging whether the time of the timer reaches the preset duration is performed after a preset time interval; if the time duration of the timer reaches the preset duration, controlling the display to display a prompt page, where the prompt page is used to prompt the user that the current network is not good and to suggest a different video or audio.

It should be noted that the target maximum value is always greater than or equal to the target minimum value within the preset duration, indicating that the network of the broadband channel may be very poor for a long time and cannot guarantee smooth downloading of audio or video, so that the broadband downloading can never catch up with live broadcast, and the user is advised to select the audio or video of the broadcast channel. Further, the event that the target maximum value is always greater than or equal to the target minimum value within the preset duration may be because: the network speed of the broadband channel is too fast, resulting in too much audio or video data in the queue; the data for synchronization corresponding to the broadcast channel may be deleted, so that the live broadcast is always slower than broadband downloading. In this case, the data of the broadband channel may be pulled according to the universal time coordinated of the operator server.

Here, if the number of data frames in the first data queue exceeds the upper limit of the number of frames within the time duration, a data frame with the earliest timestamp is deleted. If the number of data frames in the second data queue exceeds the upper limit of the number of frames, a data frame with the earliest timestamp is deleted. Here, the number of data frames deleted each time may be one or more. In case of video data, one frame of data may be deleted each time.

Figure 24:
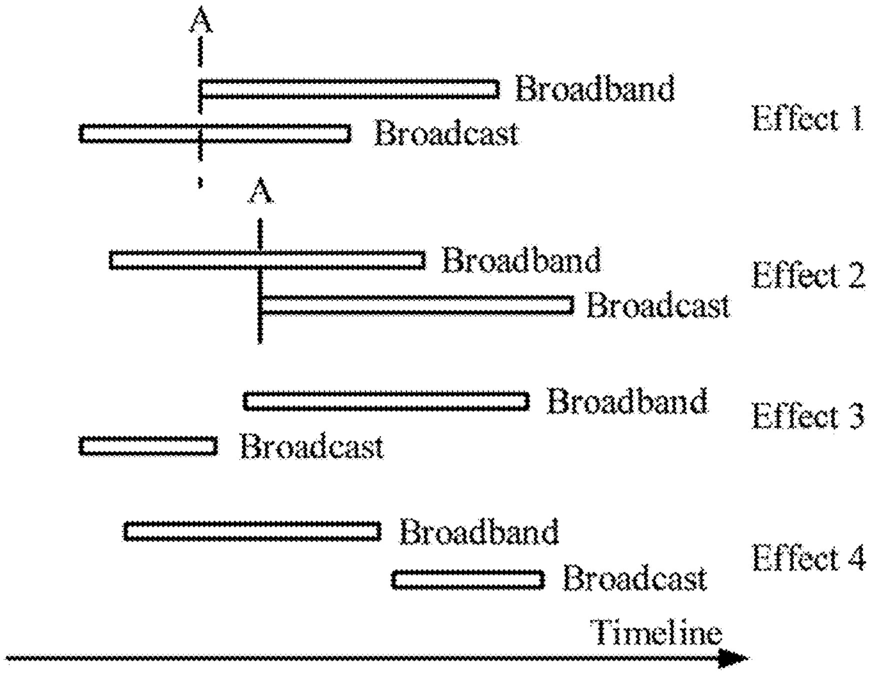
FIG. 24 shows an effect diagram of a comparison between a target maximum value and a target minimum value according to some embodiments of the disclosure.

As shown in FIG. 24, when the target maximum value is less than the target minimum value, cases indicated by the effect 1 and effect 2 may be included, and the first synchronization time point is a time point corresponding to the target maximum value (point A). When the target maximum value is greater than or equal to the target minimum value, cases indicated by the effect 3 and effect 4 may be included, and there is no time point at which synchronization can be achieved.

S2205: sending frame data at the first synchronization time point in the first data queue and the second data queue to a decoder, so that the decoder can decode the frame data at the first synchronization time point.

In some embodiments, after sending the frame data at the first synchronization time point in the first data queue and the second data queue to the decoder, the decoder can decode the frame data at the first synchronization time point, and can send the decoded data to the renderer to render and play the decoded audio and video data. In this case, the state of the player can change to the playing state.

In some embodiments, the audio and video data frames decoded by the decoder are rendered and aligned. The rendering synchronization is synchronous display of the decoded audio and video data. Generally, the PTS of the audio frame is used as the benchmark. The PTS of the video frame to be displayed is compared with that of the audio frame, and a rendering occasion of the video frame is adjusted to achieve synchronization within the discernible range of human vision and hearing. If the PTS of the video frame is later than the PTS of the audio frame, the display time of the previous video frame is extended (for example, by repeating); if the PTS of the video frame is earlier than the PTS of the audio frame, the display of the video frame is speeded up (for example, by skipping). The decoding synchronization is the basis of rendering synchronization. When the audio and video data injected into the decoder deviates too much (for example, the PTS difference between audio and video is more than 5 seconds), the rendering synchronization cannot be completed. Then there is either a case where the playing of audio and video is stuck, or a case where the audio and video are obviously out of sync.

In some embodiments, if the video frame corresponding to the first synchronization time point is a key frame, the video frame data and audio frame data corresponding to the first synchronization time point are directly input to the decoder.

In some embodiments, if the video frame corresponding to the first synchronization time point is not a key frame, then a target key frame is determined. The target key frame is a key frame before the first synchronization time point. The audio frame data at the first synchronization time point, the video data of the target key frame and the video data after the target key frame are sent to the decoder. Here, data frames with timestamps earlier than the first synchronization time point are not used for rendering.

In some embodiments, if the first synchronization time point is the display timestamp of the first frame of data in the first data queue while the second data queue has no data frame with display timestamp same as the first synchronization time point, then the display timestamp of the frame data corresponding to the first synchronization time point in the second data queue meets the following condition:

$$PTS_1 \leq PTS_2 < PTS_1 + N.$$

Here, $PTS_2$ is the display timestamp of the frame data at the first synchronization time point in the second data queue, $PTS_1$ is the first synchronization time point, and N is the spacing of data frames in the first data queue.

For example, the frame interval of the first data queue is 33 ms, the frame interval of the second data queue is 40 ms, the first synchronization time point is determined to be 66 ms, and then the frame with the display timestamp of 66 ms in the first data queue. Although there is no frame data with the display timestamp of 66 ms in the second data queue, there is a frame data with the display timestamp of 80 ms satisfying the above condition of greater than 66 ms and less than 99 ms. Therefore, the frame data corresponding to the first synchronization time point in the second data queue is the frame data with the display timestamp of 80 ms.

In some embodiments, a network congestion abnormality may occur in the broadband channel during the process of starting to play. In the following embodiments, by way of example, the first media data is video data and the second media data is audio data.

After receiving a command to play a broadcast program, if the video data sent via the broadcast channel is received and saved in the first data queue, and the audio data sent via the broadband channel is not received, then the video data sent via the broadcast channel continues to be received.

In some embodiments, if the number of video frames in the first data queue exceeds the upper limit of the total number of frames, the frame data of the key frame with the earliest timestamp is deleted. If the number of video frames in the first data queue does not exceed the upper limit of the total number of frames, the video data sent via the broadcast channel continues to be received.

In some embodiments, if the number of key frames in the first data queue exceeds the upper limit of the number of key frames, the frame data of the key frame with the earliest timestamp is deleted. If the number of key frames in the first data queue does not exceed the upper limit of the number of key frames, the video data sent via the broadcast channel continues to be received.

In some embodiments, it is determined whether the last video frame in the first data queue is a key frame.

If the last video frame in the first data queue is a key frame, the data of video frames before the key frame is deleted from the first data queue.

If the last video frame in the first data queue is not a key frame, the video data sent via the broadcast channel continues to be received, and the step of determining whether the last video frame in the first data queue is a key frame is performed.

Figure 25:
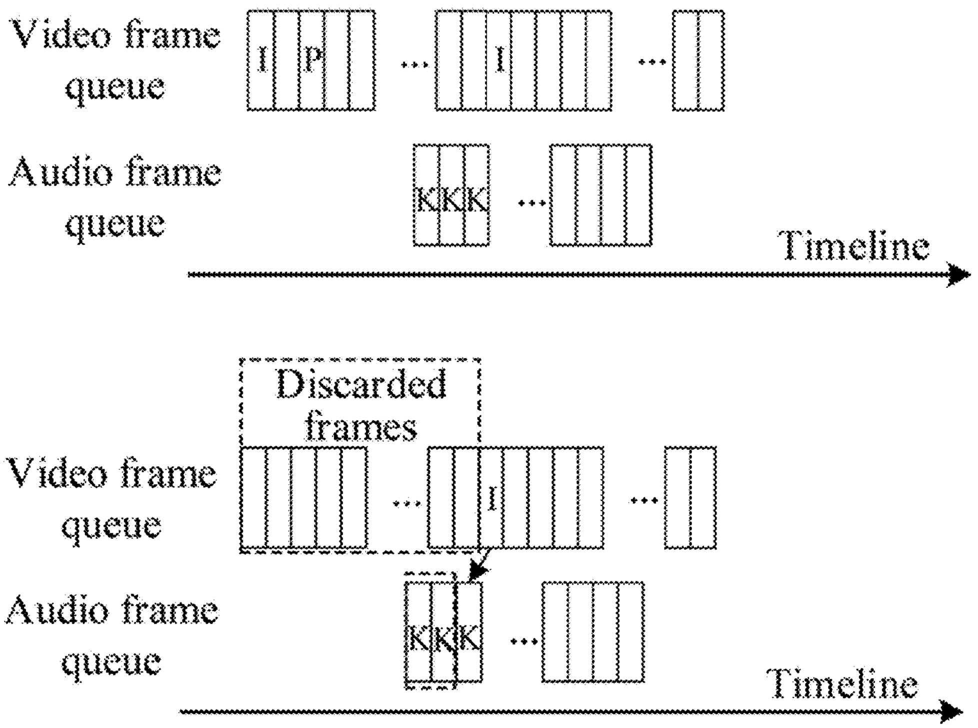
FIG. 25 shows a first schematic diagram illustrating audio and video alignment and discarding frames according to some embodiments of the disclosure.

In some embodiments of the disclosure, only one frame of data may be retained in the first data queue after receiving a plurality of data segments via the broadcast channel while no audio data is received via the broadband channel, as shown in FIG. 25, to ensure the low latency performance of live broadcast.

After the audio data sent via the broadband channel is received, the audio data is saved into the second data queue, and the step of determining the first synchronization time point based on the data in the first data queue and the second data queue is performed.

In some embodiments, the case of data loss caused by the degraded quality of broadcast information due to factors such as bad weather may occur during the process of starting to play. In the following embodiments, by way of example, the first media data is video data, and the second media data is audio data.

After receiving a command to play a broadcast program, if the audio data sent via the broadband channel is received and saved in the second data queue and the video data sent via the broadcast channel is not received, then the audio data sent via the broadband channel continues to be received.

If the number of audio frames in the second data queue exceeds the upper limit of the number of frames, the data of audio frame with the earliest timestamp is deleted. The number of audio frames deleted each time may be one or more.

After the video data sent via the broadcast channel is received, the video data is saved into the first data queue, and the step of determining the first synchronization time point based on the data in the first data queue and the second data queue is performed.

In some embodiments, during the process of playing the broadcast program, if the case of data loss caused by the degraded quality of broadcast information due to factors such as bad weather occurs, that is, if the first media data sent via the broadcast channel is not received and the cached data in the first data queue is 0, the second media data sent by the broadband channel continues to be received, and the second media data is saved into the second data queue.

Here, when all the cached data in the data queue corresponding to the broadcast channel has been output, the data queue waits to receive new data, the player is marked as waiting state, both the audio data and video data stop being injected into the decoder, and a still frame of image is displayed on the display apparatus with no sound. The still frame of image refers to the final decoded and rendered image. During the waiting state, the broadband channel continues to pull streams.

Whether the number of data frames in the second data queue exceeds the upper limit of the number of frames is detected.

If the number of data frames in the second data queue exceeds the upper limit of the number of frames, the data of frame with the earliest timestamp in the second data queue is deleted.

In some embodiments, the second media data can be audio media segments. When the number of data frames in the second data queue exceeds the upper limit of the number of frames, a preset number of audio frames with earliest timestamps are deleted. The preset number may be one or more.

In some embodiments, the second media data is video media segments, and the video frame data in units of frames may be deleted based on the total number of video frames, the number of key frames, etc., which has been described in detail above and will not be repeated here.

If the number of data frames in the second data queue does not exceed the upper limit of the number of frames, the second media data continue to be received and saved into the second data queue, and the step of detecting whether the number of data frames in the second data queue exceeds the upper limit of the number of frames is performed.

After the broadcast signal is restored, that is, after the first media data sent via the broadcast channel is received, the first media data is saved into the first data queue.

Whether a data skip occurs in the first media data will be detected.

In some embodiments, the step of detecting whether a data skip occurs in the first media data may include: determining a difference between a display timestamp of a first frame of data and a display timestamp of a frame of data preceding the first frame of data in the current first data queue; where the frame of data preceding the first frame of data refers to the last frame of data decoded by the decoder after injecting data into the decoder; determining whether the difference is greater than two maximum frame intervals; determining that a data skip occurs in the first media data if the difference is greater than or equal to two maximum frame intervals; and determining that no data skip occurs in the first media data if the difference is less than two maximum frame intervals.

If a data skip is detected in the first media data, the second synchronization time point is determined to be the timestamp corresponding to the first frame of data in the first data queue.

The frame data of the second synchronization time point in the first data queue and the second data queue is sent to the decoder, so that the decoder can decode the frame data of the second synchronization time point.

After the frame data of the second synchronization time point in the first data queue and the second data queue is sent to the decoder, the decoder can decode the frame data of the second synchronization time point, and can send the decoded data to the renderer to render and play the decoded audio and video data. Meanwhile, the state of the player can change to the playing state.

In some embodiments, if no data skip is detected in the first media data, the step of determining the first synchronization time point based on the data in the first data queue and the second data queue can be performed.

Figure 26:
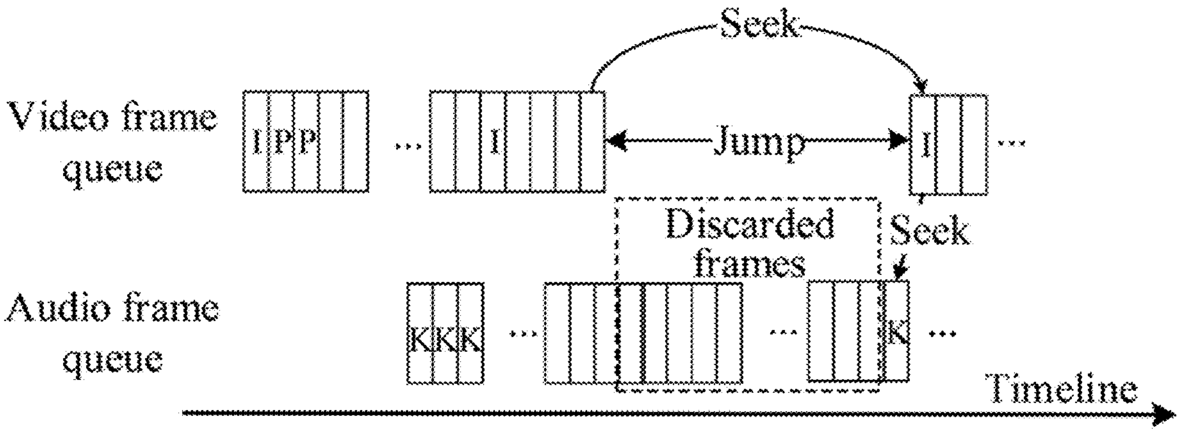
FIG. 26 shows a second schematic diagram illustrating audio and video alignment and discarding frames according to some embodiments of the disclosure.

In some embodiments, when the first media data is video media segment and the second media data is audio media segment, as shown in FIG. 26, after the video frame of the broadcast channel is lost (data skip), the display timestamp of the received first key frame is used as the second synchronization time point, and the audio frame data of the second synchronization time point and the first key frame data are sent to the decoder for decoding.

Figure 27:
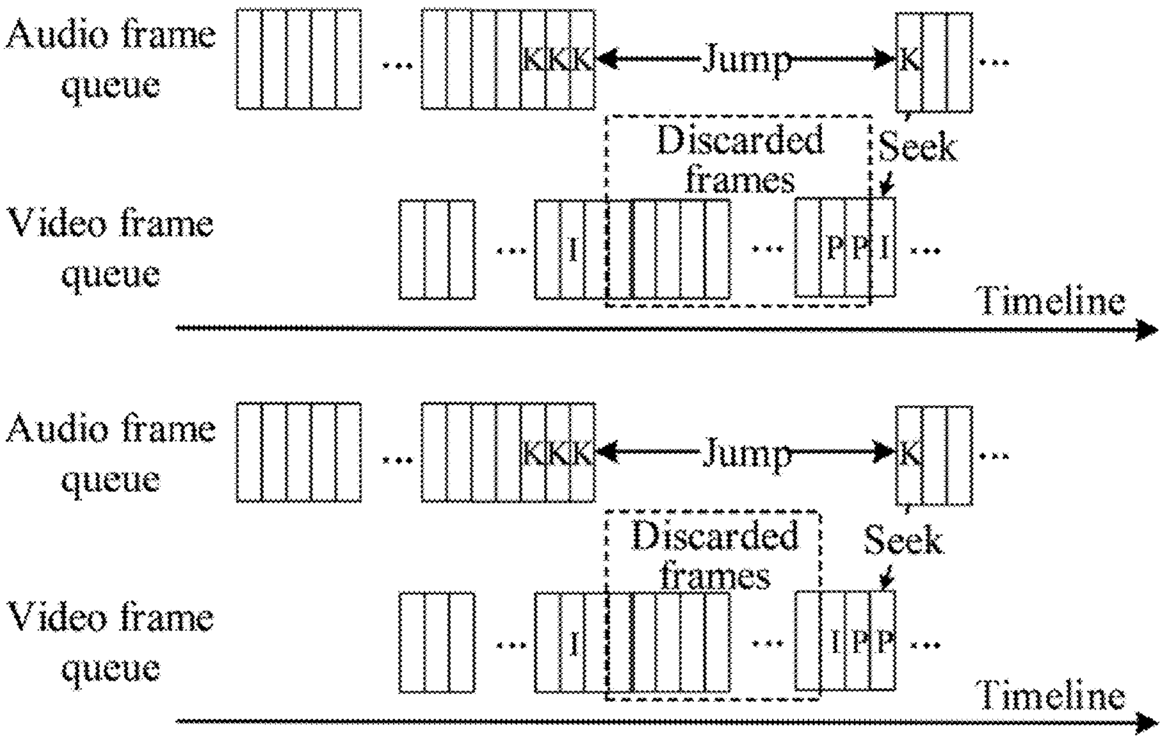
FIG. 27 shows a third schematic diagram illustrating audio and video alignment and discarding frames according to some embodiments of the disclosure.

In some embodiments, when the first media data is audio media segment and the second media data is video media segment, the display timestamp of the received first audio frame is used as the second synchronization time point. If the video frame at the second synchronization time point is a key frame, the audio and video data corresponding to the second synchronization time point may be directly injected into the decoder; if the video frame at the second synchronization time point is not a key frame, a target key frame is determined, where the target key frame is a key frame before the first synchronization time point in the first data queue; the data of the target key frame and after the target key frame are sent to the decoder, and the audio frame data of the target time point is sent to the decoder, where video frames with timestamps earlier than the first synchronization time point are not used in rendering, as shown in FIG. 27.

In some embodiments, if an abnormal situation occurs due to network congestion during the process of playing the broadcast program, that is, if the second media data sent via the broadband channel is not received and the cached data in the second data queue is 0 during the process of playing the broadcast program, the first media data sent via the broadcast channel continues to be received, and the first media data is saved into the first data queue.

Here, all the cached data in the second data queue corresponding to the broadband channel has been output due to the network congestion. At this time, the player is marked as waiting state, both the audio data and video data stop being injected into the decoder, and a still frame of image is displayed on the display apparatus with no sound. During the waiting state, the broadcast channel continues to receive data.

After the second media data sent via the broadband channel is received, the second media data is saved into the second data queue.

In some embodiments, whether the number of data frames in the first data queue reaches the upper limit of the number of frames will be determined.

If the number of data frames in the first data queue does not reach the upper limit of the number of frames, the first frames of data in the first data queue and the second data queue is sent to the decoder, so that the decoder can decode the first frames of data.

It should be noted that, if the number of data frames in the first data queue does not reach the upper limit of the number of frames, meaning that the operation of deleting data has not occurred in the first data queue, that is to say, no data skip occurs, then the first frames of data in the first data queue and the second data queue may be directly sent to the decoder.

When continuing to receive the second media data sent via the broadband channel, if the number of data frames in the second data queue exceeds the upper limit of the number of frames, the data of frame with the earliest timestamp in the second data queue is deleted.

In some embodiments, the first media data is audio media segment. When the number of data frames in the first data queue exceeds the upper limit of the number of frames, a preset number of audio frames with earliest timestamps are deleted. The preset number may be one or more.

In some embodiments, the first media data is video media segment. When the number of data frames in the first data queue exceeds the upper limit of the number of frames, the data of video frame before the last key frame in the first data queue may be deleted, and only the last frame of data is retained.

While deleting the frame data in the second data queue, the player can change from the waiting state to the seeking state.

In some embodiments, if the number of data frames in the first data queue does not reach the upper limit of the frame number, the upper limit flag bit is 0; if the number of data frames in the first data queue reaches the upper limit of the frame number, the upper limit flag bit is 1, and the data frame with the earliest timestamp in the first data queue is deleted. The value of the upper limit flag bit may be used to indicate whether the first data queue has reached the upper limit of the number of frames.

After receiving the second media data sent via the broadband channel, if the number of data frames in the first data queue reaches the upper limit of the number of frames, the universal time coordinated of the operator server is calculated according to the current local system time and the time difference between the server system time and the local system time; the second media data starting from the universal time coordinated sent via the broadband channel is received and saved into the second data queue; the first synchronization time point is determined based on the data in the first data queue and the second data queue; and the frame data at the first synchronization time point in the first data queue and the second data queue is sent to the decoder, so that the decoder can decode the frame data at the first synchronization time point. The decoder can decode the frame data at the first synchronization time point, and can send the decoded data to the renderer to render and play the decoded audio and video data. Meanwhile, the state of the player can change to the playing state.

In some embodiments, if the number of data frames in the first data queue reaches the upper limit of the number of frames, the step of determining the first synchronization time point based on the data in the first data queue and the second data queue may be performed.

In some embodiments, after receiving the second media data sent via the broadband channel and saving the second media data into the second data queue, the step of detecting whether a data skip occurs in the first media data may be directly performed.

Figure 28:
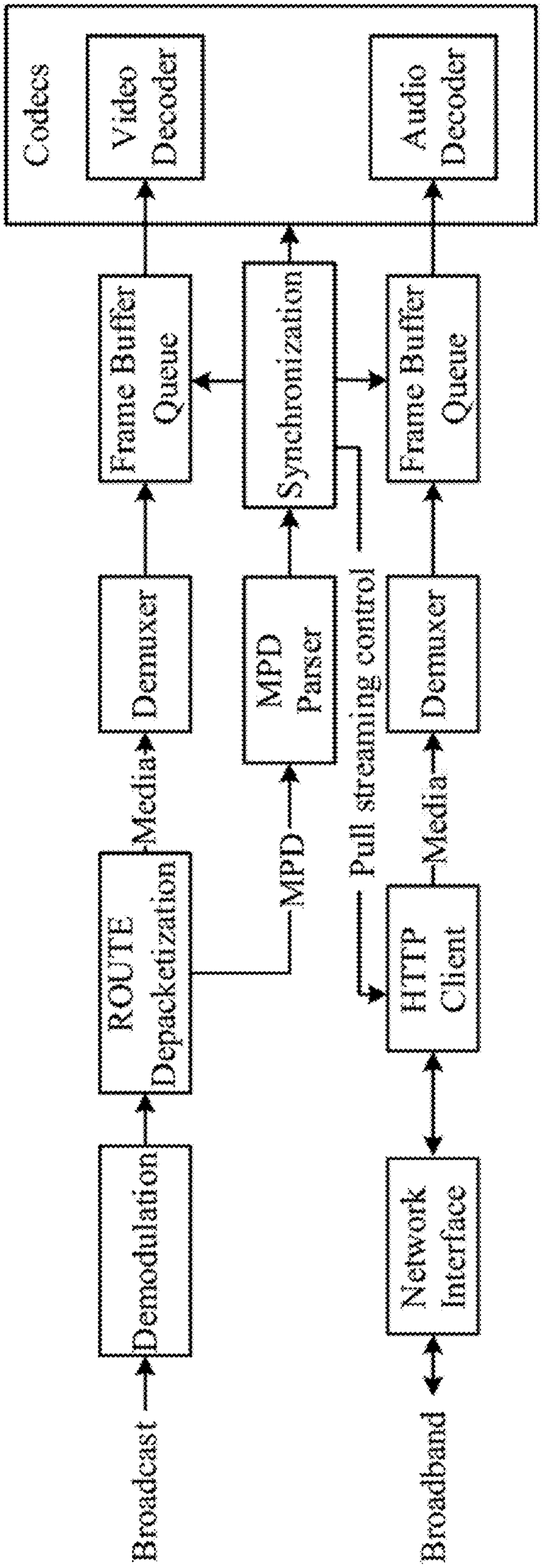
FIG. 28 shows a diagram of basic functional modules in a hybrid playing scenario according to some embodiments of the disclosure.

In some embodiments, a diagram of basic functional modules for playing in a mixed scenario is shown in FIG. 28. The broadcast channel is used to obtain the MPD signaling information and Media data by Demodulation and ROUTE Depacketization on the received signal, send the Media data to a Demuxer, and send the MPD signaling information to an MPD parser. The Demuxer demultiplexes the Media data and then can save the Media data into the Frame Buffer Queue, and the MPD parser can send the parsed information to a synchronization module (Synchronization). The synchronization module can pull the corresponding media stream according to the time of the current operator server, the client (HTTP Client) can download the corresponding data through a network interface, the client can send the media data to the Demuxer, and the Demuxer demultiplexes the Media data and then can save the Media data into the frame data queue. The synchronization module can complete decoding synchronization based on two data queues.

Figure 29:
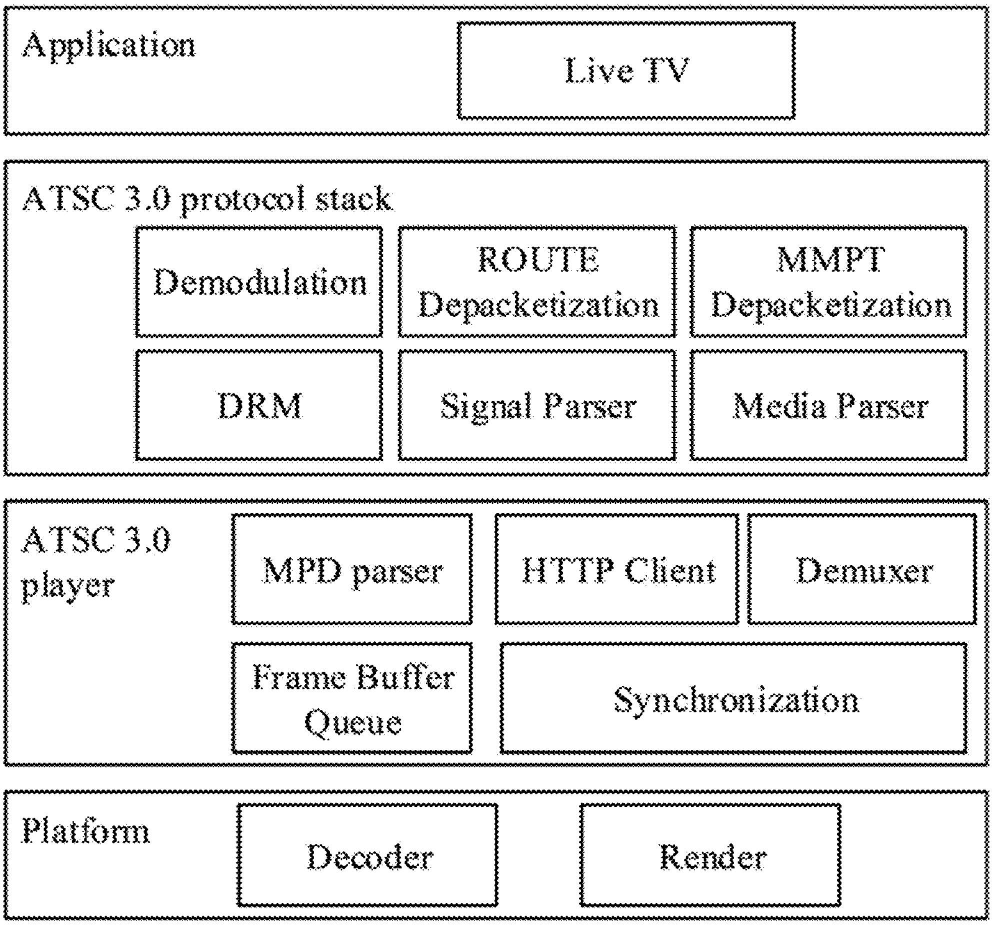
FIG. 29 shows a system architecture diagram according to some embodiments of the disclosure.

In some embodiments, the system architecture diagram is shown in FIG. 29. The Live TV (live broadcast application) can send a channel switching instruction to the ATSC 3.0 protocol stack and player. The ATSC 3.0 protocol stack can perform frequency locking, demodulation, demux/filter and ROUTE depacketization operations, and then continuously outputs the signaling information containing MPD and Media data segments to ATSC 3.0 player. The ATSC 3.0 player immediately sets the state as the seeking state after receiving the channel switching instruction, can receive the MPD signaling and determines that the program contains IP channel audio or video data, and starts IP stream pulling through the network client (in order to obtain Media data segments). The Media data segments of the broadcast channel and the Media data segments of the IP channel are decapsulated by the Demuxer module to obtain the ES Frame (elementary frame). The ES Frame is put into the frame data queue for caching. The data in the two frame data queues is synchronized and then injected into the back-end decoder/render for decoding and display. The Synchronization module is responsible for Hybrid channel synchronization processing: the data of media segments is basically synchronized by reconstructing the operator server time and accurately pulling streams; and the frame data queue is accurately synchronized by losing frames.

Figure 30:
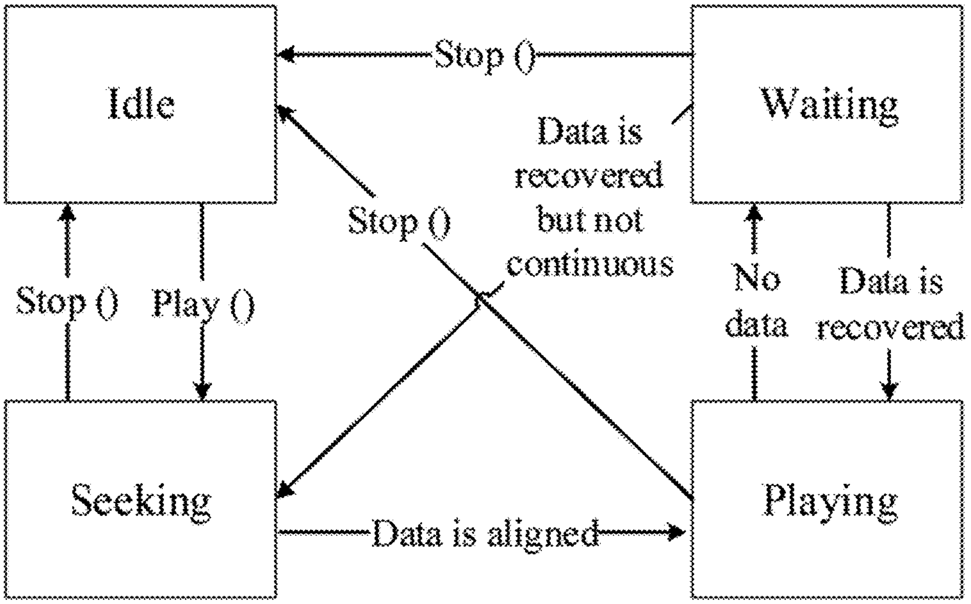
FIG. 30 shows a schematic diagram of state transition of a player according to some embodiments of the disclosure.

In some embodiments, as shown in FIG. 30, when starting to play, the player state can change from "Idle" to "Seeking". After performing the synchronization operation (stream pulling synchronization and frame data queue synchronization) during the process of starting to play, the state can change to "Playing". If the low level occurs and there is no data in the playing process, the player state can change to "Waiting", to wait for new data. After the new data arrives, if the new data is continuous, the player state resumes to "Playing"; if there is a data skip, the player state can change to "Seeking" again. The playing is stopped in any other state, and the player state is set to "Idle".

The broadcast program playing method provided by some embodiments of the disclosure, is applicable to a display apparatus. The display apparatus may include a display, and at least one processor configured to execute computer instructions to cause the display apparatus to: calculate universal time coordinated of an operator server in response to a command to play a broadcast program; receive first media data sent via a broadcast channel and store the first media data in a first data queue, and receive second media data starting from the universal time coordinated sent via a broadband channel and store the second media data in a second data queue, where the first media data and the second media data have different media types, and the media types may include audio type and video type; determine a first synchronization time point based on data in the first data queue and the second data queue; and send frame data of the first synchronization time point in the first data queue and the second data queue to a decoder, so that the decoder can decode the frame data of the first synchronization time point. The embodiments of the disclosure accurately pull data streams of the broadband channel according to the universal time coordinated based on the operator server, and quickly achieve the audio and video synchronization effect of the broadcast program through precise synchronization of data queues, thereby improving the user experience.

In some embodiments, a switch from small window preview to full-screen playing or from full-screen playing to small window preview through the video scaling function may be shown via the display apparatus provided by the disclosure. During the video scaling process, the video window of the user interface layer and the video image of the video layer coordinate for display. However, the display of the video window and the display of the video image are performed in two different processes.

In some embodiments, as shown in FIG. 31, after receiving a video scaling command input from the user, the browser can send the rendering data of the user interface to the Graphics Processing Unit (GPU), and can simultaneously inject the coordinate data of the video display into the player, where the rendering data may include the coordinate data of the video display. The player can send the coordinate data to the underlying decoder, and the underlying decoder can decode the video data and sets a playing window according to the coordinate data. The decoded video data is played in the playing window, and the display 260 is controlled to display the playing window. The GPU can receive the rendering data of the user interface to render the user interface, and can draw a video window on the user interface based on the coordinate data. The video window is in the transparent state, and the display 260 can be controlled to display the drawn user interface.

The video window can be obtained by rendering through the GPU, the video image can be displayed by decoding through the underlying decoder. The rendering speed of the video window can be significantly faster than the display speed of the video image, so that the video window and video image cannot be displayed at the same time after obtaining the same display coordinates. The video playing performance is very much dependent on the underlying chip. The stronger the performance of the underlying chip, the faster the display speed of the video image. However, the display speed of the video image is still difficult to reach the rendering speed of the video window.

Figure 33:
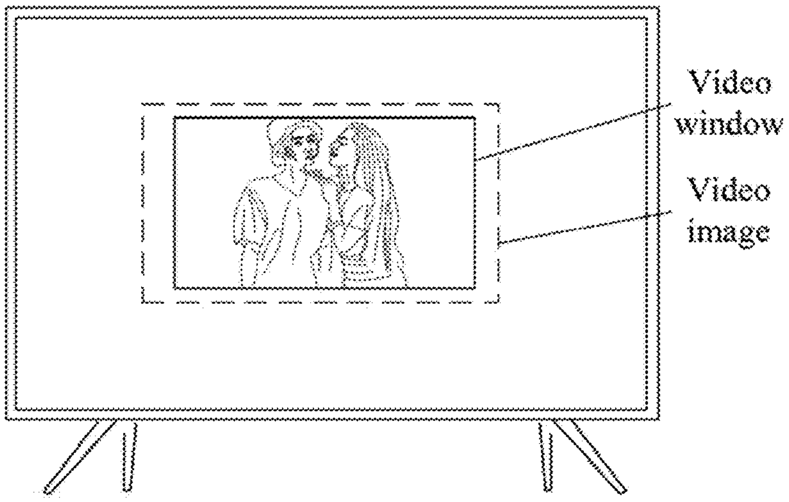
FIG. 33 shows a schematic diagram of another video scaling interface according to some embodiments of the disclosure.

During the switch from small window preview to full-screen playing, since the display of the video image is slower than the display of the video window, the video window is larger than the video image, and edges of a background color appear, as shown in FIG. 32. During the switch from full-screen playing to small window preview, since the display of the video image is slower than the display of the video window, the video window is smaller than the video image, the periphery of the video image is covered by the video window, and the played image is incomplete, that is, the edge cutting phenomenon occurs, as shown in FIG. 33.

In some embodiments, in order to display the video window and the video image synchronously, a video window waiting mechanism may be set. That is, the video window can be displayed after waiting for a fixed duration. However, if the refresh frequency of the user interface is 60 times per second, the refresh interval of each image is about 16.67 ms; if the video window is displayed after waiting for a fixed duration of 60 ms, the refresh interval of each image can be 60 ms. Some data will be lost during the waiting process, and the refresh rate will be correspondingly reduced to about 15 fps. Therefore, the way to display the video window after waiting for a fixed duration may cause a loss to the refresh rate.

Figure 34:
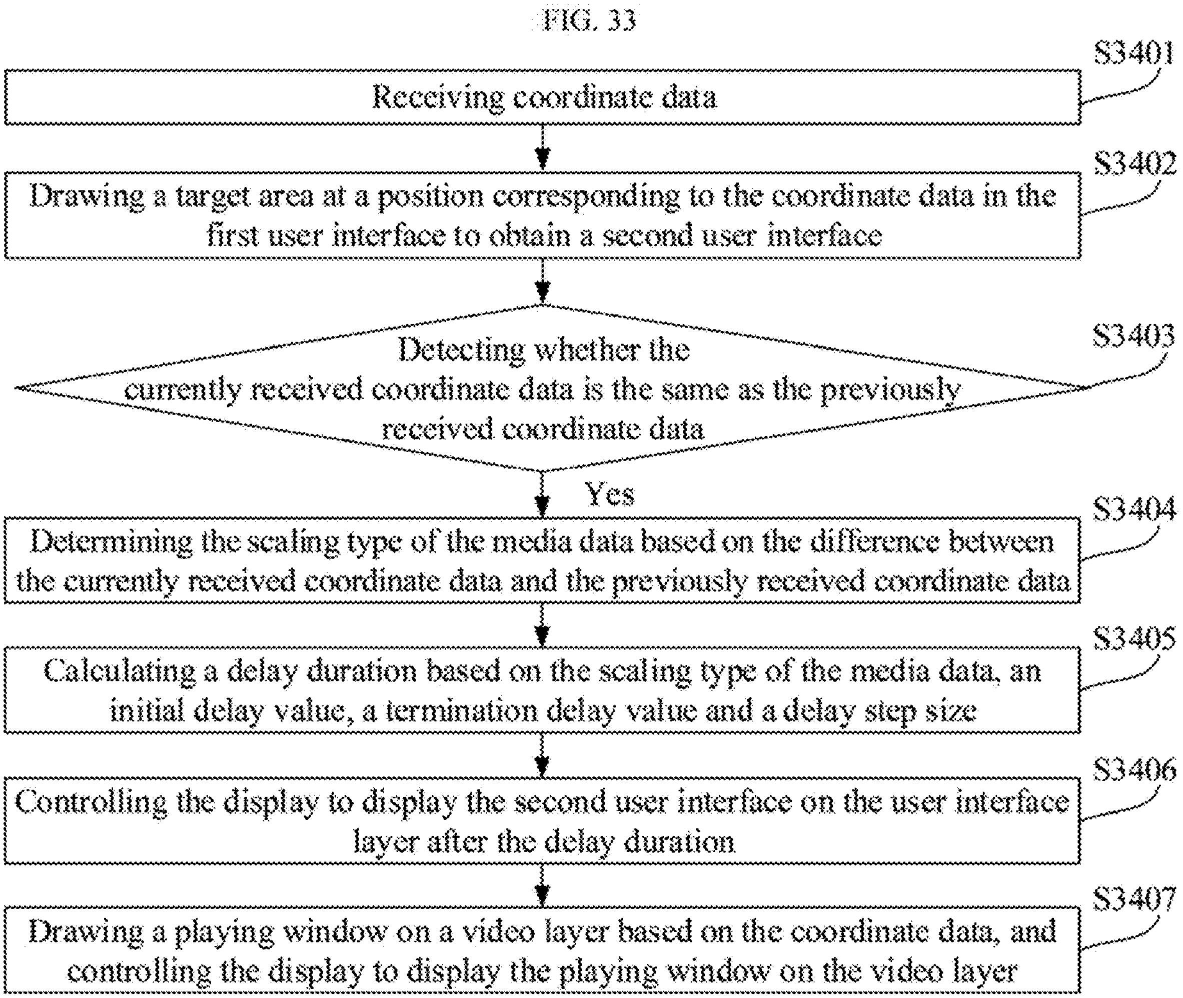
FIG. 34 shows a flow chart of a method for displaying media data according to some embodiments of the disclosure.
Figure 35:
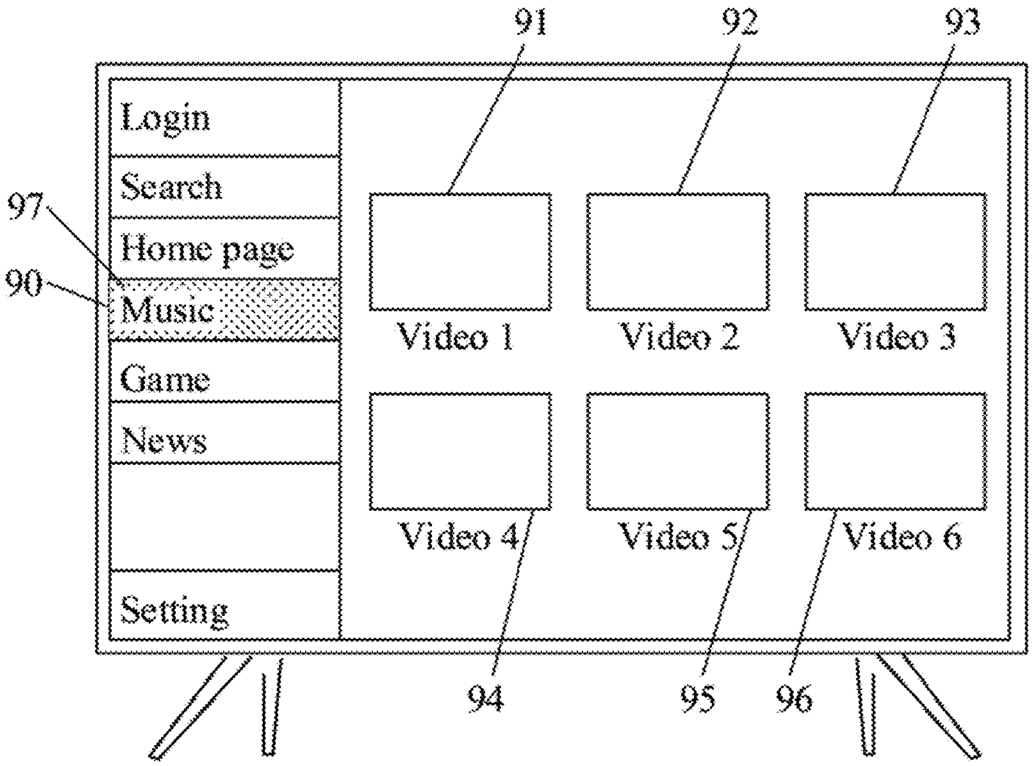
FIG. 35 shows a schematic diagram of a media interface according to some embodiments of the disclosure.

In view of the above issues, some embodiments of the disclosure provide a display apparatus. The structure of the display apparatus and the functions of all parts can refer to the above embodiments. In addition, on the basis of the display apparatus shown in the above embodiments, some functions of the display apparatus are further improved in these embodiments. As shown in FIG. 34, the display apparatus can perform the following steps.

S3401: receiving coordinate data, where the coordinate data is coordinate data of a display position of the media data.

In some embodiments, the step of receiving the coordinate data may include: receiving a command to power on, turn on an application or display a media interface input from a user, such as the first command in the aforementioned embodiments; controlling a display to display a first user interface in response to the command, where the first user interface may include at least one media control; and receiving coordinate data corresponding to a media control after receiving a selection on the media control, where receiving the selection on the media control may include: detecting that a focus stays on the media control for more than a preset time; drawing a target area at a position corresponding to the coordinate data in the first user interface to obtain a target user interface, where the target area is in a transparent state; controlling the display to display the target user interface; drawing a playing window on a video layer based on the coordinate data, where the playing window is used to display the media data; and controlling the display to display the playing window on the video layer; and receiving coordinate data after receiving a confirmation operation on the media control from the user, where the coordinate data is the coordinate data of the display position of the media data corresponding to the media control.

It should be noted that, before receiving the confirmation operation on the media control from the user, the browser can send the coordinate data at a preset time interval, and the sent coordinate data does not change. After receiving the confirmation operation on the media control from the user, the browser can send the coordinate data at a preset time interval, and the sent coordinate data is in a changing state.

Exemplarily, based on that the command to display the media interface input from the user, the display 260 is controlled to display the media interface, as shown in FIG.

35. The media interface may include a music control 90, a first media control 91, a second media control 92, a third media control 93, a fourth media control 94, a fifth media control 95, a sixth media control 96 and a focus 97. The current focus 97 indicates that the music control 90 is selected.

Figure 36:
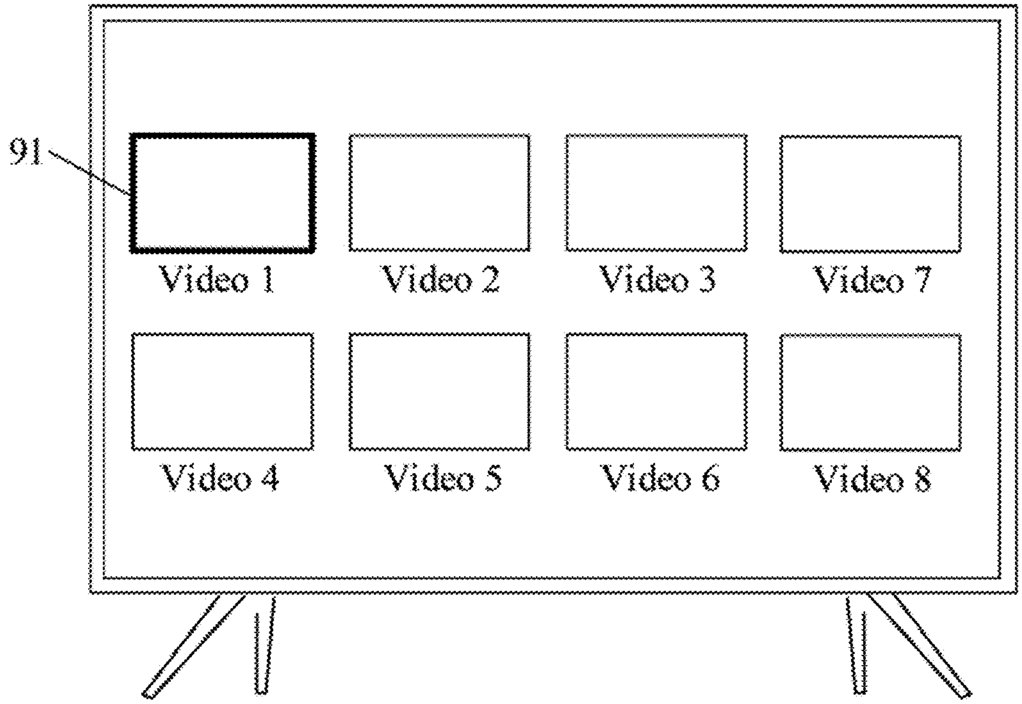
FIG. 36 shows a schematic diagram of another media interface according to some embodiments of the disclosure.

After receiving a command input from the user by pressing the right button of the control device 100, the media interface as shown in FIG. 36 is displayed, and the current focus 97 indicates that the first media control 91 is selected. After detecting that the focus 97 stays on the first media control 91 for more than 1 second, the browser can send the coordinate data of the first media control 91 to the GPU, so that the GPU can draw the target area according to the coordinate data, and the target area is in the transparent state. Meanwhile, the browser also needs to send the coordinate data of the first media control 91 to the player, and the player can send the coordinate data to the decoder so that the decoder sets the playing window according to the coordinate data. The decoder also needs to receive and decode the media data corresponding to the first media control 91 so that the decoded media data can be displayed in the playing window. Here, the media data is video media segment. The media data corresponding to the current first media control 91 is played at the position of the first media control 91.

The command input from the user by pressing the confirmation key of the control device 100 is received, the coordinate data sent by the browser continues to be received, and the coordinate data received thereafter changes.

In the embodiments of the disclosure, when the focus stays on a media control, the media data corresponding to the media control may be automatically played at the position of the media control, so as to achieve the effect of small window preview. The subsequent video enlargement operation is started after the confirmation operation on the media control is received.

In some embodiments, the step of receiving the coordinate data may include: receiving a command to power on, turn on an application or display a media interface input from a user; controlling a display to display a first user interface in response to the command, where the first user interface may include at least one media control; and receiving the coordinate data after receiving the user's confirmation operation on the media control.

It should be noted that, after receiving the confirmation operation on the media control from the user, the browser can send the coordinate data at a preset time interval, and the sent coordinate data changes.

Exemplarily, in response to the command to display the media interface input from the user, the display 260 is controlled to display the media interface. As shown in FIG. 36, the current focus 97 indicates that the first media control 91 is selected. The command input from the user by pressing the confirmation key of the control device 100 is received, the coordinate data sent by the browser is received, and the coordinate data is in a changing state.

In the embodiments of the disclosure, when the focus stays on a media control, the media data corresponding to the media control is not played at the position of the media control. The subsequent video enlargement operation is started only after the confirmation operation on the media control is received.

In some embodiments, the step of receiving the coordinate data may include: receiving a command to exit full-screen playing input from a user; and receiving the coordinate data in response to the command, where the coordinate data is in a changing state.

In some embodiments, when the display position of the media data overlaps with the position of the media control, the media data can still be played at the position of the media control.

In some embodiments, when the display position of the media data overlaps with the position of the media control, the media data stops being played.

S3402: drawing a target area at a position corresponding to the coordinate data in the first user interface to obtain a second user interface, where the target area is in the transparent state.

The GPU can receive the rendering data sent from the browser. In addition to the data of the first user interface, the rendering data may also include coordinate data. After the first user interface is drawn, the target area is determined based on the coordinate data, and the target area is set to the transparent state, thereby obtaining the second user interface.

S3403: detecting whether the currently received coordinate data is the same as the previously received coordinate data.

The browser can send the coordinate data to the middleware, and the middleware can save the coordinate data after receiving the coordinate data. After the coordinate data is received again, the current coordinate data is compared with the coordinate data received last time, to determine whether the coordinate data changes.

Figure 37:
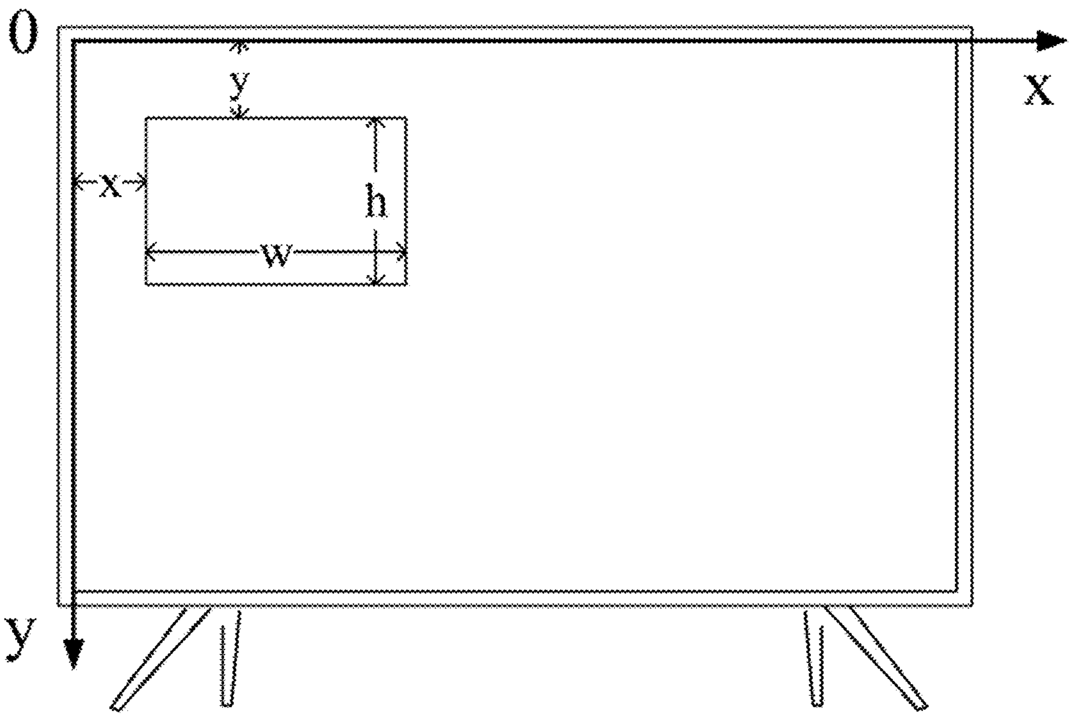
FIG. 37 shows a schematic diagram of a method for establishing a coordinate system according to some embodiments of the disclosure.

In some embodiments, as shown in FIG. 37, a rectangular coordinate system is established with a vertex (such as the upper left vertex) of the display screen as the coordinate origin and two adjacent sides close to the coordinate origin as x-axis and y-axis. The coordinate data of the display position of the media data or the media control is expressed by (x, y, w, h), where x is the minimum value of the abscissa of the display position of the media data or the media control in the coordinate system, y is the minimum value of the ordinate of the display position of the media data or the media control in the coordinate system, w is the width of the display position of the media data or the media control, and h is the height of the display position of the media data or the media control.

The step of detecting whether the currently received coordinate data is the same as the previously received coordinate data may include: detecting whether the abscissa in the currently received coordinate data is the same as the abscissa in the previously received coordinate data; based on that the abscissa in the currently received coordinate data is not the same as the abscissa in the previously received coordinate data, determining that the currently received coordinate data is different from the previously received coordinate data; based on that the abscissa in the currently received coordinate data is the same as the abscissa in the previously received coordinate data, detecting whether the ordinate in the currently received coordinate data is the same as the ordinate in the previously received coordinate data; based on that the ordinate in the currently received coordinate data is not the same as the ordinate in the previously received coordinate data, determining that the currently received coordinate data is different from the previously received coordinate data; based on that the ordinate in the currently received coordinate data is the same as the ordinate in the previously received coordinate data, detecting whether the width in the currently received coordinate data is the same as the width in the previously received coordinate data; based on that the width in the currently received coordinate data is not the same as the width in the previously received coordinate data, determining that the currently received coordinate data is different from the previously received coordinate data; based on that the width in the currently received coordinate data is the same as the width in the previously received coordinate data, detecting whether the height in the currently received coordinate data is the same as the height in the previously received coordinate data; based on that the height in the currently received coordinate data is not the same as the height in the previously received coordinate data, determining that the currently received coordinate data is different from the previously received coordinate data; based on that the height in the currently received coordinate data is the same as the height in the previously received coordinate data, determining that the currently received coordinate data is the same as the previously received coordinate data.

According to some embodiments of the disclosure, it is determined that the two coordinate data are different as long as one of the abscissa, ordinate, width and height values is different. There is no limit to the order in which the abscissas, ordinates, widths and heights are compared.

If it is detected that the currently received coordinate data is different from the previously received coordinate data, S3404 is executed: determining a scaling type of the media data based on a difference between the currently received coordinate data and the previously received coordinate data.

In some embodiments, if the difference between the abscissa/ordinate in the currently received coordinate data and the abscissa/ordinate in the previously received coordinate data is greater than 0, it is determined that the scaling type of the media data is scaling down.

If the difference between the abscissa/ordinate in the currently received coordinate data and the abscissa/ordinate in the previously received coordinate data is less than 0, it is determined that the scaling type of the media data is scaling up.

In some embodiments, if the difference between the width/height in the currently received coordinate data and the width/height in the previously received coordinate data is less than 0, it is determined that the scaling type of the media data is scaling down.

If the difference between the width/height in the currently received coordinate data and the width/height in the previously received coordinate data is greater than 0, it is determined that the scaling type of the media data is scaling up.

Here, the scaling type may be determined by calculating the difference in only one of the abscissa, ordinate, width and height. However, if the calculated difference is 0, another one of the abscissa, ordinate, width and height may be selected to calculate the difference to determine the scaling type.

It should be noted that the scaling type of the media data only needs to be determined once, that is, the scaling type of the media data is determined when the coordinate data changes for the first time, and the scaling type of the media data does not need to be determined when the coordinate data changes for the second time.

In some embodiments, after detecting that the currently received coordinate data is different from the previously received coordinate data, the cumulative number of scalings is increased by 1.

If the cumulative number of scalings is 1, the flow goes to S3404.

If the cumulative number of scalings is not 1, the flow goes to S3405.

S3405: calculating a delay duration based on the scaling type of the media data, an initial delay value, a termination delay value and a delay step size.

The middleware can obtain the initial delay value, the termination delay value and the delay step size, and calculates the delay duration based on the initial delay value, the termination delay value and the delay step size. Here, the initial delay value is the time it takes for the player to obtain the data until the playing is completed, and is stored locally as a configurable parameter. The initial delay value is related to the chip playing performance. The termination delay value is obtained by an experimental verification method. The termination delay value may vary depending on different application platforms. In some embodiments, a specific verification method is as follows: adding sleep waiting time when the user interface finishes drawing and is about to be displayed, until the video window can be displayed and control is released, and obtaining the value that causes the last user interface and the playing window to be displayed simultaneously during this process by testing as the termination delay value.

In some embodiments, if the scaling type is scaling up, the step of calculating the delay duration based on the initial delay value, the termination delay value and the delay step size may include: calculating a planned delay duration based on the initial delay value, the delay step size and the cumulative number of scalings; here, planned delay duration=initial delay value−(the cumulative number of scalings−1)×delay step size; if the planned delay duration is less than or equal to the termination delay value, then the current delay duration is the termination delay value; if the planned delay duration is greater than the termination delay value, the current delay duration is the planned delay duration.

It should be noted that the way to obtain the delay step size in the scaling up process is as follows: after the initial delay value is obtained, the user interface is also controlled to wait for the playing window to be displayed, the delay value for the second user interface and the playing window to be displayed simultaneously is obtained, and this delay value is subtracted from the initial delay value to obtain basic change data, i.e., the delay step size. Subsequent changes may be based on this step size. The initial delay value, termination delay value and delay step size are all pre-stored locally, and the required data may be selected based on the chip performance and/or application name.

For example, the initial delay value is 60 ms, the termination delay value is 10 ms, and the delay step size is 5 ms. After the media data begins to be scaled up, the delay duration corresponding to reception of the first coordinate data is 60 ms, the delay duration corresponding to reception of the second coordinate data is 55 ms, . . . , the delay duration corresponding to reception of the eleventh coordinate data is 10 ms, the delay duration corresponding to reception of the twelfth coordinate data is 10 ms, . . . .

In some embodiments, if the scaling type is scaling down, the step of calculating the delay duration based on the initial delay value, the termination delay value and the delay step size may include: determining whether the current coordinate change value is less than or equal to the last coordinate change value; if the current coordinate change value is less than or equal to the last coordinate change value, calculating the current delay duration based on the termination delay value, the delay step size and the cumulative number of scalings; here, current delay duration=termination delay value+(the cumulative number of scalings−1)×delay step size; if the current coordinate change value is greater than the last coordinate change value, calculating a planned delay duration; where the planned delay duration is the difference between the last delay duration and the delay step size; that is, planned delay duration=last delay duration−delay step size; if the planned delay duration is smaller than or equal to the delay step size, the current delay duration is the delay step size; if the planned delay duration is greater than the delay step size, the current delay duration is the planned delay duration.

Exemplarily, the termination delay value is 10 ms, and the delay step size is 5 ms. After the media data begins to be scaled down, the delay duration corresponding to reception of the first coordinate data is 10 ms, the delay duration corresponding to reception of the second coordinate data is 15 ms, . . . , the delay duration corresponding to reception of the seventh coordinate data is 40 ms, the delay duration corresponding to reception of the eighth coordinate data is 30 ms, . . . , the delay duration corresponding to reception of the twelfth coordinate data is 10 ms, and the delay duration corresponding to reception of the thirteenth coordinate data is 10 ms, . . . .

It should be noted that the delay step size in the scaling down process is not the same as the delay step size in the scaling up process. During the scaling down process, the delay step size is the delay value displayed simultaneously by the last user interface and the playing window.

In some embodiments, the step of calculating the delay duration based on the initial delay value, the termination delay value and the delay step size may include: calculating a coordinate change value according to the currently received coordinate data and the previously received coordinate data; in some embodiments, the coordinate change value is a difference between the abscissa/ordinate/width/height in the currently received coordinate data and the abscissa/ordinate/width/height in the previously received coordinate data; determining a change multiple based on the current coordinate change value and the last coordinate change value; in some embodiments, the coordinate change value is calculated and then saved, and the coordinate change value is calculated again and then combined with the last calculated coordinate change value to calculate the change multiple; and calculating the delay duration based on the change multiple, the initial delay value, the termination delay value and the delay step size.

In some embodiments, the abscissa, ordinate, width and height in the coordinate data have the same change rule. The current coordinate change value may include a first abscissa change value, a first ordinate change value, a first width change value and a first height change value; and the last coordinate change value may include a second abscissa change value, a second ordinate change value, a second width change value and a second height change value. The step of determining the change multiple based on the current coordinate change value and the last coordinate change value may include: calculating an abscissa ratio of the first abscissa change value to the second abscissa change value; or calculating an ordinate ratio of the first ordinate change value to the second ordinate change value; or calculating a width ratio of the first width change value to the second width change value; or calculating a height ratio of the first height change value to the second height change value.

In some embodiments, the abscissa ratio/ordinate ratio/width ratio/height ratio is the change multiple.

In some embodiments, the rounded value of the abscissa ratio/ordinate ratio/width ratio/height ratio is the change multiple.

In some embodiments, the abscissa, ordinate, width and height in the coordinate data have slightly different change rules. The step of determining the change multiple based on the current coordinate change value and the last coordinate change value may include: calculating an abscissa ratio of the first abscissa change value to the second abscissa change value; calculating an ordinate ratio of the first ordinate change value to the second ordinate change value; calculating a width ratio of the first width change value to the second width change value; calculating a height ratio of the first height change value to the second height change value; determining a maximum value among the abscissa ratio, the ordinate ratio, the width ratio and the height ratio; and determining the change multiple to be the rounded maximum value.

After the change multiple is determined, the delay duration is calculated based on the change multiple, the initial delay value, the termination delay value and the delay step size.

In some embodiments, if the scaling type is scaling up, the step of calculating the delay duration based on the change multiple, the initial delay value, the termination delay value and the delay step size may include: if the cumulative number of scalings is 1, determining the current delay duration to be the initial delay value; and if the cumulative number of scalings is not 1, calculating a planned delay duration; where the planned delay duration is the difference between the last delay duration and a change duration, and the change duration is the product of the change multiple and the delay step size; that is, planned delay duration=last delay duration−(change multiple×delay step size).

The calculated delay duration is saved. The delay duration is calculated again and then combined with the last calculated delay duration to calculate the planned delay duration.

If the planned delay duration is less than or equal to the termination delay value, the current delay duration is the termination delay value.

If the planned delay duration is greater than the termination delay value, the current delay duration is the planned delay duration.

For example, the initial delay value is 60 ms, the termination delay value is 10 ms, and the delay step size is 10 ms.

The coordinate data received for the first time is (x 392, y 392, w 304, h 171).

The coordinate data received for the second time is (x 390, y 390, w 308, h 174), the cumulative number of scalings is 1, the delay duration corresponding to the coordinate data received for the second time is the initial delay value, and the change value is calculated as (−2, −2, 4, 3).

The coordinate data received for the third time is (x 387, y 387, w 317, h 178), the cumulative number of scalings is 2, the change value is calculated as (−3, −3, 9, 4), the change multiple is calculated as 2 according to two change values, and the delay duration corresponding to the coordinate data received for the third time=last delay duration-(change multiple×delay step size)=60-(2×10)=40 ms.

The coordinate data received for the fourth time is (x 382, y 382, w 329, h 185), the cumulative number of scalings is 3, the change value is calculated as (−5, −5, 12, 7), the change multiple is calculated as 1 according to two change values, and the delay duration corresponding to the coordinate data received for the fourth time=last delay duration-(change multiple×delay step size)=40−(1×10)=30 ms.

If the calculated delay duration is less than or equal to the termination delay value, the actual delay duration is the termination delay value.

During the scaling up and playing process of the media data, the delay duration shows a decreasing trend. After the delay duration decreases to the termination delay value, the termination delay value is always used as the delay duration. When the delay duration does not decrease to the termination delay value, the greater the coordinate change trend, the greater the change in the delay duration corresponding to the coordinate data.

In some embodiments, if the scaling type is scaling down, the step of calculating the delay duration based on the change multiple, the initial delay value, the termination delay value and the delay step size may include: determining whether the cumulative number of scalings is 1; determining the current delay duration to be the termination delay value if the cumulative number of scalings is 1; and if the cumulative number of scalings is not 1, determining whether the current coordinate change value is greater than the last coordinate change value.

In some embodiments, the abscissa, ordinate, width and height in the coordinate data have the same change rule. The step of determining whether the current coordinate change value is greater than the last coordinate change value may include: determining whether the first abscissa change value is greater than the second abscissa change value/the first ordinate change value is greater than the second ordinate change value/the first width change value is greater than the second width change value/the first height change value is greater than second height change value.

It should be noted that the comparison of coordinate change values refers to the comparison between absolute values of coordinate change values.

In some embodiments, the abscissa, ordinate, width and height in the coordinate data have slightly different change rules. The step of determining whether the current coordinate change value is greater than the last coordinate change value may include: comparing the change values of the abscissa, ordinate width and height respectively, where it may be determined that the current coordinate change value is greater than the last coordinate change value as long as one of the four change values meets the condition that the current coordinate change value is greater than the last coordinate change value; if none of the four change values meets the condition that the current coordinate change value is greater than the last coordinate change value, it is determined that the current coordinate change value is less than or equal to the last coordinate change value.

If the current coordinate change value is greater than the last coordinate change value, the current delay duration is calculated. The current delay duration is the sum of the last delay duration and the change duration, and the change duration is the product of the change multiple and the delay step size; that is, the current delay duration=last delay duration+(change multiple×delay step size).

If the current coordinate change value is less than or equal to the last coordinate change value, a planned delay duration is calculated, where the planned delay duration is the difference between the last delay duration and the change duration; that is, the planned delay duration=last delay duration−(change multiple×delay step size).

It is determined whether the planned delay duration is less than or equal to the delay step size.

If the planned delay duration is less than or equal to the delay step size, the current delay duration is the delay step size.

If the planned delay duration is greater than the delay step size, the current delay duration is the planned delay duration.

Exemplarily, the termination delay value is 10 ms, and the delay step size is 10 ms.

The coordinate data received for the first time is (x 0, y 0, w 1920, h 1080).

The coordinate data received for the second time is (x 4, y 4, w 1911, h 1075), the cumulative number of scalings is 1, the delay duration corresponding to the coordinate data received for the second time is the termination delay value, and the change value is calculated as (4, 4, −9, −5).

The coordinate data received for the third time is (x 9, y 9, w 1897, h 1067), the cumulative number of scalings is 2, the change value is calculated as (5, 5, −14, −8), the change multiple is calculated as 1 according to two change values, and it is determined that the current coordinate change value is greater than the last coordinate change value, and then the delay duration corresponding to the coordinate data received for the third time=last delay duration+(change multiple× delay step size)=10+(1×10)=20 ms.

The coordinate data received for the fourteenth time is (x 185, y 185, w 1459, h 821), the change value is (22, 22, −55, −31), and the delay duration is 50 ms.

The coordinate data received for the fifteenth time is (x 207, y 207, w 1405, h 790), the change value is (22, 22, −54, −31), the change multiple is calculated as 1 according to two change values, and it is determined that the current coordinate change value is less than the last coordinate change value, and then the delay duration corresponding to the coordinate data received for the fifteenth time=last delay duration−(change multiple×delay step size)=50−(1×10)=40 ms.

If the calculated delay duration is less than or equal to the delay step size, the actual delay duration is the delay step size.

During the scaling down and playing process of the media data, the delay duration firstly increases and then decreases. After the delay duration decreases to the delay step size, the delay step size is always used as the delay duration. When the delay duration does not decrease to the delay step size, the greater the coordinate change trend, the greater the change in the delay duration corresponding to the coordinate data.

S3406: controlling the display to display the second user interface on the user interface layer after the delay duration.

After the drawing of the second user interface is completed, the browser will call the display interface to display the second user interface, that is, control the display to display the second user interface. However, in the disclosure, in order to delay the display of the second user interface, the middleware will intercept the browser's call to the display interface, and stop intercepting the browser's call to the display interface after the delay duration calculated by the middleware, so that the display displays the second user interface after the delay duration.

S3407: drawing a playing window on a video layer based on the coordinate data, where the playing window is used to play the media data; and controlling the display to display the playing window on the video layer, where the video layer is provided below the user interface layer.

The browser can send the coordinate data to the GPU and the middleware at the same time, and the middleware can send the coordinate data to the player. After receiving the coordinate data, the player can send the coordinate data to the underlying decoder. After receiving the data, the underlying decoder sets the playing window and can decode the corresponding media data for display in the playing window, and the display is controlled to display the playing window on the video layer.

Figure 38:
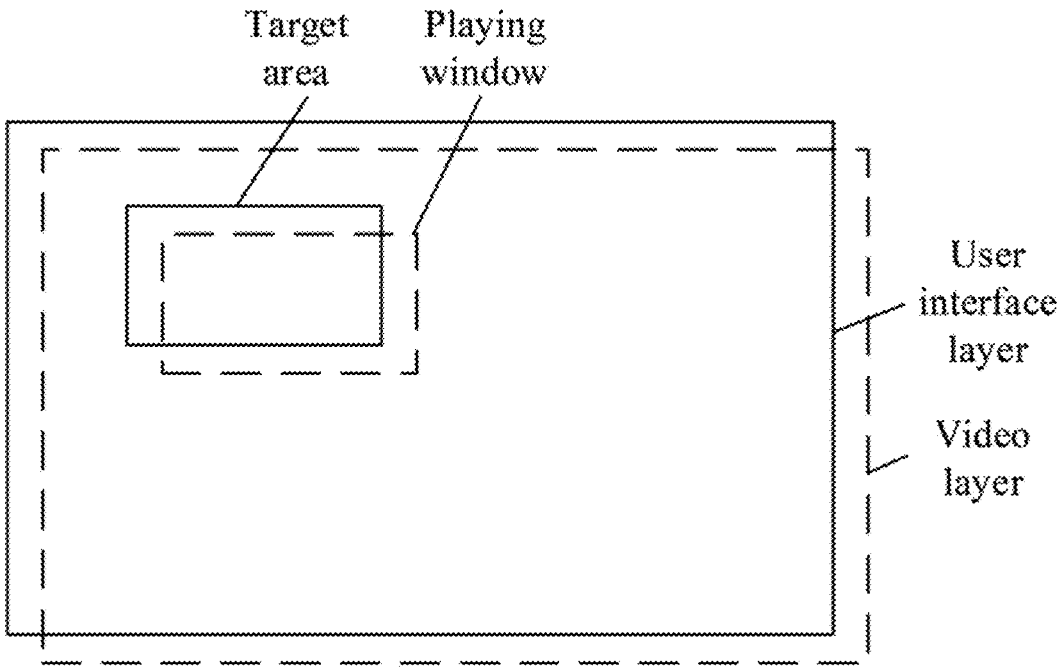
FIG. 38 shows a schematic diagram illustrating a positional relationship between a user interface layer and a video layer according to some embodiments of the disclosure.

As shown in FIG. 38, the video layer is provided below the user interface layer, and the second user interface is displayed on the user interface layer after the delay duration, so that the target area of the second user interface of the user can overlap with the position of the playing window of the video layer, and the media data played in the playing window can not be blocked by the second user interface.

Figure 39:
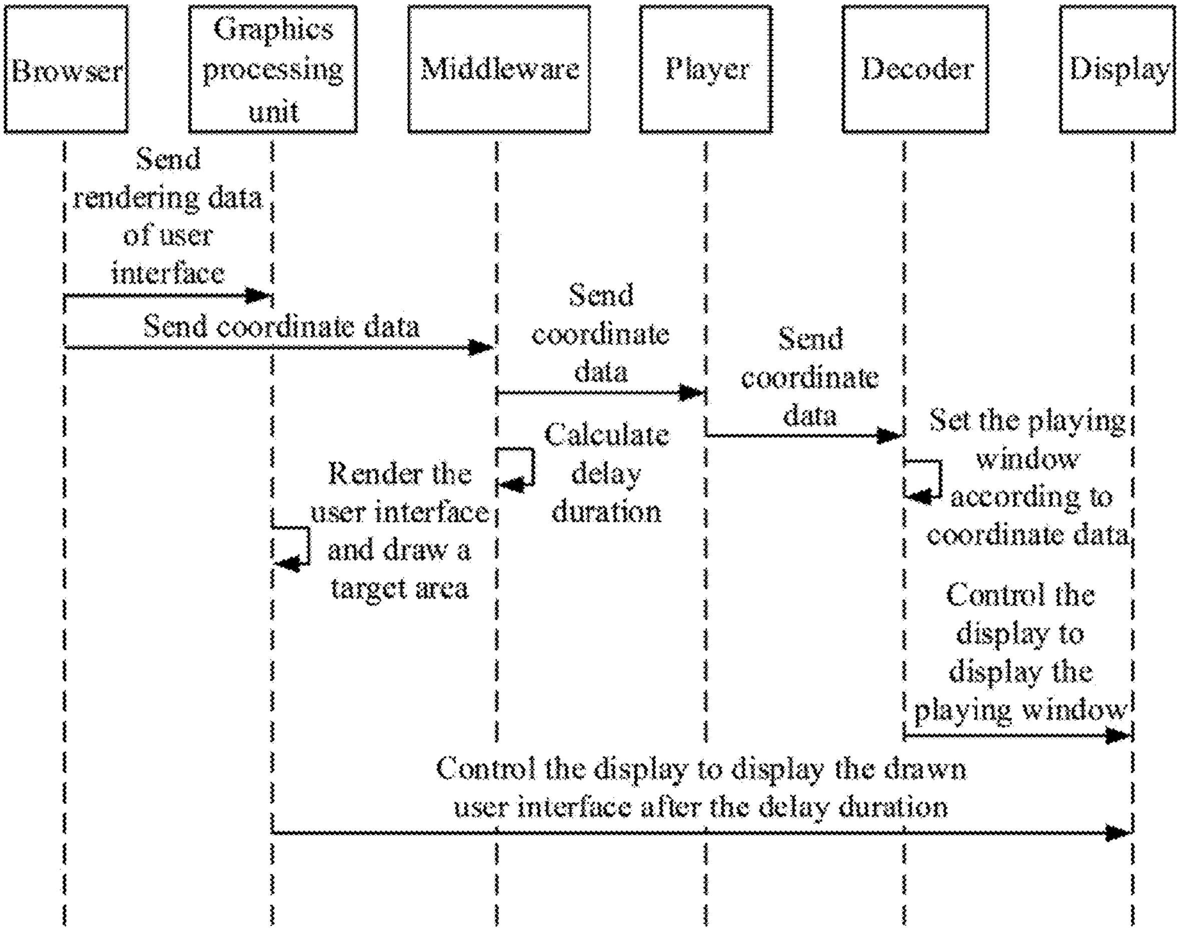
FIG. 39 shows a timing diagram of a second video scaling process according to some embodiments of the disclosure.

In order to clarify the method for displaying media data in the disclosure, as shown in FIG. 39, the following embodiments will be discussed.

After receiving a video scaling command input from the user, the browser can send the rendering data of the user interface to the GPU, and meanwhile can send the coordinate data of the video display to the middleware, where the rendering data may include the coordinate data of the video display. The middleware can send the coordinate data to the player, and simultaneously calculates the delay duration based on the initial delay value, the termination delay value and the delay step size. The player can send the coordinate data to the underlying decoder, and the underlying decoder can decode the video data and sets a playing window according to the coordinate data. The decoded video data is played in the playing window, and the display 260 is controlled to display the playing window. The GPU can receive the rendering data of the user interface to render the user interface, and can draw a video window on the user interface based on the coordinate data. The video window is in the transparent state, and the display is controlled to display the drawn user interface after the delay duration.

In the embodiments of the disclosure, the display time of the data of the user interface layer is delayed so that the target area matches the displayed the playing window, eliminating the background color edges and the edge trimming phenomenon in the scaling process of the media data. Further, according to some embodiments of the disclosure, the delay duration is continuously reduced from the initial delay value to the termination delay value. The reduction in delay duration reduces the loss of the refresh rate (fps) of the media data to a certain extent. The embodiments of the disclosure are applicable to platforms that do not require very high refresh rates and have medium playing performance. By delaying the display of the user interface, the background color edges and the edge trimming phenomenon may be eliminated.

Figure 40:
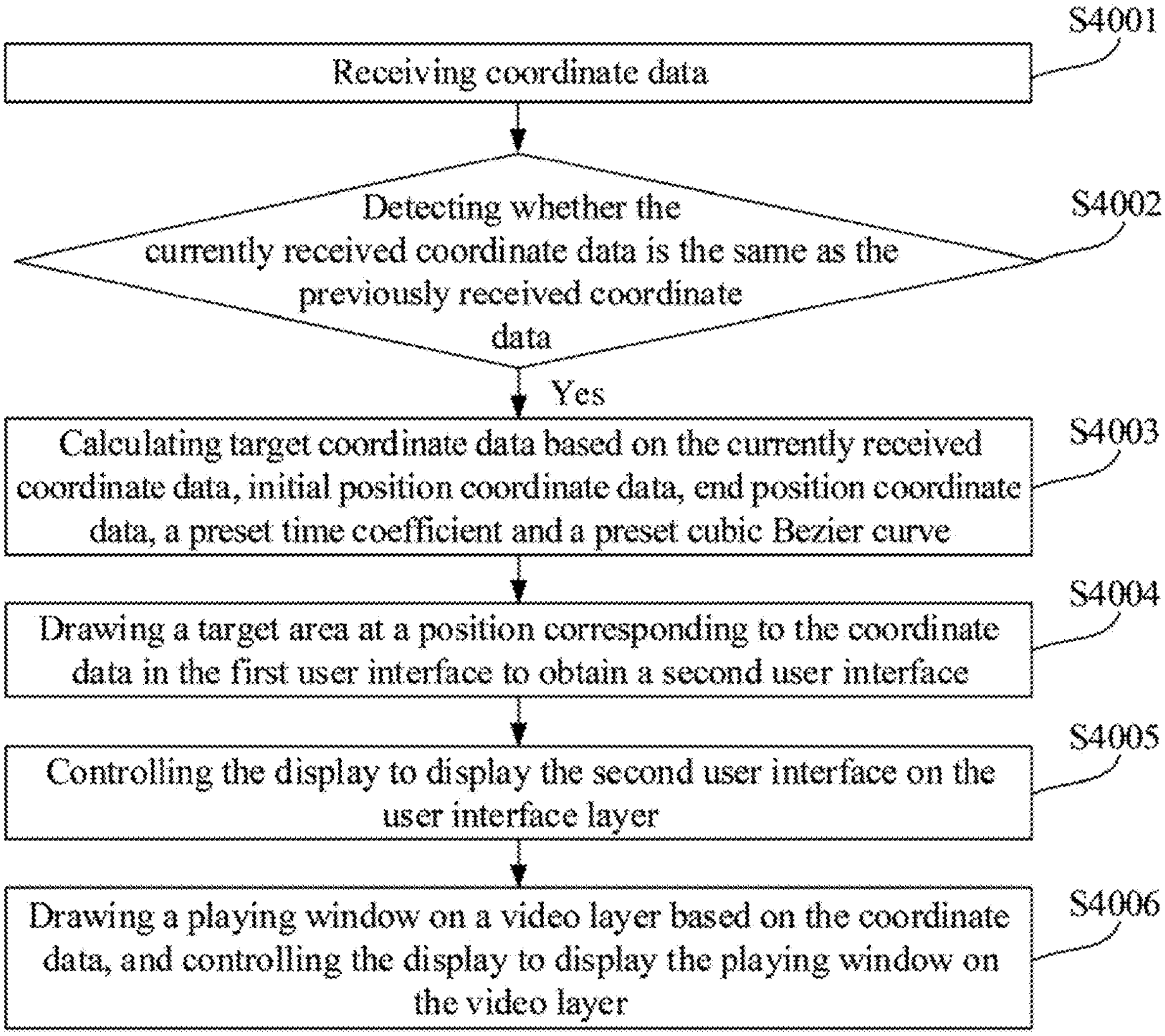
FIG. 40 shows a flow chart of another method for displaying media data according to some embodiments of the disclosure.

Some embodiments of the disclosure further provide a display apparatus 200, where the structure of the display apparatus 200 and the functions of all parts can refer to the above embodiments. As shown in FIG. 40, the display apparatus can perform the following steps.

S4001: receiving coordinate data, where the coordinate data is coordinate data of a display position of the media data.

S4002: detecting whether the currently received coordinate data is the same as the previously received coordinate data.

If it is detected that the currently received coordinate data is different from the previously received coordinate data, step S4003 is executed: calculating target coordinate data based on the currently received coordinate data, start position coordinate data, end position coordinate data, a preset time coefficient and a preset cubic Bezier curve.

If the middleware detects that the currently received coordinate data is different from the previously received coordinate data after receiving the coordinate data sent from the browser, the middleware can send the coordinate data to the player. Meanwhile, the target coordinate data is calculated based on the currently received coordinate data, start position coordinate data, end position coordinate data, preset time coefficient and preset cubic Bezier curve, and is sent to the graphics processing unit.

In some embodiments, the step of calculating the target coordinate data based on the currently received coordinate data, start position coordinate data, end position coordinate data, preset time coefficient and preset cubic Bezier curve may include: calculating a current proportion parameter based on the currently received coordinate data, start position coordinate data and end position coordinate data.

The start position coordinate data refers to the coordinate data when the coordinate data has not changed, and the end position coordinate data refers to the coordinate data after the coordinate data has changed. For example, in the scaling up playing process of the media data, the start position coordinate data is the coordinate data of the selected media control, and the end position coordinate data is the coordinate data during full-screen playing. In the scaling down playing process of the media data, the start position coordinate data is the coordinate data during full-screen playing, and the end position coordinate data is the coordinate data of the selected media control.

Current proportion parameter=(current coordinate data−start position coordinate data)/(end position coordinate data−current coordinate data). Here, the coordinate data may include abscissa, ordinate, width and height. The abscissa, ordinate, width and height have the same changing rule, that is, all conform to the preset cubic Bezier curve. Therefore, when the current proportion parameter is calculated, any one among the abscissa, ordinate, width and height is used for calculation.

The step of calculating the target coordinate data based on the currently received coordinate data, start position coordinate data, end position coordinate data, preset time coefficient and preset cubic Bezier curve may further include: calling the preset cubic Bezier curve to calculate a current time coefficient corresponding to the current proportion parameter.

After obtaining the current proportion parameter, the middleware calls the cubic_bezier ( ) function (cubic Bezier curve) to obtain the current time coefficient. Here, the cubic Bezier curve is used to provide a method of controlling the "trend of the coefficient according to the Bezier curve". The cubic Bezier curve is mainly a function of generating a velocity curve, and the rule is cubic-bezier (<x1>, <y1>, <x2>, <y2>). The cubic-bezier has four points: two default points, namely: P0(0,0), P3(1,1); and two control points, namely: P1(x1, y1), P2(x2, y2). Given P1=(x1, y1) and P2=(x2, y2), for each x in [0, 1], y is calculated through the cubic_bezier ( ) function called in the algorithm, such that p=(x, y) resides on this curve.

The preset cubic Bezier curve coincides with the coordinate change of the scaling function of the media data. For example, the coordinate change of the scaling function follows the trend of dense-sparse-dense, which coincides with the changing trend of cubic-bezier (0.25, 0.1, 0.25, 1.0), so the target coordinate data may be calculated based on the cubic-bezier (0.25, 0.1, 0.25, 1.0).

The step of calculating the target coordinate data based on the currently received coordinate data, start position coordinate data, end position coordinate data, preset time coefficient and preset cubic Bezier curve may further include: determining a target time coefficient, where the target time coefficient is the sum of the current time coefficient and the preset time coefficient; here, the preset time coefficient is a fixed parameter used in the calculation process. The preset time coefficient is obtained through empirical values. According to different platforms, the value is adjusted accordingly; calling the preset cubic Bezier curve to calculate a target proportion parameter corresponding to the target time coefficient; and calculating the target coordinate data based on the target proportion parameter, the start position coordinate data and the end position coordinate data.

Here, target coordinate data=start position coordinate data+(end position coordinate data−start position coordinate data)×target proportion parameter.

The coordinate data may include abscissa, ordinate, width and height. The abscissa, ordinate, width and height are respectively used to calculate the target coordinate data according to the above formula.

Exemplarily, during the scaling up process of the media data, the preset cubic Bezier curve is shown in FIG. 41. The currently received coordinate data is (x1, y1, w1, h1), the start position coordinate data is ($x_{start}$, $y_{start}$, $w_{start}$, $h_{start}$), the end position coordinate data is ($x_{end}$, $y_{end}$, $w_{end}$, $h_{end}$), and the preset time coefficient is a. Current proportion parameter $Y=(x1-x_{start})/(x_{end}-x1)$. The preset cubic Bezier curve is called to calculate the current time coefficient X corresponding to the current proportion parameter Y. The target time coefficient is calculated as X'=X+a. The preset cubic Bezier curve is called to calculate the target proportion parameter Y' corresponding to the target time coefficient X1. $x1'=x_{start}+(x_{end}-x1)\times Y'$. y1', w1' and h1' are respectively calculated in the same way. The target coordinate data is (x1', y1', w1', h1').

S4004: drawing a target area at a position corresponding to the coordinate data in the first user interface to obtain a second user interface, where the target area is in the transparent state.

S4005: controlling the display to display the second user interface on the user interface layer.

S4006: drawing a playing window on a video layer based on the coordinate data, where the playing window is used to play the media data; and controlling the display to display the playing window on the video layer, where the video layer is provided below the user interface layer.

In order to clarify the method for displaying media data in the disclosure, as shown in FIG. 42, the following embodiment is disclosed.

After receiving a video scaling command input by the user, the browser can send the rendering data of the user interface to the graphics processing unit, and simultaneously can send the coordinate data of the video display to the middleware. The middleware can send the coordinate data directly to the player, and meanwhile calculates the target coordinate data based on the currently received coordinate data, start position coordinate data, end position coordinate data, preset time coefficient and preset cubic Bezier curve, and can send the target coordinate data to the graphics processing unit. The player can send the coordinate data to the underlying decoder, and the underlying decoder can decode the video data and set a playing window according to the coordinate data. The decoded video data is played in the playing window, and the display is controlled to display the playing window. The GPU can receive the rendering data of the user interface to render the user interface, and can draw a target area on the user interface based on the target coordinate data. The target area is in the transparent state, and the display is controlled to display the drawn user interface.

In the embodiments of the disclosure, the target coordinate data is calculated according to the currently received coordinate data, the cubic Bezier curve and other parameters, and the drawing is performed based on the target coordinate data, so that the target area of the user interface layer slightly covers the playing window of the video layer, eliminating the background color edges without losing the refresh rate of the media data, and achieving the effect that the user interface fits the display of the playing window. The embodiment of the disclosure is applicable to platforms with relatively good playing performance. The target area matches with the playing window well (for example, the difference between the target area and the playing window is relatively small). The effect that the target area fits the playing window may be achieved by calculating the target coordinate data.

Some embodiments of the disclosure further provide a display apparatus that can perform the following steps: receiving coordinate data, where the coordinate data is coordinate data of a display position of media data; calculating a delay duration based on an initial delay value, a termination delay value and a delay step size after detecting that the currently received coordinate data is different from last coordinate data; calculating target coordinate data based on the currently received coordinate data, start position coordinate data, end position coordinate data, a preset time coefficient and a preset cubic Bezier curve; drawing a target area at a position corresponding to the target coordinate data in the first user interface to obtain a second user interface, where the target area is in a transparent state; controlling the display to display the second user interface on the user interface layer after the delay duration; and drawing a playing window on a video layer based on the coordinate data, where the playing window is used to play the media data; and controlling the display to display the playing window on the video layer, where the video layer is provided below the user interface layer.

It should be noted that, when the method of the embodiment of the disclosure is used, the parameters involved, such as initial delay value, termination delay value, delay step size, preset time coefficient, etc., need to be obtained again according to experimental verification, and the numerical values in the above embodiments cannot be directly used.

Figure 43:
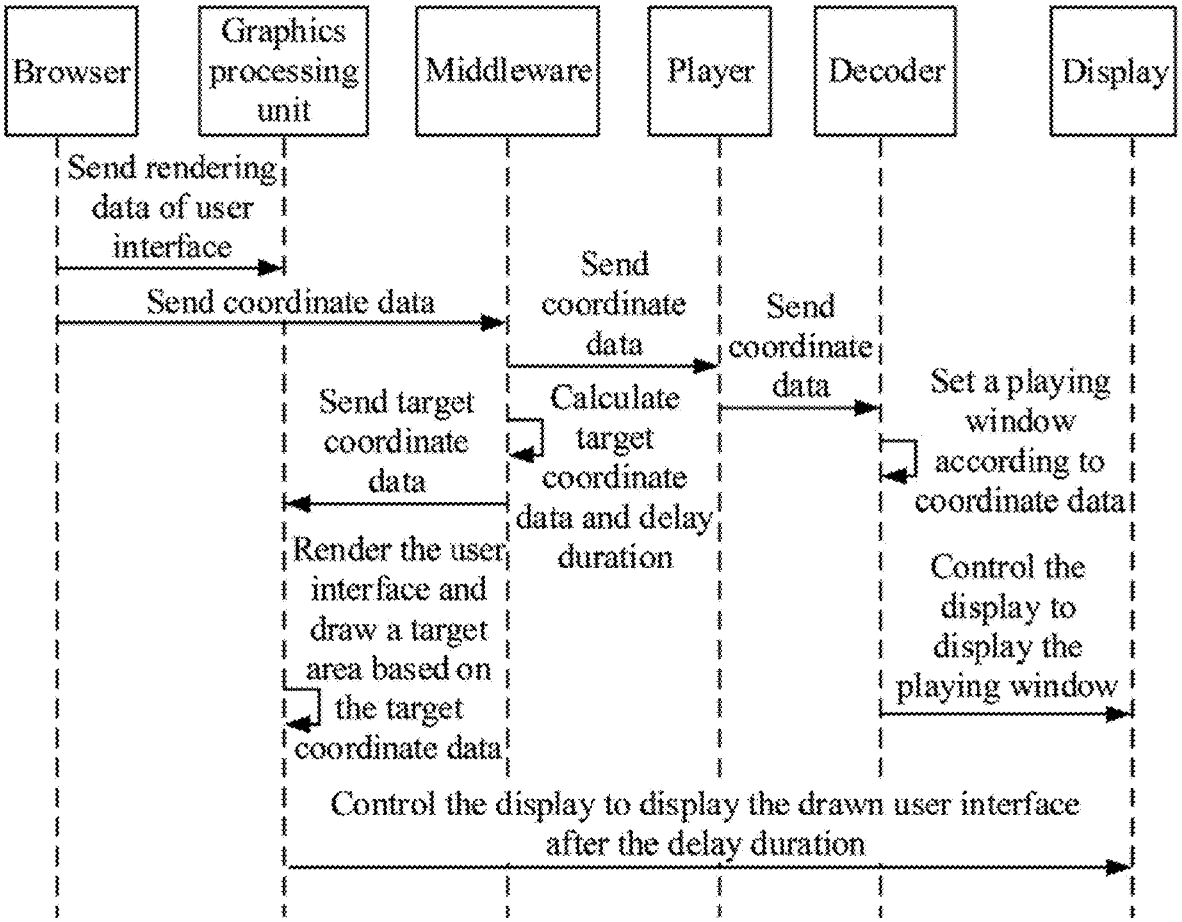
FIG. 43 shows a timing diagram of a fourth video scaling process according to some embodiments of the disclosure.

In order to clarify the method for displaying media data in the disclosure, as shown in FIG. 43, the following embodiment is disclosed.

After receiving a video scaling command input by the user, the browser can send the rendering data of the user interface to the GPU, and simultaneously can send the coordinate data of the video display to the middleware. The middleware can send the coordinate data directly to the player, and simultaneously calculates the target coordinate data based on the currently received coordinate data, start position coordinate data, end position coordinate data, preset time coefficient and preset cubic Bezier curve, and can send the target coordinate data to the GPU; and the delay duration is calculated based on the initial delay value, the termination delay value and the delay step size. The player can send the coordinate data to the underlying decoder, and the underlying decoder can decode the video data and sets a playing window according to the coordinate data. The decoded video data is played in the playing window, and the display 260 is controlled to display the playing window. The GPU can receive the rendering data of the user interface to render the user interface, and can draw a target area on the user interface based on the target coordinate data. The target area is in the transparent state, and the display is controlled to display the drawn user interface after the delay duration.

The embodiments of the disclosure can be applied to platforms with relatively poor playing performance. The way to only delay the display of the user interface or the calculation of the target coordinate data cannot achieve a stable and smooth effect. The more stable and smooth scaling effect may be obtained by combining the two ways.

The embodiments of the disclosure optimize the scaling effect through software, and get rid of the limitation of hardware chip performance. There is just a need to configure platform matching parameters, such as initial delay value, termination delay value, delay step size, preset time coefficient, etc., to achieve the effect that the user interface fits the display of the playing window, shorten the development cycle, and reduce the cost.

Some embodiments of the disclosure provide a method for displaying media data, applicable to a display apparatus. The display apparatus may include a display, and at least one processor configured to execute computer instructions to cause the display apparatus to: receive coordinate data, where the coordinate data is coordinate data of a display position of media data; draw a target area at a position corresponding to the coordinate data in the first user interface to obtain a second user interface, where the target area is in a transparent state; calculate a delay duration based on an initial delay value, a termination delay value and a delay step size after detecting that the currently received coordinate data is different from last coordinate data; control the display to display the second user interface on the user interface layer after the delay duration; and draw a playing window on a video layer based on the coordinate data, where the playing window is used to play the media data; and control the display to display the playing window on the video layer, where the video layer is provided below the user interface layer. In the embodiments of the disclosure, the display time of the data of the user interface layer is delayed so that the target area matches the displayed playing window, eliminating the background color edges and the edge trimming phenomenon in the scaling process of the media data. Further, according to some embodiments of the disclosure, the delay duration is continuously reduced from the initial delay value to the termination delay value. The reduction in delay duration reduces the loss of the refresh rate of the media data to a certain extent.

For the convenience of explanation, the above description has been made in conjunction with specific embodiments. However, the above discussion in some embodiments is not intended to be exhaustive or to limit the embodiments to the specific forms disclosed above. Numerous modifications and variations may be obtained in light of the above teachings. The above embodiments are chosen and described in order to better explain the content of the disclosure, so as to enable those skilled in the art to better utilize the embodiments.

What is claimed is:

1. A display apparatus, comprising:

a display;

a control device, in communication with the display; and at least one processor, connected with the display and the control device, and configured to execute computer instructions to cause the display apparatus to:

in response to a first command input via the control device from a user, obtain media data of a target channel, wherein the media data comprises an index file and a data segment, and the index file comprises an attribute parameter for describing attribute characteristics of the data segment and encryption data;

execute a first process and a second process in parallel; wherein the first process comprises demultiplexing the data segment to obtain Elementary Stream (ES) data, and obtaining first metadata information for describing attribute of the data segment according to the encryption data and first ES data; and the second process comprises generating second metadata information for describing attribute of the data segment according to the attribute parameter and the encryption data; wherein both of the first metadata information and the second metadata information are usable for initializing a decoder;

both of the first metadata information and the second metadata information describe at least audio and video attribute information of the same data segment, and the audio and video attribute information comprises: a width and a height of video, a Multipurpose Internet Mail Extensions (MIME) type of video, a MIME type of audio, a sampling rate, and channel information;

based on that the second metadata information is generated before the first metadata information, initialize the decoder according to the second metadata information;

determine whether the first metadata information is consistent with the second metadata information;

based on that the first metadata information and the second metadata information is consistent, decode the ES data via the decoder initialized according to the second metadata information to obtain first decoded ES data;

based on that the first metadata information and the second metadata information is not consistent, turn off the decoder initialized according to the second metadata information, and reinitialize the decoder according to the first metadata information, and decode the ES data via the decoder reinitialized according to the first metadata information to obtain second decoded ES data;

based on that the first metadata information is generated before the second metadata information, initialize the decoder according to the first metadata information and terminate the second process, and decode the ES data via the decoder initialized according to the first metadata information to obtain third decoded ES data; and display a program image of the target channel on the display according to one of the first decoded ES data, the second decoded ES data, and the third decoded ES data.

2. The display apparatus of claim 1, wherein the at least one processor is further configured to execute computer instructions to cause the display apparatus to:

obtain a radio frequency data stream;

parse the radio frequency data stream according to a specified protocol to obtain data in a specified format; and extract the data in the specified format to obtain the media data, wherein in the media data, media data with transport stream interface TSI=0 is the index file, and media data with TSI>0 is the data segment.

3. The display apparatus of claim 1, wherein the at least one processor is further configured to execute computer instructions to cause the display apparatus to:

generate first attribute information in the second metadata information according to the attribute parameter, wherein the first attribute information is used to describe the audio and video attribute information of the data segment; and generate second attribute information in the second metadata information based on the encryption data, wherein the second attribute information is used to describe encryption information of the data segment.

4. The display apparatus of claim 3, wherein the at least one processor is further configured to execute computer instructions to cause the display apparatus to:

identify a parameter at a specified position in the attribute parameter; and take the parameter at the specified position as the first attribute information in the second metadata information; and based on that the attribute parameter is null, take default attribute information as the first attribute information in the second metadata information.

5. The display apparatus of claim 3, wherein the at least one processor is further configured to execute computer instructions to cause the display apparatus to:

based on that the encryption data comprises an encryption tag, determine that the second attribute information is encrypted; and based on the encryption data does not comprise an encryption tag, determine that the second attribute information is not encrypted.

6. The display apparatus of claim 1, wherein the at least one processor is further configured to execute computer instructions to cause the display apparatus to:

obtain first key information from the first metadata information and second key information from the second metadata information; and determine whether the first key information is same as the second key information.

7. The display apparatus of claim 1, wherein the first command is a channel switching command and the first command is received during displaying of a first channel on the display, and the at least one processor is further configured to execute computer instructions to cause the display apparatus to:

determine whether the target channel and the first channel belong to a same frequency before executing the first process and the second process in parallel;

based on that the target channel and the first channel belong to the same frequency, obtain third metadata information, wherein the third metadata information is metadata information used to initialize the decoder when decoding ES data of the first channel;

initialize the decoder using the third metadata information; and based on that the target channel and the first channel belong to different frequencies, execute the first process and the second process in parallel.

8. A method for a display apparatus, comprising:

in response to a first command input via a control device of the display apparatus from a user, obtaining media data of a target channel, wherein the media data comprises an index file and a data segment, and the index file comprises an attribute parameter for describing attribute characteristics of the data segment and encryption data;

executing a first process and a second process in parallel;

wherein the first process comprises demultiplexing the data segment to obtain Elementary Stream (ES) data, and obtaining first metadata information for describing attribute of the data segment according to the encryption data and first ES data; and the second process comprises generating second metadata information for describing attribute of the data segment according to the attribute parameter and the encryption data; wherein both of the first metadata information and the second metadata information are usable for initializing a decoder;

both of the first metadata information and the second metadata information describe at least audio and video attribute information of the same data segment, and the audio and video attribute information comprises: a width and a height of video, a Multipurpose Internet Mail Extensions (MIME) type of video, a MIME type of audio, a sampling rate, and channel information;

based on that the second metadata information is generated before the first metadata information, initializing the decoder according to the second metadata information;

determining whether the first metadata information is consistent with the second metadata information;

based on that the first metadata information and the second metadata information is consistent, decoding the ES data via the decoder initialized according to the second metadata information to obtain first decoded ES data;

based on that the first metadata information and the second metadata information is not consistent, turning off the decoder initialized according to the second metadata information, and reinitializing the decoder according to the first metadata information, and decoding the ES data via the decoder reinitialized according to the first metadata information to obtain second decoded ES data;

based on that the first metadata information is generated before the second metadata information, initializing the decoder according to the first metadata information and terminating the second process, and decoding the ES data via the decoder initialized according to the first metadata information to obtain third decoded ES data; and displaying a program image of the target channel on a display of the display apparatus according to one of the first decoded ES data, the second decoded ES data, and the third decoded ES data.

9. The method of claim 8, further comprising:

obtaining a radio frequency data stream;

parsing the radio frequency data stream according to a specified protocol to obtain data in a specified format; and extracting the data in the specified format to obtain the media data, wherein in the media data, media data with transport stream interface TSI=0 is the index file, and media data with TSI>0 is the data segment.

10. The method of claim 8, further comprising:

generating first attribute information in the second metadata information according to the attribute parameter, wherein the first attribute information is used to describe audio and video attribute information of the data segment; and generating second attribute information in the second metadata information based on the encryption data, wherein the second attribute information is used to describe encryption information of the data segment.

11. The method of claim 10, further comprising:

identifying a parameter at a specified position in the attribute parameter; and taking the parameter at the specified position as the first attribute information in the second metadata information; and based on that the attribute parameter is null, taking default attribute information as the first attribute information in the second metadata information.

12. The method of claim 10, further comprising:

based on that the encryption data comprises an encryption tag, determining that the second attribute information is encrypted; and based on that the encryption data does not comprise an encryption tag, determining that the second attribute information is not encrypted.

13. The method of claim 8, further comprising:

obtaining first key information from the first metadata information and second key information from the second metadata information; and determining whether the first key information is same as the second key information.

14. The method of claim 8, wherein the first command is a channel switching command and the first command is received during displaying of a first channel on the display, and the method further comprises:

determining whether the target channel and the first channel belong to a same frequency before executing the first process and the second process in parallel;

based on that the target channel and the first channel belong to the same frequency, obtaining third metadata information, wherein the third metadata information is metadata information used to initialize the decoder when decoding ES data of the first channel;

initializing the decoder using the third metadata information; and based on that the target channel and the first channel belong to different frequencies, executing the first process and the second process in parallel.

* * * * *